United States Patent [19]

Kruse et al.

[11] Patent Number: 5,463,616
[45] Date of Patent: Oct. 31, 1995

[54] METHOD AND APPARATUS FOR ESTABLISHING A FULL-DUPLEX, CONCURRENT, VOICE/NON-VOICE CONNECTION BETWEEN TWO SITES

[75] Inventors: Robert J. Kruse, Seattle; Harmon F. Law, Tacoma; Steven R. Wagner, Kent, all of Wash.

[73] Assignee: Advanced Protocol Systems, Inc., Seattle, Wash.

[21] Appl. No.: 263,266

[22] Filed: Jun. 21, 1994

Related U.S. Application Data

[63] Continuation-in-part of Ser. No. 1,839, Jan. 7, 1993, abandoned.

[51] Int. Cl.$^6$ .............................. H04J 3/00; H04L 5/14; H04M 11/06
[52] U.S. Cl. .............................. 370/24; 370/82; 370/94.2; 370/112; 379/93; 348/14
[58] Field of Search .................. 370/24, 29, 60, 370/60.1, 79, 85.6, 85.8, 94.1, 94.2, 109, 110.1, 112, 118, 82; 379/93, 96, 53; 375/8; 381/29, 30, 31, 34, 35; 348/14, 16, 17

[56] References Cited

U.S. PATENT DOCUMENTS

| | | | |
|---|---|---|---|
| 4,597,101 | 6/1986 | Kishimoto et al. | 382/13 |
| 4,610,022 | 9/1986 | Kitayama et al. | 381/36 |
| 4,653,086 | 3/1987 | Laube | 379/96 |
| 4,794,595 | 12/1988 | Ohyama | 370/110.1 |
| 4,809,271 | 2/1989 | Konolo et al. | 370/110.1 |
| 4,827,085 | 5/1989 | Yaniv et al. | 379/100 |
| 4,873,715 | 10/1989 | Shibata | 370/110.1 |

FOREIGN PATENT DOCUMENTS

| | | |
|---|---|---|
| 3504064 | 8/1986 | Germany . |
| 3630469 | 3/1988 | Germany . |
| 3409532 | 4/1989 | Germany . |
| 193489 | 7/1990 | Japan . |
| 2577748 | 10/1990 | Japan . |

OTHER PUBLICATIONS

"Video Calls Use Basic Phone Lines," Mitch Radcliffe; *MacWeek* Aug. 3, 1992.

(List continued on next page.)

*Primary Examiner*—Hassan Kizou
*Attorney, Agent, or Firm*—Steven P. Koda

[57] ABSTRACT

Full-duplex, concurrent voice and non-voice communication over the public switched telephone network (PSTN) is maintained by a communication interface apparatus. A voice only connection is established between two sites initially. Concurrent voice/non-voice connection then is established by pressing an engage button on the communication interface apparatus at each site. Voice communication is temporarily lost, while the connection changes from a phone-to-phone voice-only link to an interface-to-interface voice/non-voice data link. The communication interface apparatus includes a digital signal processor for converting and compressing digital voice data into a voice data packet, a modem for maintaining communication over the PSTN and a micro-controller for managing the establishment and maintenance of concurrent voice and non-voice data communication. The micro-controller monitors non-voice data availability to and from a local computer or gaming device, voice data availability to and from the digital signal processor and voice packet and non-voice data packet availability to and from the modem. In one embodiment, non-voice data is transmitted at a higher priority. Voice data is transmitted at a lower priority and buffered such that real-time performance is preserved. A compression algorithm and modem baud rate are used which enable voice data to fit within the available bandwidth left over from the non-voice data communication.

5 Claims, 20 Drawing Sheets

OTHER PUBLICATIONS

"Radish System Lets Phone Users Send Voice, Data Simultaneously," *PC Week* vol. 9, No. 19, p. 53; May 11, 1992.

"Don't Just Tell Them, Show Them!" Glenn A Pierce, Jr.; *Automation;* Aug. 1990.

Mitsubishi Still Color Picture TV Phone; *Techno Japan* vol. 23, No. 6; Jun. 1990.

The Photophone; (product brochure) GTE Feb. 15, 1990.

"Wrist TVs still fiction, but police videophones take hold;" Ray Smith; *TE&M;* Dec. 15, 1987.

"Audiographic Terminal;" M. Laube; *Electrical Communication* vol. 60, No. 1; 1986.

"Comparison of Coding Schemes For Telewriting Systems;" Tominaga et. al.; ICCC; 1986.

"Simultaneous Transmission of Voice and Handwriting Signals: 'Sketchphone System';" Kishimoto et. al.; IEEE 1981.

Telewriting Terminal Equipment (Recommendation T.150) CCITT 1988.

"A Family of 2–Wire, Duplex Modems Operating at Data Signalling Rates . . . " Fascimile Recommendation V.32 CCITT; 1988.

\*\*\* PICFON Card brochure; Specom Technologies Corp. (Published prior to applicant's invention).

Pen Telephone brochure; Shimadzu (Published prior to applicant's inventionm).

Telewriter Product Description; Optel Communications, Inc. (published prior to applicant'invention).

Videowriter '91 Product Description; Optel Communications, Inc. 1991.

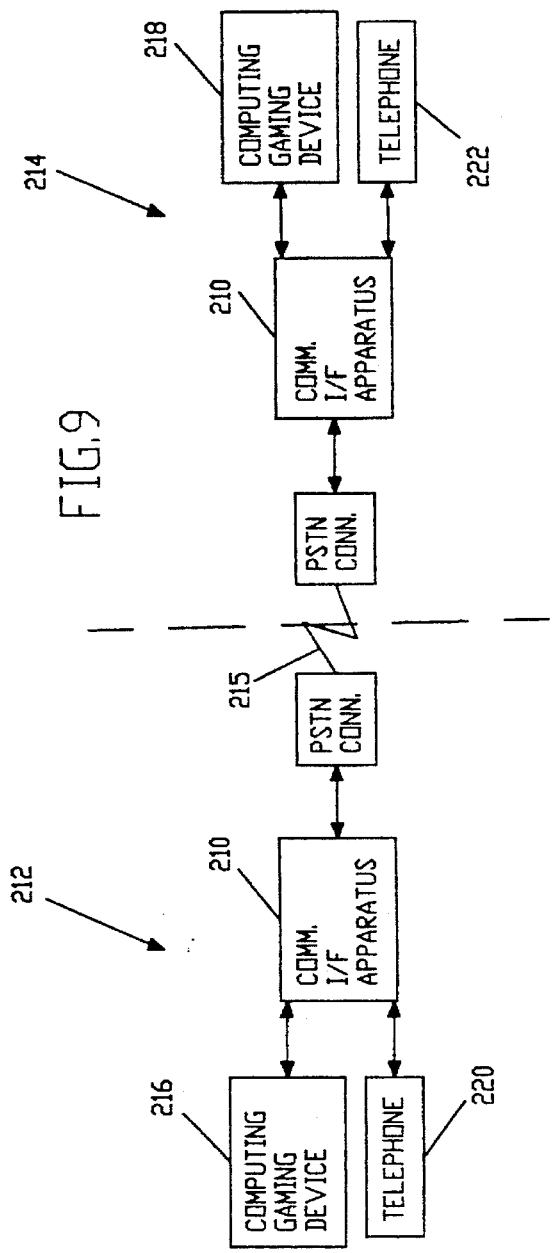
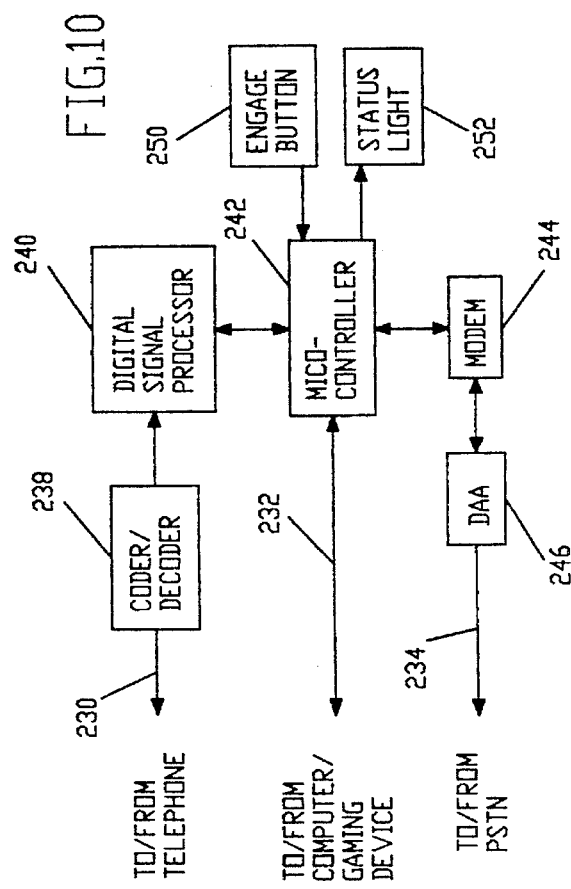

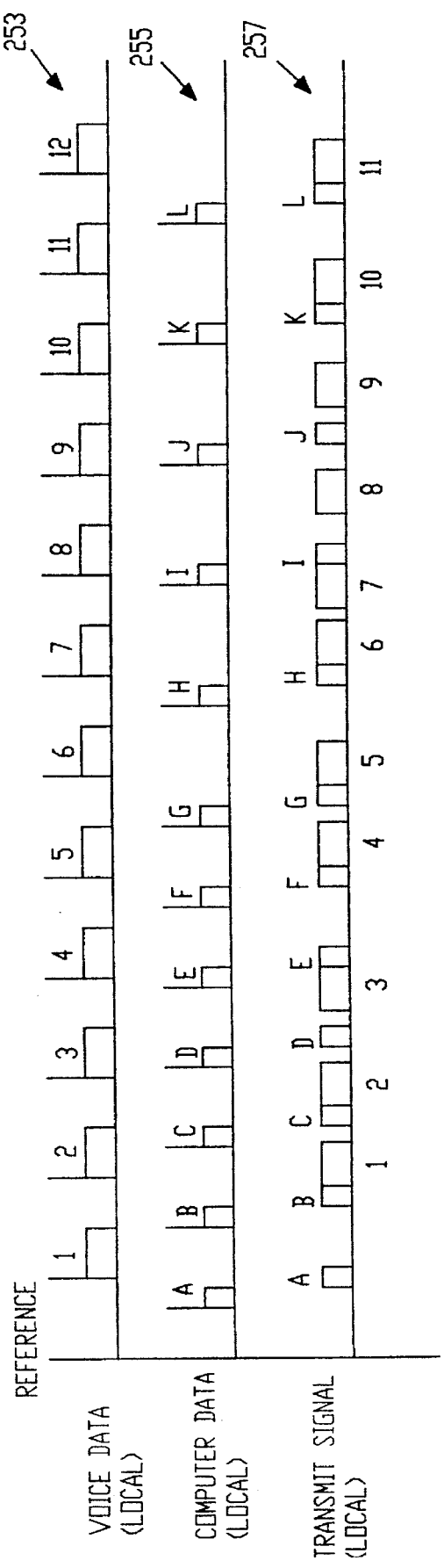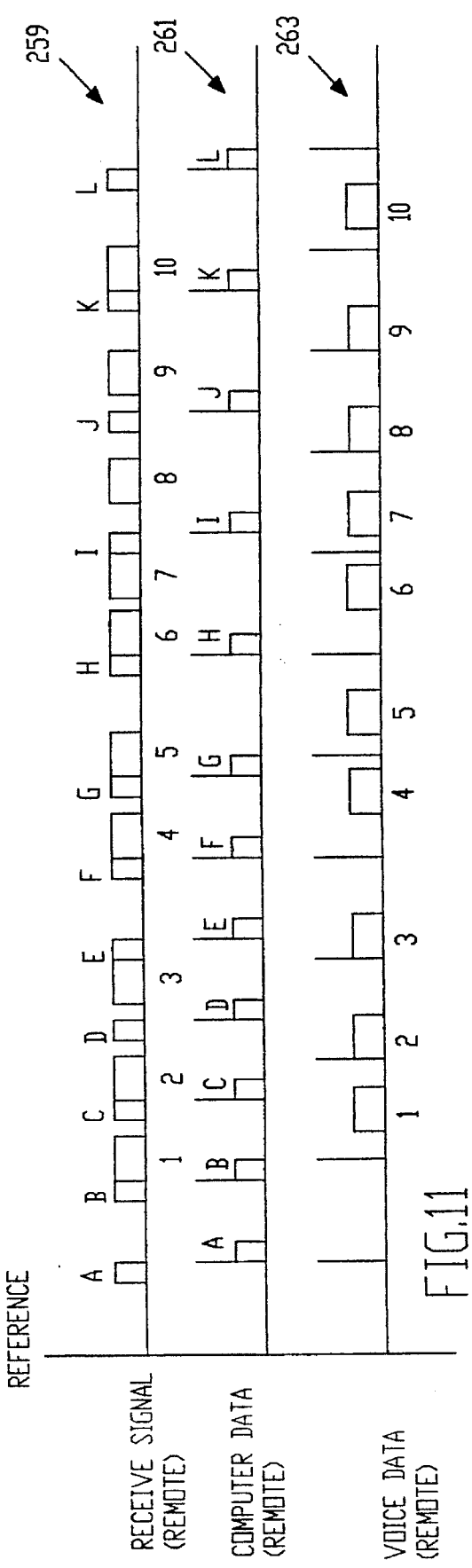
FIG.11

5,463,616

METHOD AND APPARATUS FOR ESTABLISHING A FULL-DUPLEX, CONCURRENT, VOICE/NON-VOICE CONNECTION BETWEEN TWO SITES

CROSS REFERENCE TO RELATED APPLICATIONS

This application is a continuation-in-part of U.S. patent application Ser. No. 001,839 filed Jan. 7, 1993 for a Method and Apparatus for Real-time Voice Communication and Deterministic Data Transmission, (abandoned).

NOTICE REGARDING COPY-RIGHTED MATERIAL

A portion of the disclosure of this patent document contains material which is subject to copyright protection. The copyright owner has no objection to the facsimile reproduction by anyone of the patent document or the patent disclosure as it appears in the public Patent and Trademark-Office file or records, but otherwise reserves all copyright rights whatsoever.

BACKGROUND OF THE INVENTION

This invention relates to methods and apparatii for establishing concurrent voice and non-voice communication between two remote sites. More particularly, this invention relates to full-duplex, concurrent voice/non-voice communication over the public switched telephone network (PSTN). To the end users, voice communication and data communication occur in real-time.

Concurrent voice and data communication is available in many environments, including the Integrated Services Digital Network (ISDN), private branch exchanges (PBX), satellite access protocols, and private LANs. Each of these environments enable high speed digital communication among end users. Each of these environments have grown as supplements and alternatives to communication over the public switching network (PSTN). None, however, completely replaces the PSTN for unrestricted telecommunication because of the extensive installation base of the PSTN. Typically, the alternative environments enable limited communication outside their environment (i.e., not the wealth of internal features within their special environment).

A shortcoming of the PSTN is its aging analog-based communication path. A strength of the PSTN is its large installation base, which enables communication to substantially anyone anywhere. While concurrent voice and data transmission within other environments is desirable and provides significant communication power, a system for concurrent voice and data communication over the PSTN is desirable.

Product technologies including concurrent voice and data communication include telewriting and video phone technology. Telewriting is a communication format in which image data consisting of characters and graphics is transmitted and received together with voice signals over a telephone line in real time. Typically the communication format conforms with telewriting standards established by the Consultative Committee in International Telegraphy and Telephony (CCITT) (i.e., "Telewriting Terminal Equipment", Consultative Committee for International Telegraph and Telephony (CCITT), Facsimile VII.5, Recommendation T.150, IXth Plenary Assembly, Melbourne, November 1988). Typically, telewriting is performed over PSTN lines, though it is an option in video conferencing systems which use high speed networks such as ISDN.

Video phones enable one to see another party while talking. High quality video phones typically operate on high speed data lines such as 64,000 bps or greater. AT&T announced a video phone which uses the ordinary PSTN line to send voice and 'moving' images at 19,200 bps. The limitations of the PSTN line, however, result in a video image which is choppy and does not synchronize the voice with the speaker's movements.

ShareVision Technology Inc. of San Jose, Calif. announced a video-conferencing product for communication over a single ordinary PSTN line. Video-conferencing with still image capture capabilities, screen sharing and a fax-modem are specified. A proprietary compression algorithm is used to send and receive video images, voice and other data over a 14,400 bps modem connection. Users are said to have the ability to set priorities for voice and video, allowing them to trade slower image refreshes for better sound quality.

SPECOM Technologies Corporation of Santa Clara, Calif. markets a PICFON card for combining voice and picture communication over a single PSTN phone line. Picture data throughput is not fast enough for real time video phone imaging, yet is fast enough to display images while callers discuss the content. Such ability is useful for business meetings, remote presentations and telemarketing. Voice and data are full duplex at a bit rate up to 9600 bps (9600 bps data exchange during silence.) Communication is compatible with V.32 modem standards.

SUMMARY OF THE INVENTION

According to the invention, full-duplex concurrent voice and non-voice data communication is maintained over the public switched telephone network (PSTN).

According to one aspect of the invention, a concurrent voice/non-voice connection is established after a voice only connection is previously established by pressing an engage button on a communication interface apparatus at each site. Voice communication then is temporarily lost, while a concurrent voice/non-voice link is established over the public switched telephone network (PSTN) line.

According to another aspect of the invention, the communication interface apparatus includes a digital signal processor for converting and compressing digital voice data into a voice data packet, a modem for maintaining communication over the PSTN and a micro-controller for managing the establishment and maintenance of concurrent voice and non-voice data communication. The micro-controller monitors non-voice data availability to and from a local computer or gaming device, voice data availability to and from the digital signal processor and voice packet and non-voice data packet availability to and from the modem.

According to another aspect of the invention, a negotiation protocol is implemented as part of a connection process to determine which modem of two being connected is to operate in an originate mode and which is to operate in an answer mode. Upon pressing an engage button at a local site, a micro-controller enters a connecting mode. During this mode, the modem is commanded to send out a DTMF signal (e.g., a # key tone) for a prescribed time, then listen for a specific DTMF signal response (e.g., * key tone). If a "*" key tone is heard, then the micro-controller instructs the modem to enter originate mode. If not heard after a specific number of tries, then the modem is instructed to listen for the "#" key tone and respond with a "*" key tone. After detection and response with the "*" key tone, the micro-controller instructs the modem to enter answer mode. If a successful exchange of tones does not occur within a prescribed time period, then the micro-controller performs a system reset operation.

According to another aspect of the invention, the interface apparatus is configured as an asynchronous data connection for handling time critical non-voice data. By time critical it is meant that non-voice data is transmitted from a first computing device and expected to arrive at a second computing device via the interface apparatii within regular intervals. Non-voice data is to be available to each computing device for processing within the timing constraint. This also is referred to as deterministic data transmission. To comply with the time critical constraint, a non-voice data packet has a higher priority than a voice data packet. A voice data packet is transmitted in the available bandwidth in excess of that required for transmission of a non-voice data packet. To minimize transmission delays, the micro-controller determines the number of voice data packet bytes that can be transmitted at the modem baud rate (i.e., within the available bandwidth) while complying with the time constraint. If an entire voice packet can not be fit in that available bandwidth, then the voice packet is divided into smaller packets such that a smaller packet can fit within the available bandwidth. The smaller voice packet then is transmitted with the non-voice data packet.

According to another aspect of the invention, non-voice data is transmitted at a higher priority. Voice data is transmitted at a lower priority and buffered such that real-time performance is preserved. A compression algorithm and modem baud rate are used which enable voice data to fit within the available bandwidth left over from the non-voice data communication.

The invention will be better understood by reference to the following detailed description taken in conjunction with the accompanying drawings.

BRIEF DESCRIPTION OF THE DRAWINGS

FIG. 9 is a block diagram of voice/non-voice data communication link between two remote sites according to another embodiment of this invention;

FIG. 10 is a block diagram of a full-duplex, concurrent voice/non-voice data communication interface apparatus according to another embodiment of this invention;

FIG. 11 is a timing chart of the full-duplex, concurrent voice/non-voice data communication process occurring between the two sites of FIG. 9 according to an embodiment of this invention;

DESCRIPTION OF SPECIFIC EMBODIMENTS

Overview

Figure 1:
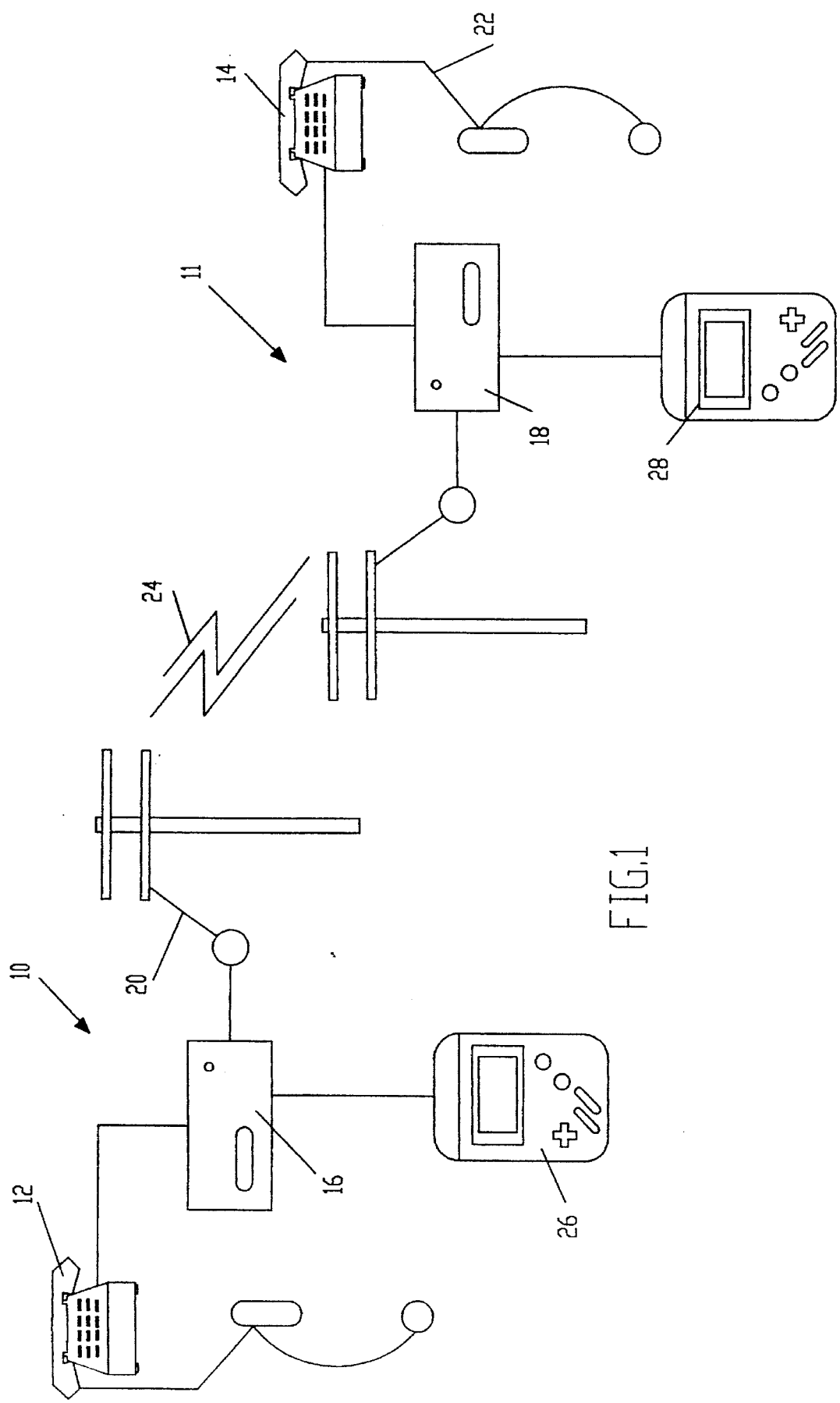
FIG. 1 is a block diagram of the gaming device communication configuration using the public switched telephone network (PSTN)

FIG. 1 shows a block diagram of a gaming device communication configuration embodying the method and apparatus of this invention. According to the embodiment, two parties remotely located at site 10 and site 11 are able to talk over the public switched telephone network (PSTN) while simultaneously joining in a two-person linkage of a video gaming system (i.e., the GAME BOY hand-held video gaming system; GAME BOY is a Trademark of Nintendo of America, Inc.). Prior to establishing voice or data communication, each phone 12, 14 is connected to a respective mixing apparatus 16, 18 ("mixer") of this invention. A phone line 20, 22 from the wall provides an external PSTN connection and is also connected to the mixer 16, 18. When the mixer is not in use (powered off), the incoming and outgoing lines of the apparatus 16, 18, are connected to pass the voice signal onto the PSTN 24. When the mixers 16, 18 are in use, voice communication from a player at site 10 goes from the phone 12 into mixer 16, through the phone line 20, then over a full-duplex PSTN 24 connection and into phone line 22, mixer 18 and phone 14 at site 11. Simultaneous voice communication from site 11 occurs over the other half of the full-duplex PSTN 24 connection.

To enable concurrent voice and data interchange, the gaming systems 26, 28 are connected to the respective mixers 16, 18. With a modem link established between sites 10 and 11, the gaming units are powered on. Data interchange (i.e. real-time game playing), like voice communication, occurs over the full-duplex PSTN connection. Data from gaming system 26 at site 10 goes through the mixer 16, over phone line 20, then over the PSTN 24 and into phone line 22, mixer 18 and gaming system 28 at site 11. To the respective players, voice communication and game data interchanges occur in real-time.

According to the method of mixing the voice and data (more specifically, the digital voice data and the digital non-voice data) one mixer 16 operates as a master device, while the other mixer 18 operates as a slave device. The master device 16 receives synchronization from the host gaming unit 26 and transmits this information in real-time over the PSTN to the slave device 18. The slave device 18 generates synchronization for the gaming unit 28. At each synchronization pulse, one byte of game data is transmitted and received by each gaming unit. Voice data is transmitted by each unit at the completion of their respective voice frames. Voice data is buffered to protect from potential delay due to its lower transmission priority level.

The structure of the "mixer" is described below and the primary components are identified.

Mixing Apparatus ("Mixer")

Figure 2:
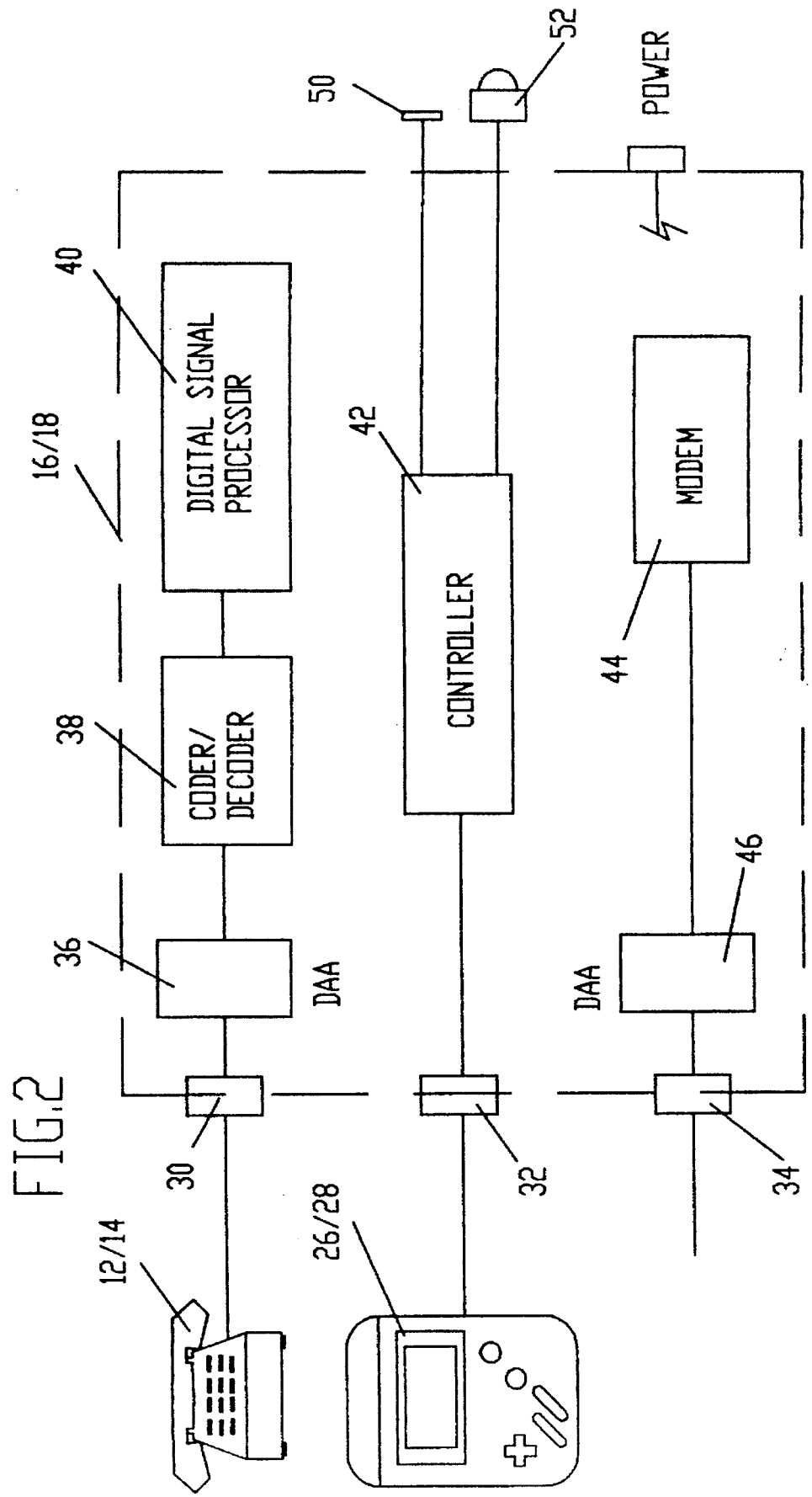
FIG. 2 is a block diagram of a voice/data mixing apparatus according to an embodiment of this invention.

FIG. 2 shows a diagram of a mixer 16 according to an embodiment of this invention. The mixer 16 includes ports 30, 32, 34 for communication with telephone 12, gaming system 26 and the PSTN 24, respectively. For transmissions, voice data from telephone 12 enters the mixer 16 via port 30. Voice data is received at a data access arrangement device 36 enabling access to either digital or analog telephones. Analog voice data then is routed from the DAA 36 to a coder/decoder device 38 where it is converted into digital format. The digital voice data is routed to a digital signal processor 40 which implements speech compression according to a linear predictive coding (LPC) or other known protocol (i.e., CELP). Compressed voice data packets are output from the DSP 40 to a controller 42.

Game data from gaming system 26 also is sent to the controller 42. The controller packages voice data and game data to form a mixed signal for transmission over the PSTN 24. The mixed signal is routed to a modem 44, on to another data access arrangement device 46, then out port 34 onto the phone line 20 and PSTN 24.

For reception, voice data and/or game data is received from PSTN 24 onto phone line 20, into port 34, DAA device 46, and modem 44. The modem converts the analog signal to digital format according to a standard modem protocol (i.e., CCITT). The digital signal is input to controller 42 which separates a game data packet from a voice data packet. Periodically, the game data, is output via port 32 to the gaming device 26 according to gaming device protocol. Voice data packets periodically are read by the DSP 40 which then decompresses the voice packet to generate a digital voice signal. The digital voice signal then is decoded and converted to analog format at decoder 38. The analog voice signal then is output via DAA 36 and port 30 to telephone 12.

As described the mixer 16 includes data access acquisition devices 36, 46, coder/decoder 38, digital signal processor 40, controller 42 and modem 44. The data access arrangement devices 36, 46 are standard FCC-approved devices for interfacing an analog or digital phone to the analog-based PSTN 24. In one embodiment, DAA model nos. CH1834 from Cometek, Inc. of Sunnyvale, Calif. are used.

The coder/decoder device 38 includes digital to analog and analog to digital converters for conditioning signals. In one embodiment the CODEC is one of the National Semiconductor TP305X family. The device 38 includes transmit high-pass and low-pass filtering, receive low-pass filtering with correction, u-law and A-law compatible coder and decoders meeting CCITT specifications.

The digital signal processor 40 is an integrated circuit microcomputer optimized for digital signal processing, such as voice compression/decompression. In one embodiment, the ADSP-2101 DSP microcomputer from Analog Devices, Norwood, Mass. is used. The microcomputer operates at a 60 ns instruction cycle time and includes on-chip memory. As configured for this application, the DSP 40 executes an LPC program for compressing and decompressing voice data. In a specific embodiment a 2400 baud LPC program (i.e., LPC-10E) is used. In another specific embodiment a CELP (i.e., FS-1016) process is used for compression/decompression.

Modem 44 operates at 4800 baud or higher. Preferably the modem is a 9600 baud modem enabling spare bandwidth capacity when the DSP executes a 2400 baud voice compression/decompression program. In a specific embodiment, the modem is CCITT standard V.32 for 9600 baud full duplex transmission over the PSTN. An RS-232 link is maintained between the modem 44 and controller 42.

Controller 42 is a single chip microcomputer which (1) mixes the voice data and non-voice data for output over the PSTN 24; and (2) separates the voice data and non-voice data received over the PSTN 24. In a specific embodiment, the controller 42 is a PIC 16C5X 8-bit microcomputer operating at 20 MHz and including on-chip memory, an 8-bit data path and 12-bit instructions. In addition, a peripheral feature includes an 8-bit clock used in this application for sourcing a synchronization signal.

The functions of the "mixer" during the various steps of user operation are now described.

User Operation

Figure 3:
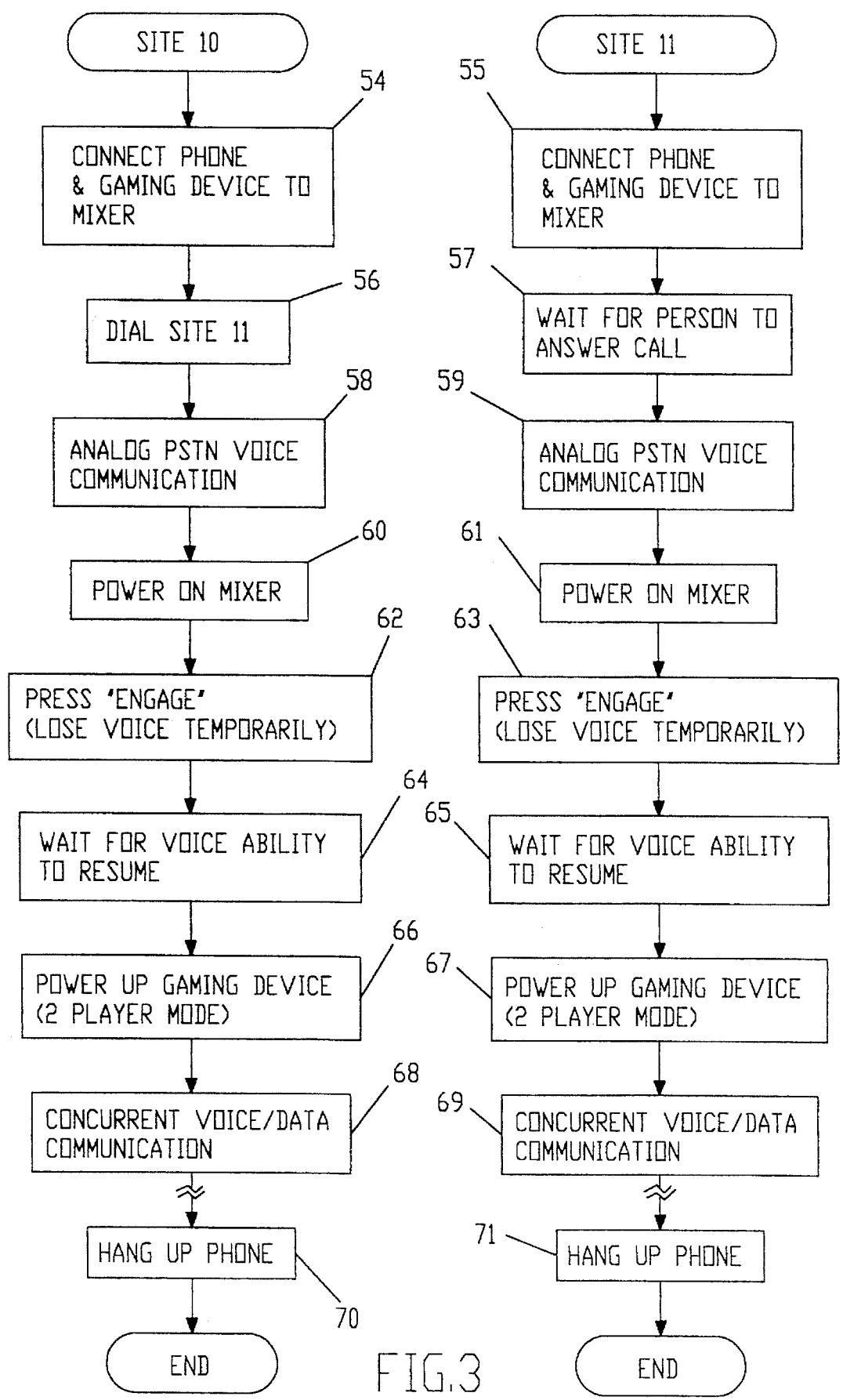
FIG. 3 is a flow chart of user actions to establish two-way gaming communication over the PSTN.

FIG. 3 shows a flow chart of the user operation for establishing concurrent voice and data communication between sites 10 and 11 of FIG. 1. In the scenario described the player at site 10 will telephone the player at site 11. The players will then establish concurrent voice/data communication and play a game while continuing in conversation.

Prior to making or receiving a call, the phones 12, 14 and outgoing lines 20, 22 are connected to the mixers 16, 18 at the respective sites (steps 54, 55). The gaming devices 26, 28 may be connected before making the telephone call or any time prior to game initiation. With the appropriate lines connected, the player at site 10 dials site 11 (step 56). The player at site 11 receives the call (step 57) and establishes conventional analog voice communication (steps 58 and 59).

At some point, the parties decide to play a game over the phone link. If not already on, each player powers up the mixer apparatus (steps 60, 61). Each player then presses the engage button (steps 62,63). In response, voice communication is temporarily lost while a modem connection replaces the analog voice connection (steps 64, 65). Once the modems 44 of FIG. 2 establish a connection, voice communication resumes. Now, however, the voice connection is achieved through digital packet transmission and voice compression and decompression. Using a toll quality compression/decompression technique, the difference is not significantly perceived by the players.

With the voice communication re-established, the players are now ready to begin a game. Each player plugs in a compatible game cartridge and turns on the gaming device in two-player mode. The gaming devices send out synchronization signals. When a gaming unit receives an appropriate response, a host/player relationship is established and game play can commence (steps 68, 69). The players talk to each other and play games over a single phone link.

The concurrent voice/data link remains in place while the players continue playing. When a game is over, a new game may be started or a new game cartridge inserted without losing the voice link. At some point, the players decide to end their game and their conversation and hang-up the phone (steps 70, 71).

Following is a detailed discussion of the "mixer" operation, including modes and operating states. A description of the mixing protocol is also included.

Operating States

Figure 4:
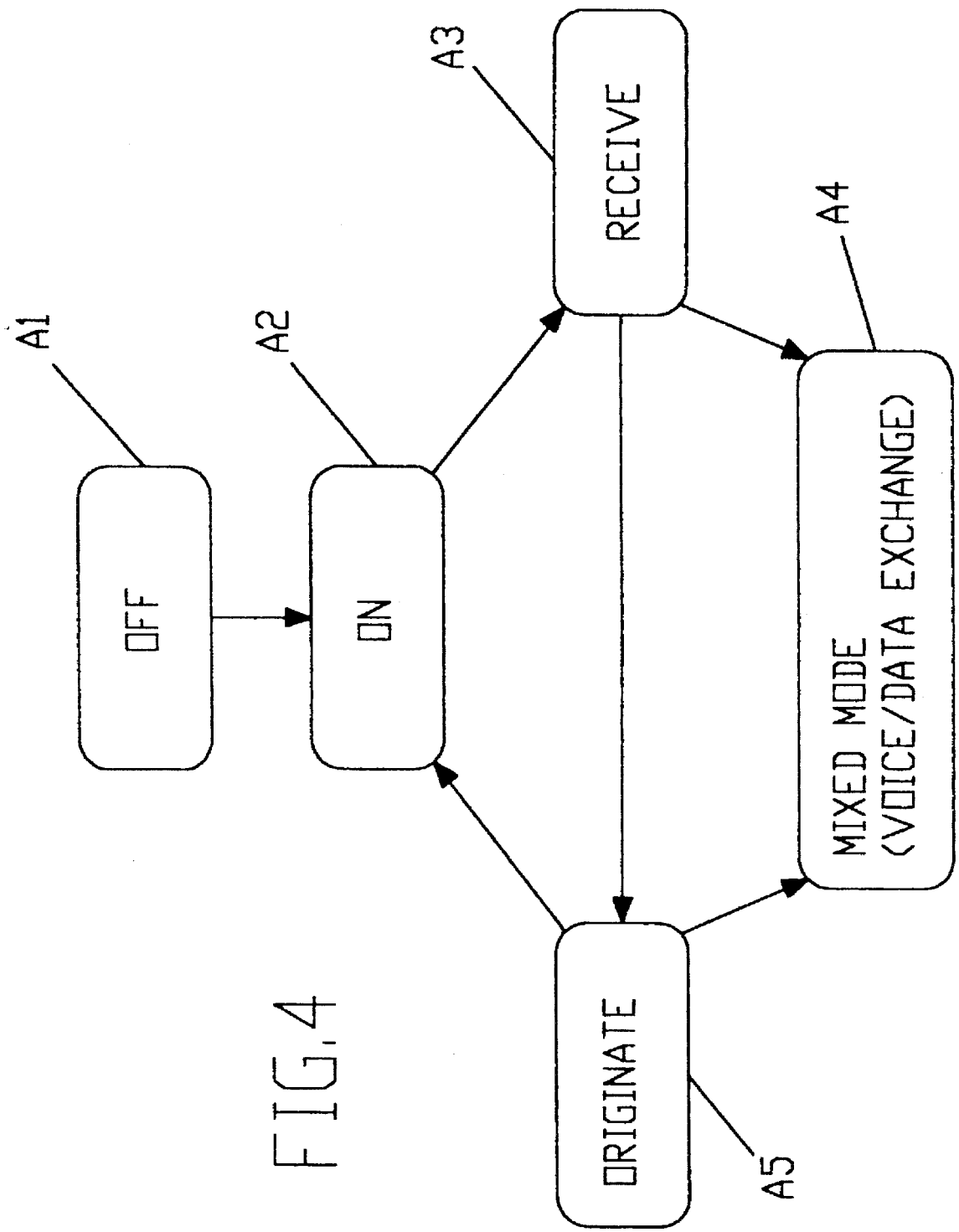
FIG. 4 is a state/mode diagram of the mixing apparatus from the user perspective.

FIG. 4 is a state transition diagram of the "mixer". With the mixer 16 off, the power is turned on, the status light 52 is set to indicate an on condition, and the controller 42 executes initialization software. Standard voice communication, if occurring, is not interrupted when power is turned on or initialization executed. After initialization, the mixer enters and remains in "on" mode. While in "on" mode, a player either continues voice communication, makes a voice call, or answers a voice call.

Once a call is initiated and a standard (analog PSTN) voice communication established, each user presses an engage button 50 to initiate modem connection procedures. In response to the engage button, the status light 52 is set to indicate that connection procedures are in progress and each mixer enters the "receive" mode, waiting to receive a start pulse. Each controller is configured with pseudo-random time-out period. If a start pulse has not been received by the end of the time out period, one of the controllers will re-configure the mixer to "originate" mode and transmit a start pulse. The modems will then attempt to establish a connection. During the set-up procedure, voice communication is interrupted.

If a modem connection is established before a specified time-out period expires, the status light 52 is set to indicate that a connection has been established and the controllers 42 enter "mixed" mode. If a modem connection is not established before the specified time-out period expires, then the status light 52 is set to indicated connection failure. After a connection failure, analog voice communication is re-established and the mixers return to their respective "on" modes. The mixers then remain in the "on" mode until the engage button is re-pressed.

When a modem connection is established, each controller 42 enters and remains in "mixed" mode until the modem connection is broken, or the device is powered off. While in "mixed" mode, concurrent voice/data communication is supported. Detailed operation in the various modes is described below.

Establishing a Modem Connection

Figure 5:
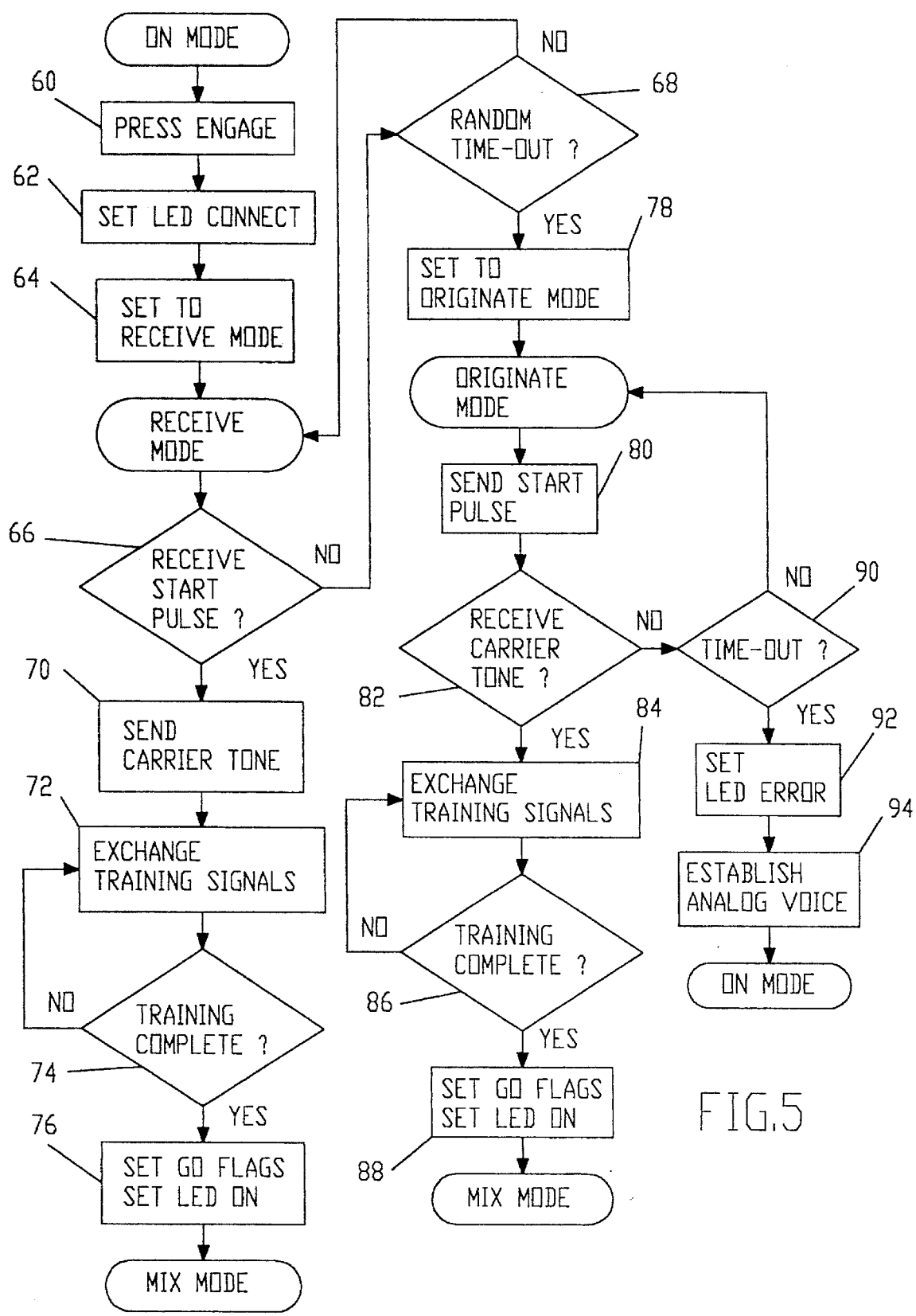
FIG. 5 is a flow chart of the controller and modem software for establishing a voice/data link connection.

FIG. 5 is a flow chart depicting steps for establishing a modem connection. Analog voice communication has already been established with the mixer 16 powered-up and in the "on" mode. To initiate voice/data communication, the user presses the engage button 50 at step 60. In response the controller 42 sets the status light 52 to indicate that connection procedures are in progress (step 62) and configures the modem 44 to receive mode (step 64). The controller 42 will calculate a pseudo-random (random within a specified range) time-out period.

With the controller 42 in "receive" mode, the modem 44 will look for a receive start pulse from another device. If the modem 44 detects a start pulse (step 66), it will respond by transmitting carrier tone at step 70 and negotiating a modem connection in steps 72 and 74 according to standard protocol (i.e., CCITT V.32). Once the modem connection has been established, the controller 42 will set the Go flags which trigger the DSP 40 and game data processing, transitioning the controller to "mixed" mode. The status light 52 is set to indicate that the connection procedures are complete at step 76.

If the modem 44 has not received a start pulse within the time-out period (step 68), the controller 42 will re-configure the modem to originate mode in step 78. With the controller 42 in "originate" mode, the modem 44 will transmit a start pulse at step 80 and look for the other modem to respond with carrier tone. If the modem 44 detects carrier tone (step 84) it will negotiating a modem connection at steps 72 and 74 according to standard protocol (i.e., CCITT V.32). Once the modem connection has been established, the controller 42 will set the Go flags which trigger the DSP 40 and game data processing, transitioning the controller to "mixed" mode. The status light 52 is set to indicate that the connection procedures are complete at step 88.

If the modem 44 has not detected carrier tone within a specified time-out period (step 90), then the status light 52 is set to indicate a failure condition at step 92 and analog voice communication is re-established in step 94. The controller returns to "on" mode.

The software interfaces between the controller 42, the DSP 40, and the gaming device are described.

Voice Processing

Figure 6:
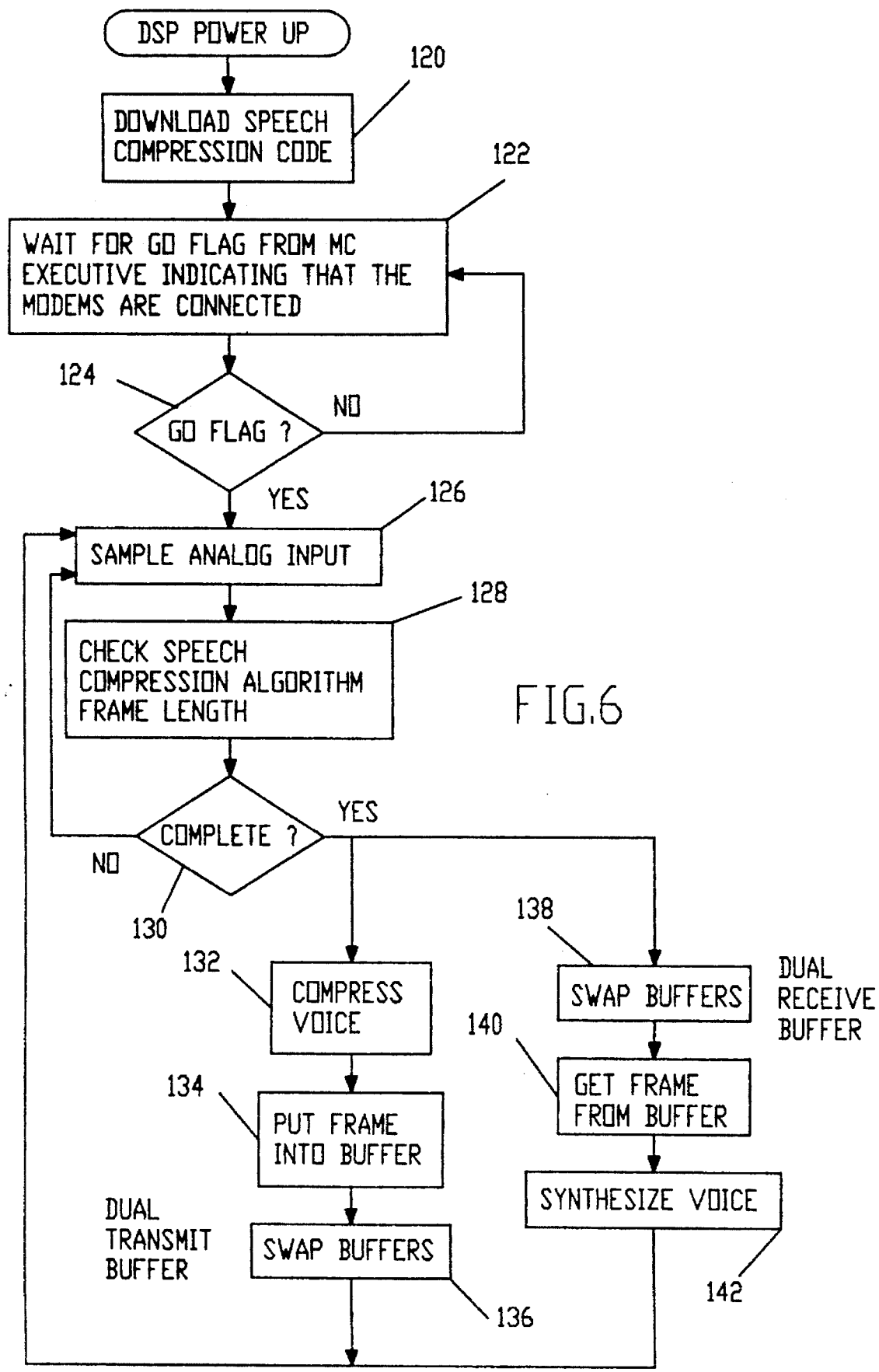
FIG. 6 is a flow chart of digital signal processor software for interfacing with the controller.

FIG. 6 is a flow chart of the digital signal processor (DSP) 40 and controller 42 interface software. At power up, compression/decompression code is loaded as step 120. The DSP 40 then enters a loop including steps 122, 124 while waiting for a Go flag from the local controller 42. Controller 42 sets the Go flag when the modems 44 at sites 10 and 11 have successfully established a connection. Once the Go flag is set, the DSP and controller software begins processing frames of voice data, enabling digital voice communication. At step 126 a sample of voice data is captured by the DSP via the telephone 12, DAA 36 and coder 38. The frame length is check at step 128 and tested at step 130 to determine if a complete frame of voice samples has been collected. Once the frame is complete at step 132, the frame is compressed into a voice data packet. At step 132 the packet is stored in one of two transmit buffers. The DSP 40 sends a signal to the controller 42, and the current transmit buffer is output by the modem 44 onto the PSTN 24. At step 136 the buffers are swapped so that the next frame of voice data does not interfere with the transmission in progress. Voice sampling (step 126) and the compression process continues throughout the duration of the modem connection between sites 10 and 11. The same process executes at site 11 for capturing voice data, compressing voice frame packets, and transmitting the packets onto the PSTN.

The DSP also processes incoming voice data received from the PSTN 24. In parallel with the compression/transmission process, reception and decompression occurs for incoming voice data. Voice data packets are received by the modem 44, isolated from game data packets and forwarded to the DSP interface buffers. The DSP 40 retrieves and decompresses the voice data packets, generating voice samples. The current receive buffer is swapped at step 138. At step 140 the frame data are retrieved. At step 142 the voice data are output to the coder 38 which converts the samples to analog signals. The analog signal is routed through the DAA 36 to the telephone 12. The same process occurs at site 11 for decompressing voice packets and generating a voice signal for telephone 14.

Game Data Processing

While the controller is in mixed mode, the players can start a game by inserting a game cartridge and switching the gaming device into two-player mode. The controller 42 of mixing unit 16 detects initial start-up signals from gaming device 26 and forwards the information to the remote device via modem 44. Likewise, the controller 42 of unit 18 forwards start-up signals from gaming unit 28 to mixing unit 16. With the exchange of start-up signals, a host gaming device is selected and a master/slave relationship established.

Figure 7:
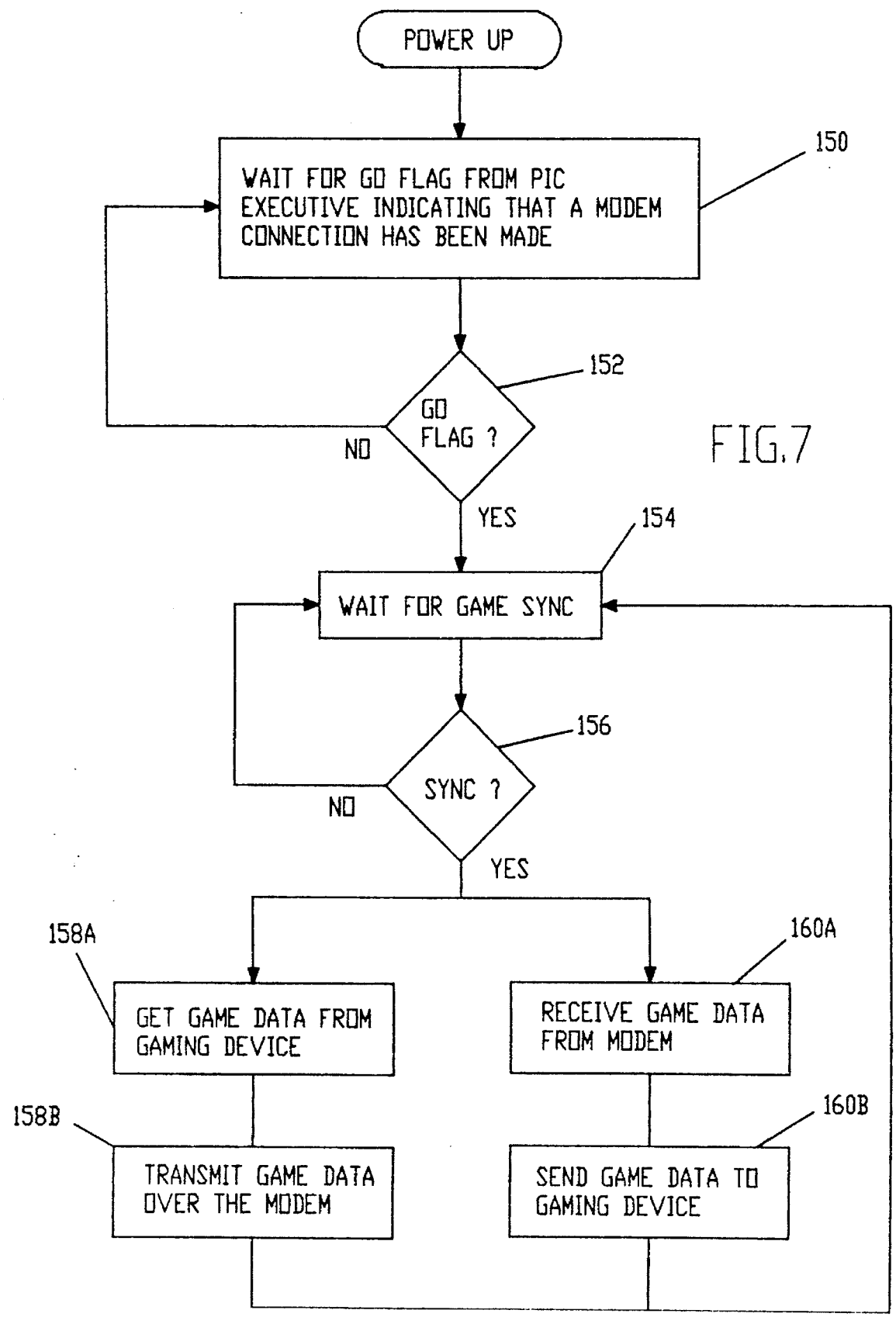
FIG. 7 is a flow chart of controller software for interfacing with gaming device data.

FIG. 7 shows a flow chart for a game interface sub-process. Initially, the sub-process executes a loop (steps 150, 152) waiting for the Go flag to be set. The Go flag is set when the modems have successfully established a modem connection. Once the Go flag is detected, the sub-process waits for a game synchronization signal at step 154. Assume the gaming device 26 is in host mode. Upon detection of the synchronization signal (step 156), the controller 42 of mixing unit 16 retrieves data from gaming device 26 (step 158A) and transmits a game packet over the modem 44 to the remote mixing device 18 (step 158B). At the same synchronization signal, the controller 42 retrieves gaming data from the modem 44 receive buffer (step 160A) and sends it to gaming device 26.

The reception of a game packet by the modem 44 of unit 18 triggers the generation of a synchronization pulse in the controller 42. As above, detection of a synchronization signal causes the controller 42 to exchange data with gaming unit 28 and transmit a game packet to the remote mixing device 16.

Thereafter, the host gaming unit 26 periodically sends game synchronization signals to the master mixing unit 16. This is reflected at the slave mixing unit 18 which generates synchronization signals for gaming device 28. In response to each synchronization pulse, a packet of game data is transmitted to the remote gaming device and a packet of game data is received by the local gaming device.

Controller Modes

Figure 8:
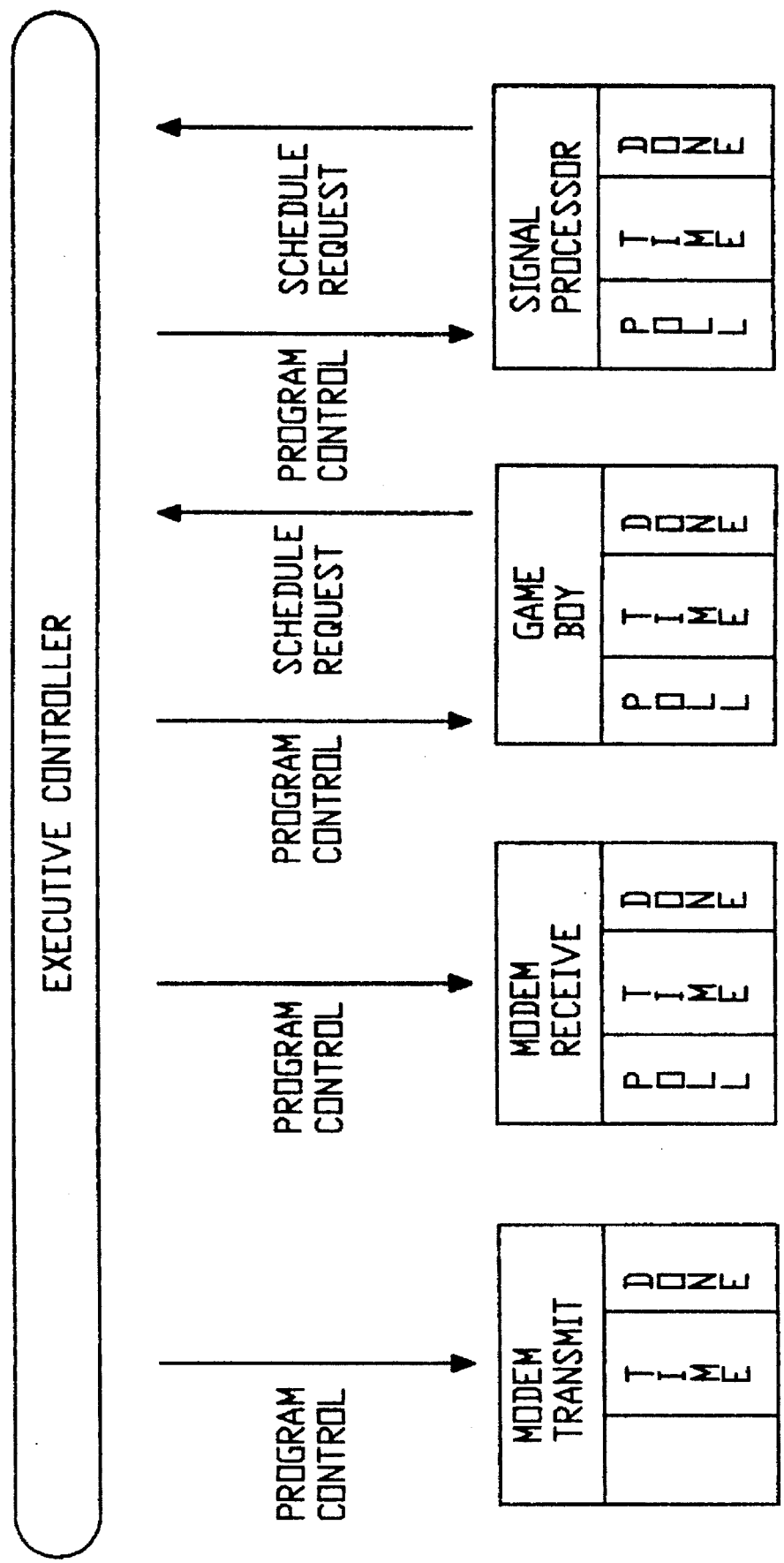
FIG. 8 is a state/mode diagram of the executive controller and its scheduling functions.

FIG. 8 shows the various operating modes of the four major "mixer" tasks and their relationship to the executive controller 42. The mixer includes: a modem transmit task which causes selected voice or game data packets to be transmitted by the modem 44 onto the PSTN 24; a modem receive task which causes the modem 44 to continually monitor the PSTN 24 for incoming data and distinguishes between voice data and game data packets; the game interface task which transfers data between the gaming device and the controller 42 data buffers; and the signal processor interface task which transfers compressed voice data between the DSP 40 and the controller 42 data buffers.

Each mixer's tasks operate in one of three primary modes: polling, timing or done. In polling mode, the task is looking for specific external signal or a signal from another mixer task. In timing mode, the task is involved in some time-critical data transfer. In done mode, the task has completed its time-critical function and is evaluating the data or resetting buffer parameters.

The executive controller schedules and dispatches the real-time tasks. This is done as a function of the task and its operating mode. Tasks operating in timing mode are given higher priority. The executive controller also provides the means for one task to schedule another task. Given predefined priorities (i.e. graphics data transmission has priority over voice data transmission), the executive controller will dispatch the requested task at the earliest opportunity.

The modem receive task polls the modem receive line. When a start bit is detected, the task changes mode and times in one byte of data. When the byte has been received, the task is set to done mode and the byte of data is evaluated as packet header information, game data, or voice data. Data is placed in the appropriate buffer location and the task transitions back to polling mode.

In master mode, the game interface task polls the game synchronization signal. When the synchronization signal is detected, the task transitions to timing mode and one byte of data is transferred to and from the gaming device. When done, the data received from the gaming device is placed in a modem transmit buffer and the modem transmit task is scheduled. In slave mode, the game interface tasks polls for the reception of a game data packet. When the game packet is received, the task transitions to timing mode and one byte of data is transferred. When done, the modem transmit task is scheduled. The game interface task then returns to polling mode.

The signal processor interface task polls the DSP frame synchronization signal. When frame synchronization is detected, the task transitions to timing mode and voice data is exchanged. When done, buffer selection parameters are set and modem transmission of the data is scheduled. The task returns to polling mode.

The modem transmit task is scheduled by the executive controller at the request of the game interface task or the signal processor interface task. A request originating from the game interface task will be processed at a higher priority. A request originating from the signal processor task will be processed only if the transmission will not interfere with the higher priority game data transmission. Transition to done mode indicates the data transmission is complete.

Alternative (Preferred) Embodiment

FIG. 9 shows a block diagram of an apparatus 210 for maintaining concurrent full-duplex voice/non-voice data communication between two sites 212, 214 over the public switched telephone network 215 (PSTN). A user at a first site 212 maintains voice communication with a user at a second site 214 while data communication between computing devices 216, 218 at the respective sites occurs concurrently. Concurrent voice and data communication occurs in each direction. The computing devices 216, 218 are personal computer systems, entertainment/gaming systems or other digital data generating devices.

The full-duplex voice/non-voice data communication interface apparatus 210 establishes and maintains concurrent voice/non-voice data communication between sites 212, 214. To establish communication, the user at one site (e.g., first site 212) uses a telephone or headset 220 to call the user at the other site (e.g., second site 214). In one embodiment analog telephones are used, although digital telephones can be used in an alternative embodiment. During this initial voice-only communication, the apparatus 210 is off or off-line. To engage in voice/non-voice data communication, each user powers up their respective interface apparatus 210. Each user then presses an "engage" button to initiate a voice/non-voice data connection. Such connection is either a synchronous data connection or an asynchronous data connection depending the apparatus configuration. While the connection is being established voice communication temporarily is lost. Voice communication switches from a phone-to-phone link to an interface 210 to interface 210 link. Once the interface connection is made, voice contact resumes. Each user then powers on their respective computing or gaming device 216, 218 to initiate the non-voice data portion of the voice/non-voice data communication link.

Interface Apparatus 210

FIG. 10 shows a block diagram of the full-duplex voice/non-voice data communication interface apparatus 210 according to one embodiment of this invention. The interface apparatus includes ports 230, 232, 234 for connecting with a telephone (headset) 220/222, a computing/gaming device 216/218 and the PSTN 215, respectively. For transmissions, voice data from telephone 220 enters the interface apparatus 210 via port 230. Voice data is received at a coder/decoder device 238 where it is converted into digital format. The digital voice data is routed to a digital signal processor 240 which implements speech compression according to a linear predictive coding (LPC) or other known protocol (i.e., CELP). Compressed voice data packets are output from the DSP 240 to a micro-controller 242.

Non-voice data (e.g., game data) from a computing/gaming system 216 also is sent to the micro-controller 242. Non-voice data is received via serial port 232. The micro-controller 242 packages voice data and non-voice data into respective communication packets (e.g., voice data packet, non-voice data packet) to be transmitted over the PSTN 215 to another site. The signal carrying the packets is routed to a modem 244, on to another data access arrangement device 246, then out port 234 onto the PSTN 215 to the other site 214.

For reception, the packets are received from PSTN 215 into port 234, DAA device 246, and modem 244. The modem 244 converts the analog signal to digital format according to a standard modem protocol (e.g., CCITT). The digital signal is input to micro-controller 242 which separates the non-voice data packets from the voice data packets. Periodically, the data extracted from the non-voice data packet is output via serial port 232 to the computing/gaming device 218(216). Voice data packets are sent to the DSP 240 periodically which then decompresses the voice packet to generate a digital voice signal. The digital voice signal is decoded and converted to analog format at decoder 238. The analog voice signal then is output via DAA 236 and port 230 to telephone 222(220).

Also shown are an engage button 250 and status light 252. With voice communication between sites 212 and 214 occurring via phones 220, 222, each user presses their respective engage button 250 to initiate voice/non-voice data communication. The status light 252 indicates power "on" and the establishment of the voice/non-voice data connection (i.e., device "on-line"). In one embodiment, the status light is red at power on, flashing yellow while the apparatus is connecting, and green once connected.

As described the interface apparatus 210 includes a data access acquisition device 246, coder/decoder 238, digital signal processor 240, controller 242 and modem 244. The data access arrangement device 246 is a standard FCC-approved device for interfacing an analog or digital phone, or a modem, to the analog-based PSTN 215. In one embodiment, DAA model nos. CH1834 from Cometek, Inc. of Sunnyvale, Calif. is used. In another embodiment the DAA functions are formed using discrete component logic on the micro-controller board.

The coder/decoder device (CODEC) 238 includes digital to analog and analog to digital converters for conditioning signals. In one embodiment the CODEC is one of the National Semiconductor TP305X family. The device 238 includes transmit high-pass and low-pass filtering, receive low-pass filtering with correction, u-law and A-law compatible coder and decoders meeting CCITT specifications.

The digital signal processor (DSP) 240 is an integrated circuit microcomputer optimized for digital signal processing, such as voice compression/decompression. In one embodiment, model no. 1616A DSP from ATT is used and a conventional compression/decompression algorithm is used. In another embodiment, the Q4400 VOCODER from Qualcomm, Inc. of San Diego implements the ATT 1616A. The DSP operates at a 33 ns instruction cycle time and includes on-chip memory. As configured for this application, the DSP 240 executes an LPC program for compressing and decompressing voice data into data packets. In a specific embodiment a 2400 baud LPC program (e.g., LPC-10E) is used. In another specific embodiment a CELP (e.g., FS-1016) process is used for compression/decompression. In the preferred embodiment, a 4000–9600 baud voice compression/decompression algorithm is used. In a specific embodiment, the modem is formed by a Phylon, Inc. PHY1001 and PHY1002 chip set. The modem is CCITT standard V.32 for 9600 baud full duplex transmission over the PSTN. A parallel link is maintained between the modem 244 and micro-controller 242.

Micro-controller 242 is a single chip microcomputer which (1) receives the voice data and non-voice data for output over the PSTN 215; and (2) separates voice data and non-voice data packets received over the PSTN 215. In a specific embodiment, the micro-controller 242 is a PIC 17C42 8-bit microcomputer operating at 16 MHz and including on-chip memory, an 8-bit data path and 16-bit instructions. In addition, a clock is included for sourcing synchronization signals.

Configuration, Connection and Communication Processes

Operation of the interface apparatus 210 involves a configuration process, connection process and a communication (i.e., mixing) process. During the configuration process, operating parameters are selected. Parameters to define the operating mode, connection timing, data link timing and data sensitivity are selected. Regarding the operating mode, the interface apparatus 210 operates either in data mode (i.e., performing conventional data modem communications) or in voice/non-voice data mode (i.e., performing concurrent full-duplex voice/non-voice data communication). Regarding the connection timing, the connection between two interface apparatii is either synchronous or asynchronous. With regard to the data link timing, the data communication link between the apparatus 210 and a computing/gaming device 216 is either synchronous or asynchronous. With regard to the data sensitivity, the data from the computing/gaming device 216 is either time-critical or not time-critical. In the preferred embodiment, the apparatus is configured for voice/non-voice data mode with an asynchronous modem connection and a synchronous DTE data connection and time-critical data. The configuration process is performed through design choice or a separate configuration routine executed while the interface 210 is off-line.

To achieve a connection between two interface apparatii 210, a phone link is established and the apparatii 210 are powered on. A connection then is initiated via a one-button engage process. A user at each site presses their engage button 250. Each apparatus 210 queries the other to look for a response signal. When a response is detected, an originate mode is entered at one site and an answer mode is entered at the other site. The connection then is complete.

The connection then is maintained during the communication process. During the communication process, voice data packets and non-voice data packets are sent together as a communication signal over the public switched telephone network (PSTN). According to one embodiment, non-voice data packets have a higher priority than voice data packets. Thus, if both a non-voice data packet and a voice data packet are ready for transmission, the non-voice data packet is sent first followed by the voice data packet.

FIG. 11 is a timing diagram showing communication flow in one direction from a local site 212 to a remote site 214. Signal 253 depicts timing of voice data packets at micro-controller 244 available in an output buffer for transmission. Signal 255 depicts computer non-voice data packets at micro-controller 244 in an output buffer available for transmission. Signal 257 depicts the modem 244 transmit signal sent over the PSTN to the second site 214 (e.g., remote site). Signal 259 depicts the corresponding signal received at the modem 244 at the second site 214. Signal 261 depicts the extracted non-voice data packets queued for output to the computer 218 at the second site 214. Signal 263 depicts the extracted voice data packets available to be read by the DSP 240 at the second site.

For an implementation configured for asynchronous, non-critical non-voice data, the non-voice data is collected and transmitted in bundles to reduce overhead. For an implementation configured for synchronous or time-critical data, it is desirable to minimize transmission delays so that non-voice data is available for the computing devices 216, 218 each frame. To do so, a non-voice data packet is transmitted (and expected to arrive) at regular intervals. The unused portions between time-critical non-voice packet transmissions is available for voice data packet transmission. In some instances transmission of an entire voice packet would interfere with the next non-voice packet transmission. In such cases, the voice packet is divided into smaller or partial voice data packets.

The executive determines whether there is enough bandwidth for an entire voice packet. To do so, the executive calculates a number of bytes that can be transmitted up to the point a time-critical task is scheduled to execute for a current modem connection rate (e.g., 9600 baud). If only a portion of a voice data packet can be transferred without interfering with the time-critical task, then the voice data packet is divided into multiple smaller or "partial" voice data packets.

The apparatus 210 can be configured to transmit time-critical non-voice data using a synchronous data connection or an asynchronous data connection. The data connection which is synchronous or asynchronous is the connection from computing device 216 to computing device 218 embodied by the interface apparatus 210 at each site. If transmitted over an asynchronous connection, data extraction and interface tasks at the local and remote sites run independently of the other site. To comply with the time-critical constraint, the tasks rely on the resident apparatus 210's internal clocks and the reliability of the PSTN 215. If transmitted over a synchronous connection, a master-slave relationship is implemented to coordinate data transfers. To maintain the master-slave relationship extraction and interface tasks synchronize to the transmission or reception of data.

Detailed descriptions of operating states of the micro-controller 242 software for implementing the connection and communication processes are described below.

Micro-Controller Operating States and State Transitions

Figure 12:
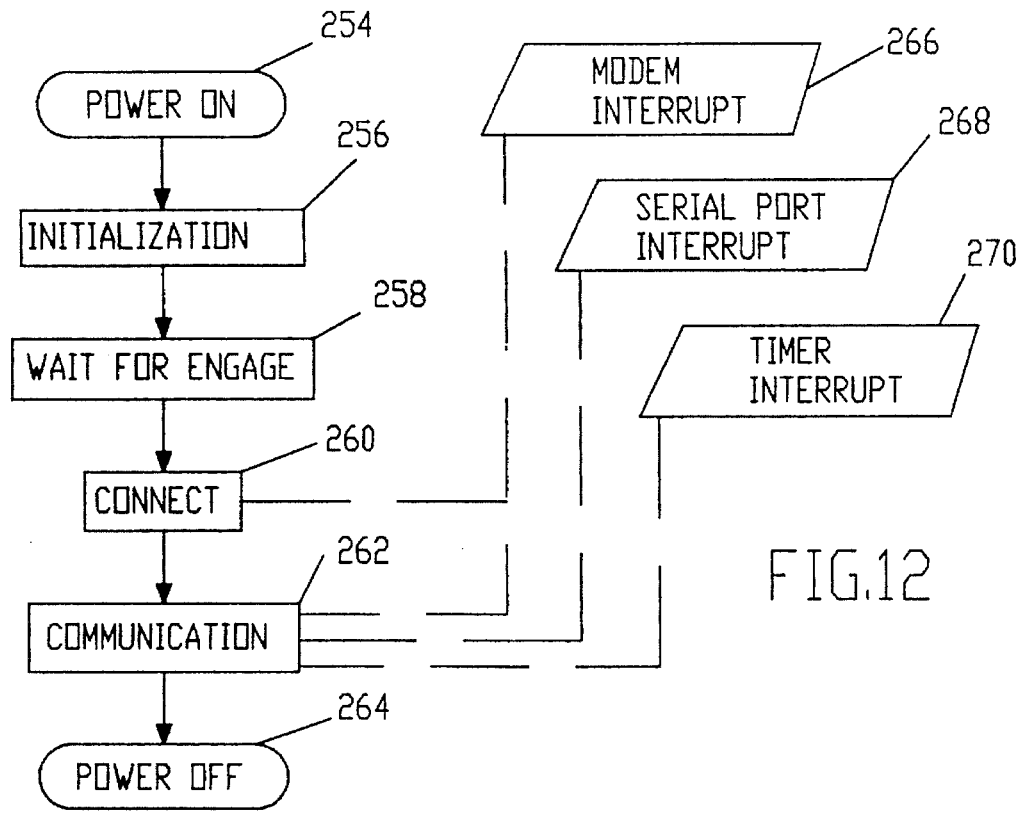
FIG. 12 is a high-level state diagram of the micro-controller of FIG. 10.

FIG. 12 shows a high-level state diagram of the micro-controller 242 software states. Upon power up 254, an initialization state 256 is entered. After initialization is complete a "wait for engage" state 258 is entered. During this state the apparatus 210 is "off-line". An engage button signal is periodically polled during this time to determine when an engage button 250 has been pressed. Once the engage button 250 is pressed, a "connect" state 260 is entered. During the connect state 260, a connection is established between the modems 244 at each site 212, 214. Once a connection is established, an on-line "communication" state 262 is entered. During the communication state 262, voice/non-voice data communications occur over the PSTN 215 via modems 244. The apparatus 210 operates in the communication state 262 until powered down at 264. In-line execution during the communication state 262 is interrupted aperiodically to service modem interrupts 266, serial port interrupts 268 and timer interrupts 270. Modem interrupts are used for maintaining communication and transmitting/receiving digital packets. Serial port interrupts are used for maintaining communication with the computing/gaming device 216/218. Timer interrupts are used for internal semaphore logic.

During the initialization state 256, the micro-controller 242 memory is "zeroed" its I/O ports are initialized. In addition, the modem 244 and DSP 240 are reset. A timer for the DSP 240 then is set. The computing/gaming data type then is set to asynchronous or synchronous data according to configuration parameters and internal registers are initialized. Lastly, modem, serial port and timer interrupts are defined and a monitor task is scheduled. The monitor task is time-driven, executing every 2.5 milliseconds (msecs).

During the "wait for engage" state, the monitor function periodically tests to see if the engage button 250 has been pressed. Once the monitor function senses that the engage button 250 has been pressed, the "connect" state is entered and the monitor function calls a "set-up connection" routine.

Figure 13:
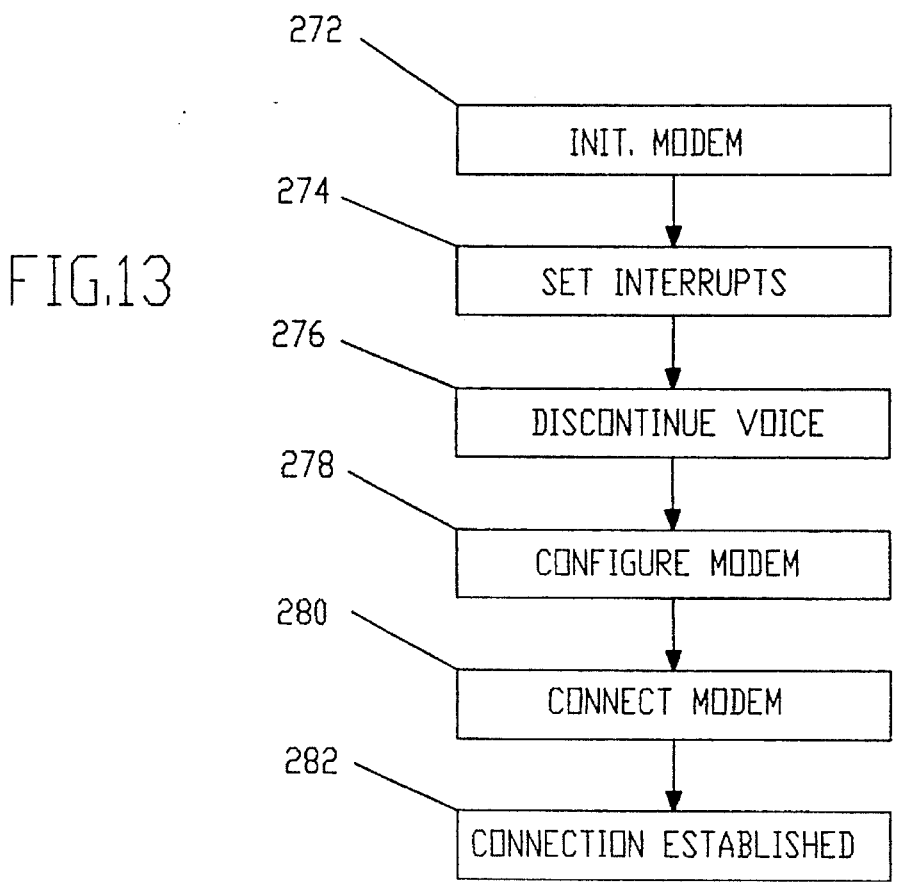
FIG. 13 is a flow diagram of a set-up connection routine of the micro-controller of FIG. 10 for establishing a voice/data connection between remote sites.

FIG. 13 shows a state diagram of connection set-up functions. First, the modem 244 is initialized at state 272 by sending a reset command to the modem 244 and periodically polling the modem for a reset complete signal. Once detected, modem interrupts are set at state 274 and the voice link between users at sites 212 and 214 is temporarily discontinued at state 276. Configuration commands then are sent to the modem 244 at state 278. The modem then determines whether it is to operate in originate or answer mode at state 278. The mode is determined by a negotiation protocol according to an embodiment of this invention. The protocol involves the sending and receiving DTMF signals. In one embodiment of the negotiation protocol, each modem 244 sends out a pulse corresponding to the # key tone for 100 msec, then listens for a * key tone. If a * key tone is not detected then the modem waits 100 msec and tries again. The process is repeated for a specified number of times (e.g., 5 times). If still no * key tone is detected, then the modem defaults to answer mode and looks for a # key tone. Once detected, a * key tone is sent out. During the mode selection and connection process time-outs are used at various steps to avoid endless loops. If the micro-controller does not detect a response tone within a pre-defined period, the executive control loop initiates a total system reset. When a * key tone is detected, the modem is assigned to originate mode. Via the negotiation protocol, the micro-controllers 244 at each site define a mutually exclusive modem mode, either originate or answer.

Each micro-controller 240 tells its modem 244 which mode it is to operate in based on the negotiation protocol results, then completes the modem configuration by sending out additional configuration commands. The modems then enter a conventional stage of connection. The originate modem looks for an answer signal, then starts its conventional connection procedure, while the answer modem goes directly to its conventional connection procedure. The "connection established" state 282 then is entered.

The "set-up connection" functions then are complete. The monitor task then schedules DSP interface and computer interface tasks and enters "communication" state 262. During the communication state the monitor task periodically checks the DSP 240, modem 244 and computing/gaming device 216/218 status.

Figure 14:
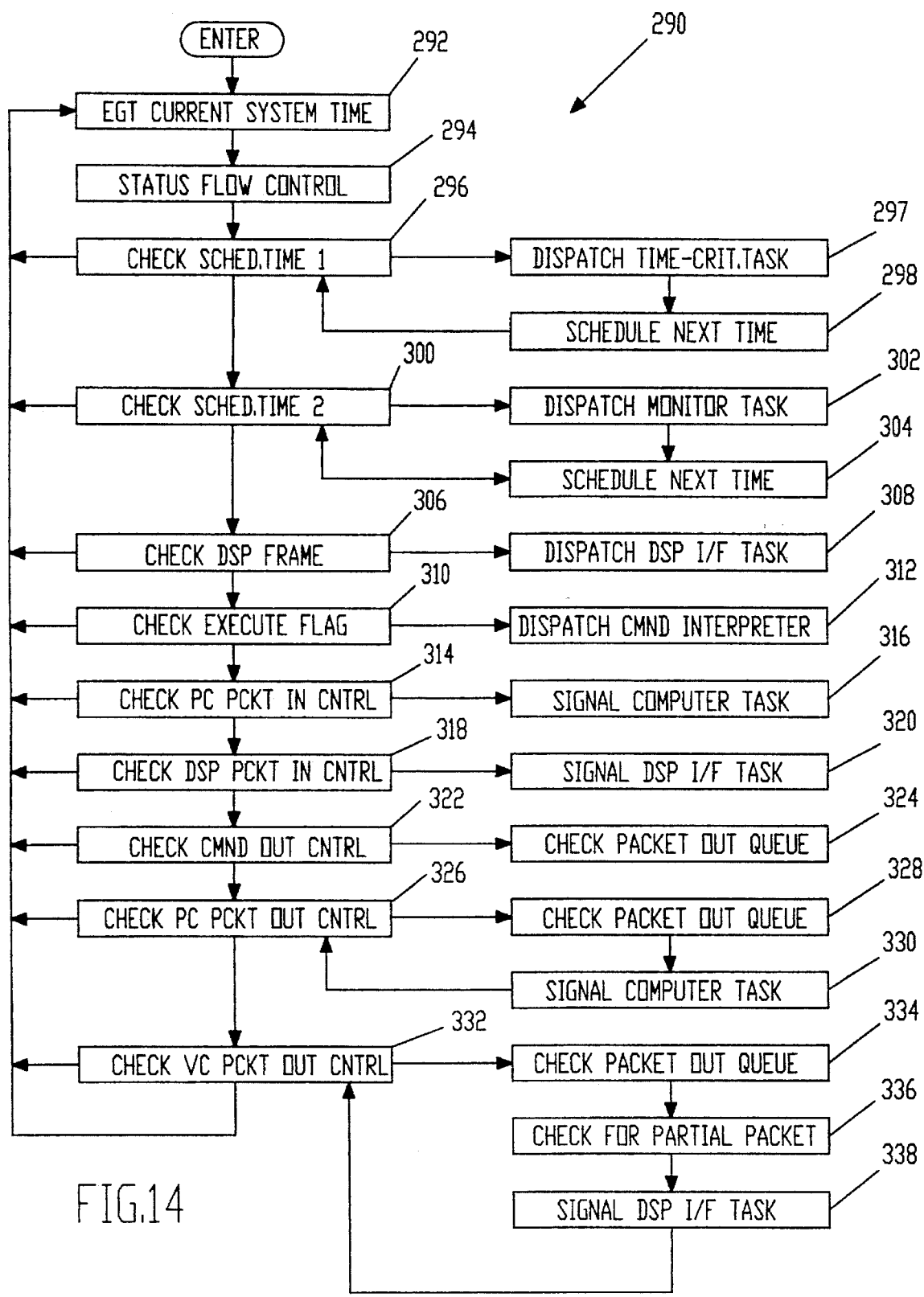
FIG. 14 is a state diagram of an executive control loop of the micro-controller of FIG. 10 for establishing and maintaining a voice/non-voice data connection between remote sites.

An executive control loop executes during the communication state 262. The monitor task, modem interface task and computer interface tasks are periodically called from the executive control loop. FIG. 14 shows a state diagram of functions performed during communication state 262 under the control of the executive control loop.

Below interrupt service routine processing is described, followed by descriptions of the executive control loop and the tasks called by the executive control loop, then descriptions of the data structures. Interrupt Services

MODEM INTERRUPT SERVICE:

The modem interrupt service routine is executed each time the modem 244 generates an interrupt to the micro-controller 242. Upon entry, the routine reads a one-byte status word to determine the reason for the interrupt. Two types of interrupts are supported: receive buffer full (RBF) and command buffer empty (CBE). The status word indicates either or both types of interrupts are to be serviced. When both are to be serviced, the RBF interrupt is serviced first. In general, both interrupts are serviced by checking for a new voice data or non-voice data packet, receiving (RBF) or transmitting (CBE) the data, and when complete, setting a "done" flag.

Figure 15:
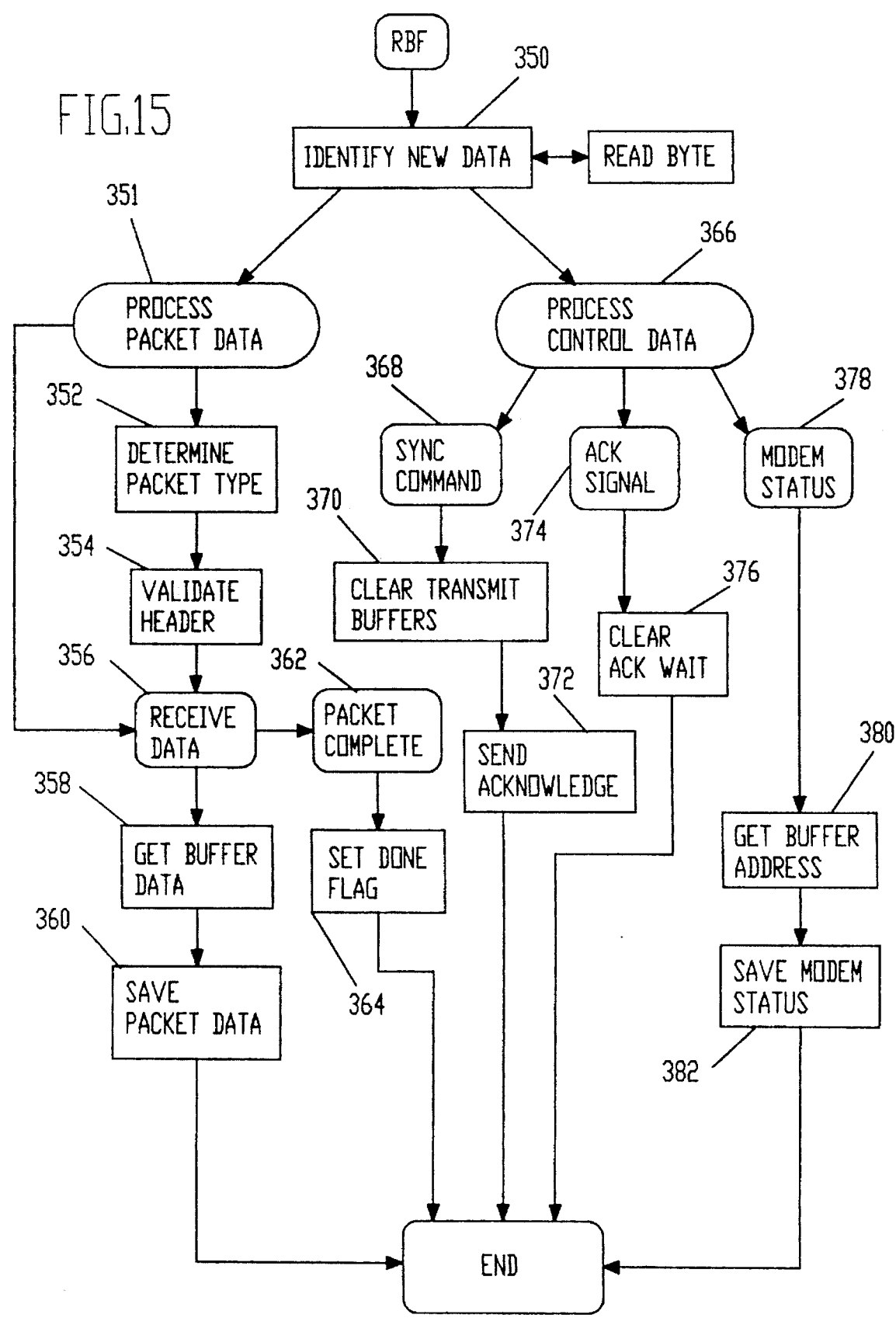
FIG. 15 is a state diagram of a modem interrupt service function implemented by the micro-controller of FIG. 10 for receiving data from a local modem.

The Receive Buffer Full (RBF) interrupt service routine processes all control and data input from the modem. Referring to FIG. 15, a two-byte data input word is identified at step 350 as either packet header data (branch 351) or system control data (branch 366). A packet header can be either a voice packet or non-voice packet. Once the packet type has been determined (step 352), the information in the header is validated (step 354) and the receive control registers are appropriately configured. All subsequent input (step 356) is treated as packet data until the specified number of bytes has been received. During input the data buffer address is retrieved (step 358) and the packet is saved (step 360). The packet is then marked complete (step 362) and a "done" flag is set (step 364).

For the case where the input word identifies system control data (branch 366), the type of control data is identified. The control data types include: synchronization commands, acknowledgment signals, and various forms of modem status information. For a synchronization command (branch 368) current transmissions are halted (step 370), and a synchronization acknowledgment signal is configured for transmission (step 372). For an acknowledgment signal (branch 374), the acknowledgment wait state is cleared (step 376). For modem status information (branch 378), the buffer address is retrieved (step 380) and the status information is placed in a modem status buffer (step 382).

Figure 16:
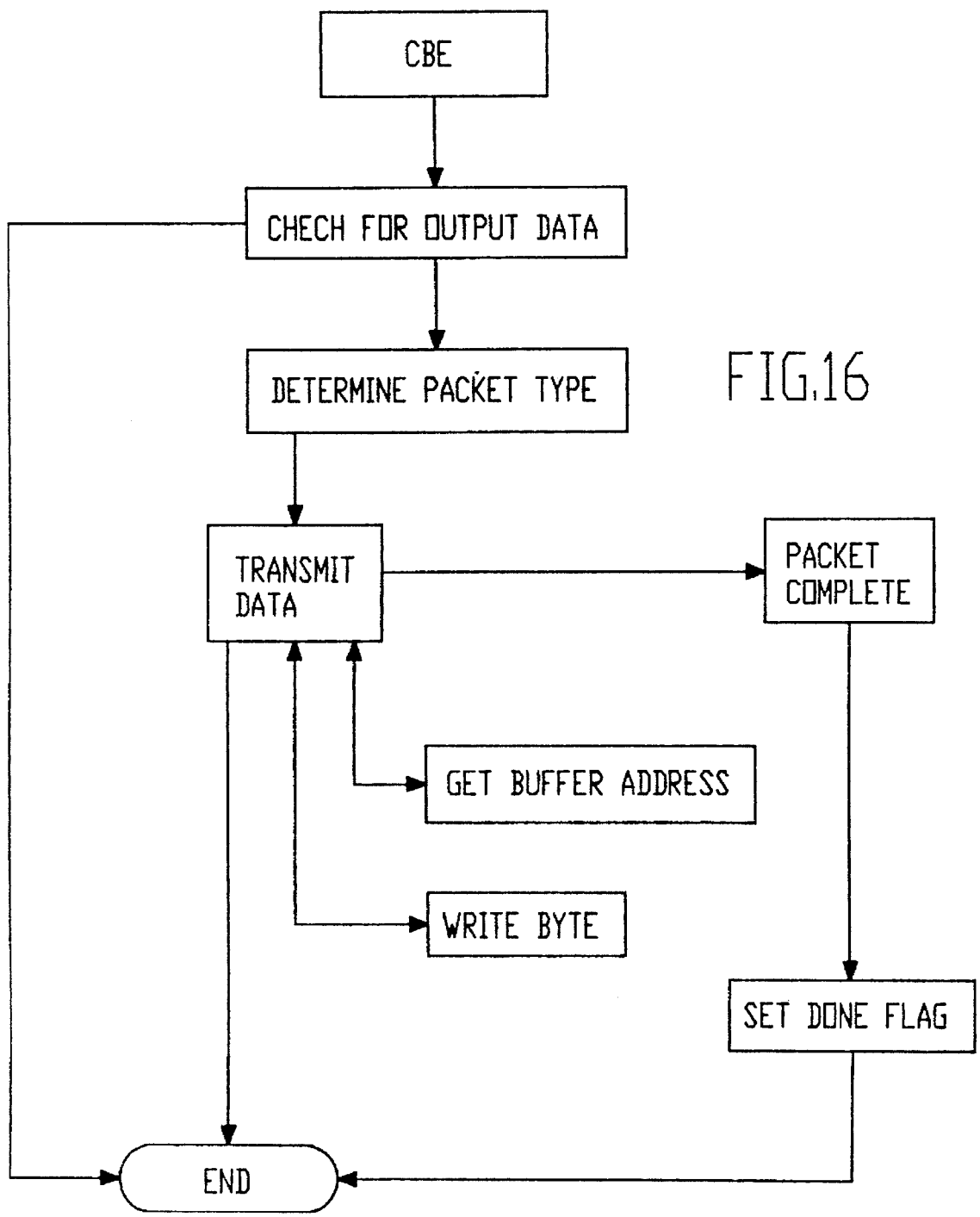
FIG. 16 is a state diagram of a modem interrupt service function implemented by the micro-controller of FIG. 10 for transmitting data to a local modem.

The Command Buffer Empty (CBE) interrupt service routine transmits control or data output to the modem. Referring to FIG. 16, the CBE service routine checks for any data output when the CBE flag is set (step 390). If data is queued for output, the appropriate buffer location is determined by packet type (step 392), then a two-byte data word is transmitted to the modem (step 396). For each transmission the output data buffer address is retrieved (step 398), then the data is sent (step 400). When a packet transmission is complete (step 402), a packet transmission complete flag is set (step 404).

Figure 17:
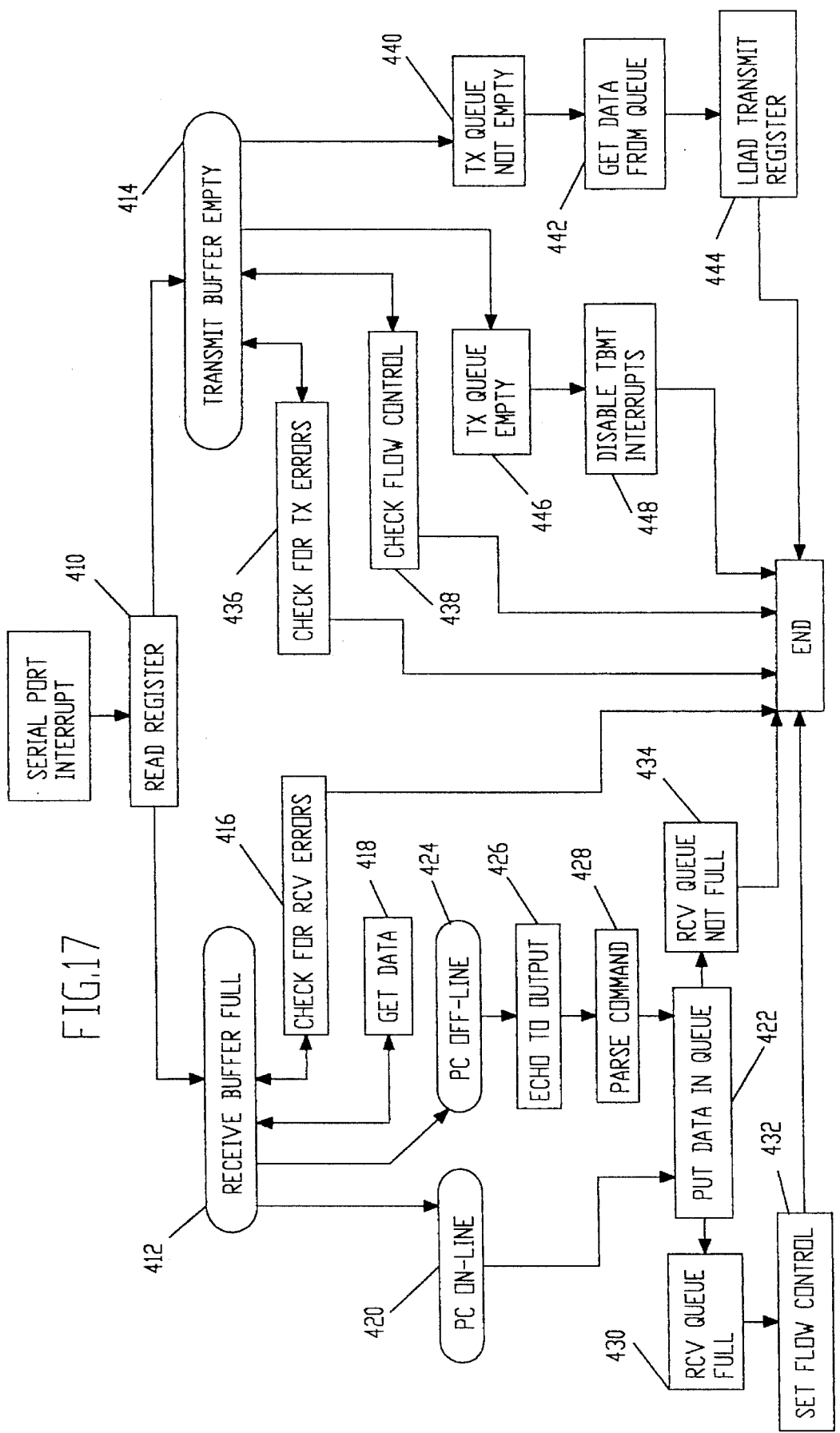
FIG. 17 is a state diagram of a serial port interrupt service function implemented by the micro-controller for communication between the micro-controller Of FIG. 10 and the computing/gaming device of FIG. 9.

SERIAL PORT INTERRUPT SERVICE:

The serial port service routine is an interrupt-controlled function triggered by an internal interrupt from the micro-controller 242. The states of the serial port service routine are shown in FIG. 17. When a serial port interrupt occurs, the service routine tests the micro-controller 242 interrupt status register to determine which serial port interrupt is to be serviced (step 410). Two types of interrupts are supported: receive buffer full (RBFL) (state 412) and transmit buffer empty (TBMT) (state 414).

For an RBFL interrupt, the serial port registers are checked for receive errors (step 416). If no errors are detected, the data in the receive register is moved to a temporary location (step 418). If the executive controller is in an on-line mode (state 420), the data is placed in the serial port input queue (step 422). If the executive controller is in an off-line mode (state 424), the data is echoed back to the serial port output queue (step 426) and then sent through the command parser (step 428). If the serial port input queue is full (state 430), the hardware flow control is enabled (step 432). If not full (state 434), or after the hardware flow control is enabled, the service of the causal interrupt is complete.

For a TBMT interrupt (state 414) the serial port registers are checked for transmission errors (step 436). If no errors are detected at step 436 and hardware flow control is not enabled (step 438), then data is taken for state 440 from the serial port output queue (step 442) and put into the transmit register (step 444). If the serial port queue is empty (state 446), the serial port transmit buffer empty interrupt is disabled (step 448).

TIMER INTERRUPT SERVICE:

The timer interrupt service routines are activated at programmed intervals to trigger a semaphore used by the executive control loop (see FIG. 14 and description below).

In one embodiment, timer interrupts are generated every second for tracking timer overflow and every 20 msec for strobing sample transfers between the DSP 240 and Coder/decoder 238. In addition, a watchdog timer resets the system after 4.6 seconds if not cleared by the monitor task on a regular basis. In-line Execution

EXECUTIVE CONTROL LOOP:

Referring to FIG. 14, the executive control loop 290 calls time-driven and semaphore driven tasks. Timer interrupts set flags for signifying when processing of the semaphore driven tasks are to be executed. The relative ordering of tasks in the control loop 290 determines the priority of the tasks.

During each pass, specific scheduled times are checked, the DSP frame is checked and semaphores are checked. Depending on the times and semaphores states, one of the following tasks are called: monitor task, DSP interface task, computer interface task, or the command interpreter.

At the start of each cycle, the current system time is sampled (step 292) and the status flow set (step 294). A first scheduled time is then checked (step 296). If reached, the first time is reset (step 298). Next, a second scheduled time is checked (step 300). If reached, then the monitor task is called (step 302). When complete, the time interval for recalling the monitor task is rescheduled (step 304). Next, the digital signal processor frame time is checked (step 306). If reached, then the digital signal processor interface (DSP I/F) task is called (step 308).

Next, semaphores are tested to see if an input command or input data packet is awaiting processing. At step 310, the execute flag is tested to see if an input command is pending. If pending, then the command interpreter is called (step 312) to process the command. At step 314, control data is tested to see if a complete non-voice packet has been received. If received, then the computer interface task is called (step 316). At step 318, control data is tested to see if a complete voice packet has been received. If received, then the DSP interface task is called (step 320).

Next, semaphores are tested to see if command outputs or output data packets are awaiting processing. At step 322, control data is tested to see if an output command is completed. If completed, then the serial port output queue is tested (step 324) to see if non-voice data is awaiting output via serial port 232. At step 326, control data is tested to see if a complete non-voice data packet has been transmitted. If transmitted, then the packet output buffer is tested to see if another packet is queued for transmission. If queued and throughput is available (step 328), then the computer interface task is called (step 330). At step 332, control data is tested to see if a voice packet has been transmitted. If transmitted, then the packet output buffer is tested to see if another packet is available (step 334), and the packet is checked to see if it is a small (i.e., partial) packet or a complete voice packet. The DSP interface task then is called (step 338). A pass of the executive control loop 290 then is complete, and the loop re-executed with step 292 by getting the new system time.

MONITOR TASK PROCESSING:

The monitor task operates in the same post-initialization states as the high level states shown in FIG. 12—wait for engage, connect, and communication. It is a time-driven task executed in one embodiment every 2.5 milliseconds. The monitor task initializes to the wait for engage state.

The monitor task functions include: clearing the watchdog timer, polling for an engage signal, initiating a set-up connection procedure, scheduling specialized tasks and controlling LED status indicators. It also determines the mode of the serial data port, the resolution of the DSP, and, when needed, performs modem synchronization.

Once the engage button 250 is pressed, the set-up connection routine is called (see FIG. 13), then the monitor task goes into the connect state. Once a connection is established between sites 212, 214, the communication state is entered. During the communication state, the DSP 240, modem 244 and computer 216(218) status are checked.

System monitoring functions are performed as part of the monitor task. A run-time status routine is executed for each of the primary system components: modem 244, DSP 240, and computing/gaming device 216(218). The modem status function monitors the modem connection status and looks for loss of carrier, retrain sequences, or unprocessed interrupts. The DSP status function is responsible for muting audio output during start-up transients.

The computer status function operates in one of two modes: off-line and on-line. In off-line mode input data from the computer 216/218 is treated as control input. In off-line mode input data from the computer 216/218 is transmitted to the other site. While in the off-line mode, the computer status function continually checks the serial port input queue. If the queue is full, the command interpreter is invoked. If the micro-controller 242 is in on-line mode, the computer status function monitors the serial port input queue. Any data present in the queue is moved to the computer packet output buffer and transmitted over the modem. When the data in serial queue is actually transferred to the non-voice data output packet is determined as a function queue content (i.e. full or not full), the current state of the modem service routines (i.e. already busy), and the last time the transfer function was executed (i.e. priority increases over time). The objective is to not cause unnecessary delays or data loss by overfilling buffers, yet not under-utilize the system bandwidth by sending lots, of sparsely filled packets. If in off-line mode and digital voice communication has been established, this routine configures the DSP flags for high-resolution voice. If in on-line mode and digital voice communication has been established, this routine configures the DSP flags for low-resolution voice.

The computer status function also is executed during start up to support system configuration commands prior to establishing a modem connection. During the set-up connection procedure modem initialization and DSP initialization is scheduled.

MODEM INITIALIZATION:

Modem initialization commands are executed during the set-up routine (ek_strt) invoked by the monitor task. The modem initialization process is monitored by a series of control flags contained in an executive status register (ek_stat).

The first step in the initialization process is to reset the modem 244 by pulling the reset line high. The reset line is earlier initialized low during the initialization state (ek_init routine). The time between executive initialization and the engage button detection is sufficient to meet modem specifications for holding the reset line low. The set-up connection routine then polls the modem for a reset complete signal. Once the reset is complete, modem interrupts are enabled, a rate sequence is established, power attenuation level is set, and the modem 244 is taken off-hook. The set-up connection routine then begins to determine whether the local modem is to operate in originate or answer mode by sending a signal tone and listening for a response tone. The micro-controller 242 signals and listens a total of five times. If after the fifth time a response tone is not detected, the micro-controller 242 reverts to a listen only mode and waits to respond to the signal tone generated by the far end device.

The micro-controller 242 responds to a signal tone by generating a response tone and configuring the local modem 244 to answer mode. If the micro-controller 242 detects a response tone, it configures the local modem 244 to originate mode. Once the mode is defined, the set-up connection routine continues the modem initialization process by sending configuration one, configuration two, and v.24 configuration commands. The set-up connection routine then begins the modem connection process. If the local modem is in originate mode, the set-up connection routine (ek_strt) looks for an answer tone from the remote modem 244. The set-up connection routine then waits for the local modem 244 to issue a data connection report. With a successful connection report, the modem start-up process is tagged complete.

The set-up connection routine issues one modem command each pass. A pass occurs each time the monitor task is called.

DSP INITIALIZATION:

DSP vocoder initialization commands are invoked from the monitor task (ek_mntr). Immediately following a successful connection by the modems 244, the DSP initialization process begins. A scheduler routine (ek_sched) configures the DSP interface task as an executive control loop task by enabling an external timer interrupt and requesting a DSP input packet. The DSP initialization (vc_init) causes a reset command to be sent to the DSP 240. The DSP initialization task then waits 200 msec and generates a 10 msec pulse on the vocoder reference strobe (VRS). A vc_bkgnd function is called to configure initial background noise. In one embodiment, all DSP initialization and configuration is done in a single pass of the monitor task.

DSP output is muted for the first few hundred milliseconds to compensate for transients during DSP initialization.

A DSP status function, executed as part of the monitor task, is responsible for turning the muting functions on and off. A limited set of validation checks verify each vocoder input packet. If a packet is not determined to be valid, the packet is blanked before being transmitted to the DSP. The data compression rate used for voice data is determined from flags set in a DSP control register (ek_mocod). Other DSP run-time control flags (i.e. mute flag, frame flag) also are located in the DSP control register.

Figure 18:
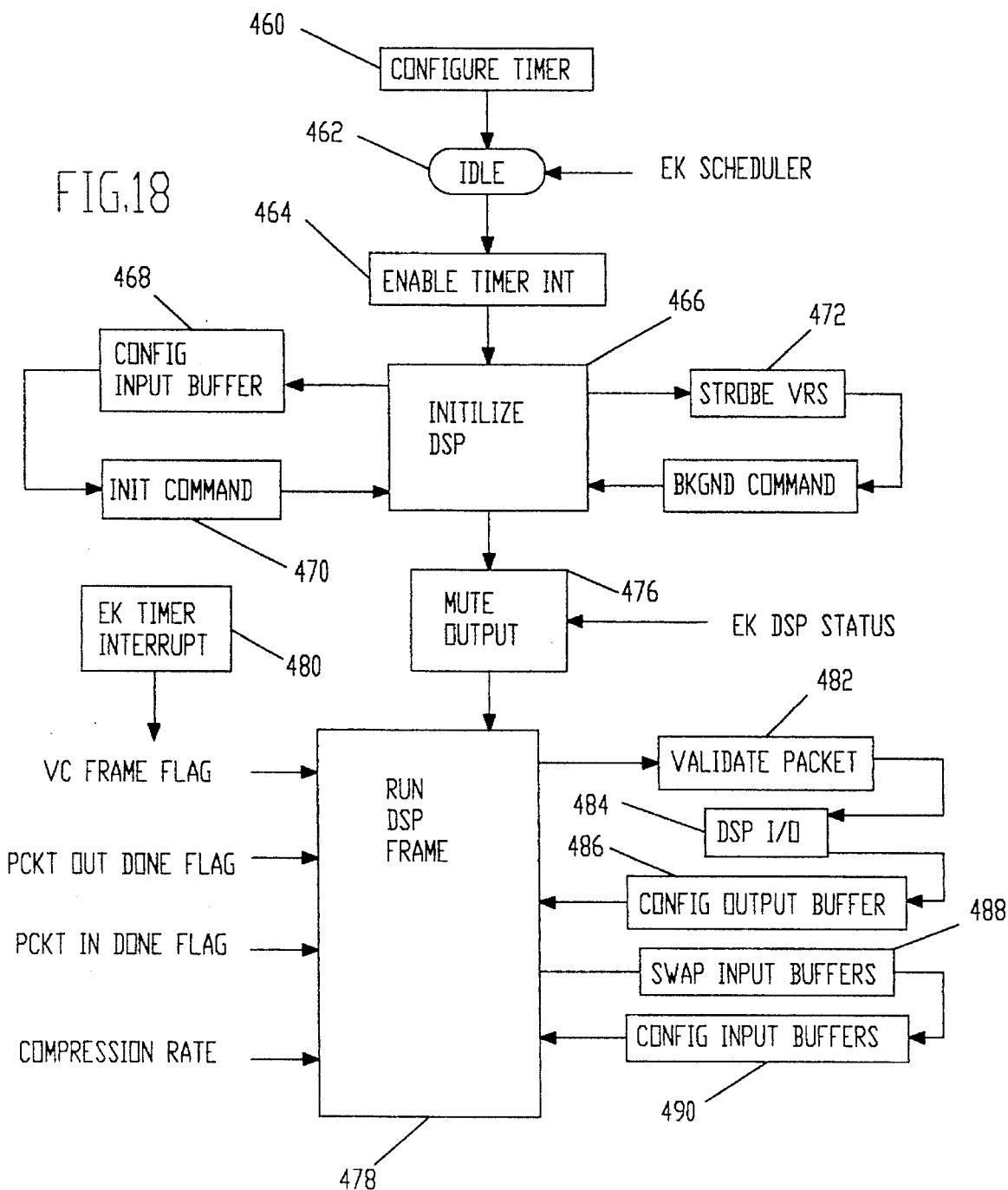
FIG. 18 is a state diagram of a DSP interface task executed by the micro-controller of FIG. 10.

DSP INTERFACE TASK PROCESSING:

The DSP interface task is a periodic task implemented using semaphores and an externally triggered timer. In one embodiment DSP frame time is determined by the same clock used to drive the coder/decoder 238 to avoid clock drift between the coder/decoder reference strobe and DSP audio sample rate. FIG. 18 shows the DSP interface task state diagram. A 20 msec timer is configured (step 460) at start-up as part of the executive initialization functions. The DSP interface task then remains idle (state 462) until activated by a scheduler—implemented as part of the monitor task. Once activated by the scheduler the frame time interrupt is enabled (step 464).

During an initialize DSP state 466, four sequential DSP initialization routines are executed: configure modem input buffer (step 468), send vocoder initialize command (step 470), strobe the vocoder reference (VRS) (step 472), and set the background noise level (step 474). A mute output state 476 is included to compensate for transient noise generated by the DSP when activated and is controlled by a DSP status routine as part of the monitor task.

A run DSP frame state 478 is implemented as part of the executive control loop (See FIG. 14 at steps 308, 320, 328). The DSP frame is indirectly triggered from a timer hardware interrupt (step 480). This activates DSP I/O operations (states 482,484) which cause one validated voice data packet to be transmitted from the DSP 240 and one voice data packet to be received by the DSP 240. If bandwidth is available the entire voice packet is already configured for transmission. If insufficient bandwidth, then the packet is divided into smaller packets so that a portion of the original voice data packet can be transmitted. The voice data packet then is configured in an output buffer for transmission over the modem (step 486). The compression rate of the DSP 240 and modem transfer rate are used to determine whether there is sufficient bandwidth. A packet output done flag signals that the packet modem transfer is complete. A packet input done flag signals that a voice data packet has been received by the controller from the remote modem. This causes the modem input buffers to be swapped (step 488) and the new buffer to be configured (step 490).

Figure 19:
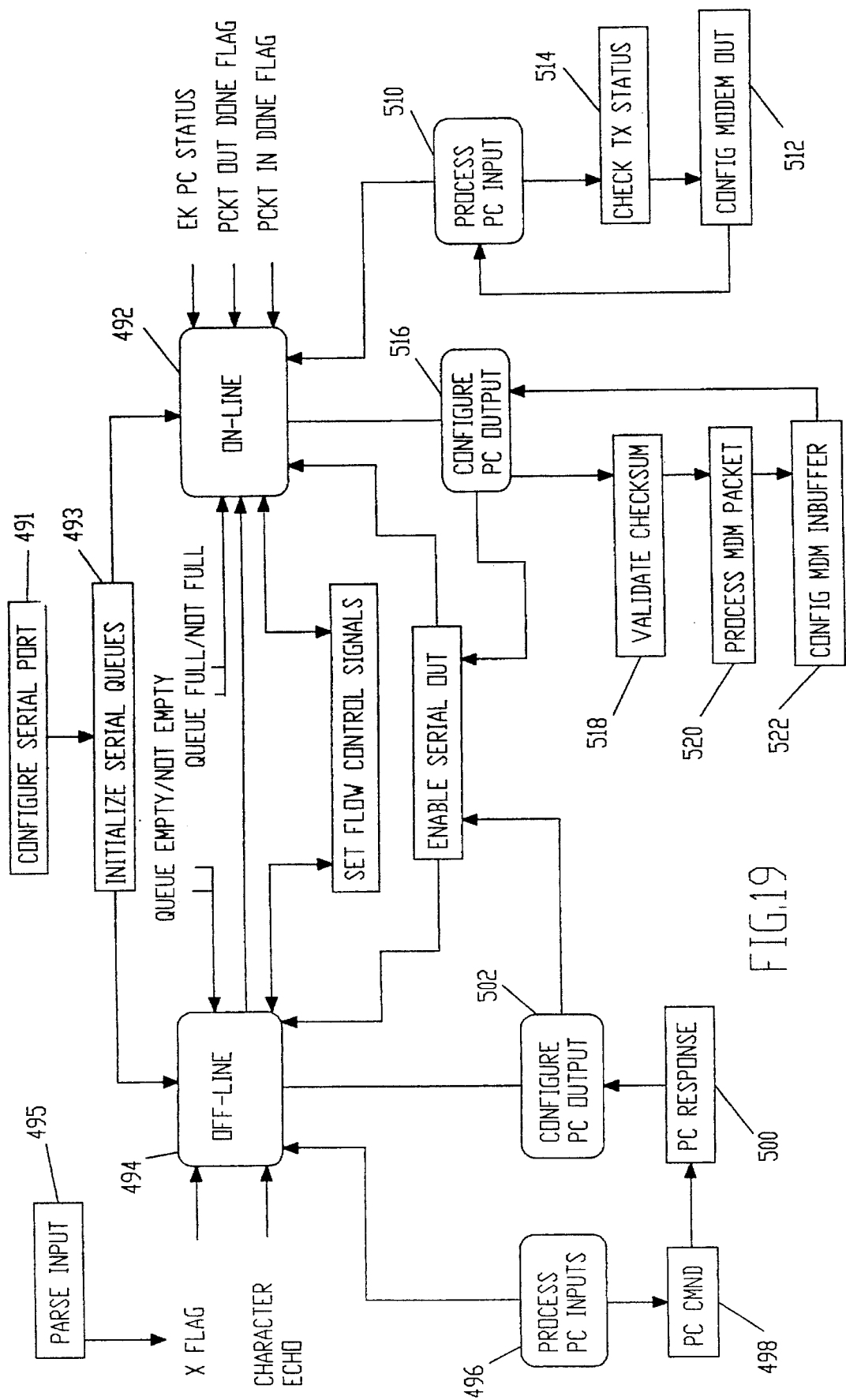
FIG. 19 is a state diagram of a computer interface task executed by the micro-controller of FIG. 10.

COMPUTER INTERFACE TASK PROCESSING:

The computer interface task is a semaphore-driven task for processing data transfers through the serial port 232. FIG. 19 shows a state diagram of the computer interface task. During initialization the serial port is configured (step 491) and serial port input and output queues are initialized (step 493). During the communication state 262, the computer interface task operates in one of two modes: on-line or off-line. Depending on the embodiment, the task initializes to either an on-line mode 492 or off-line mode 494. For an embodiment initializing to the off-line mode, a control command is issued to transition to the on-line mode 492.

During the off-line mode, processing of computer input data (state 496) is triggered by one of two events: an execute (X) flag being set or an input queue full flag being set. The execute flag is set as part of the parsing process (state 498) executed by the serial port interrupt routine. The queue full flag is also set in the serial interrupt routine and is routinely checked in computer status function executed by the monitor task. In the off-line mode, computer input data processing involves the interpretation and execution of the control command (state 498) in the computer input buffer, and the configuration of the output response (state 500). In the off-line mode computer output data is triggered (state 502) by command input being echoed back to the computer 216(218) and by responses to control input commands.

In on-line mode 492 computer input data processing is triggered in the computer status function executed by the monitor task. Execution time is determined using a dynamic priority scheme that is a function of time, current transmission state, last execution, and queue content. Processing of computer input data (state 510) in the on-line mode involves moving the data from the computer input data queue and configuring it as a modem output packet (state 512). A PC packet output done flag signals that the modem transmission process is complete (state 514).

In the on-line mode, computer output data is triggered (state 516) by the PC packet done flag signaling the reception of a data packet. If the data has a valid checksum (step 518), it is moved from the modem receive buffer to the serial port output queue (step 520). The modem receive buffer is configured to receive another packet (step 522).

Figure 20:
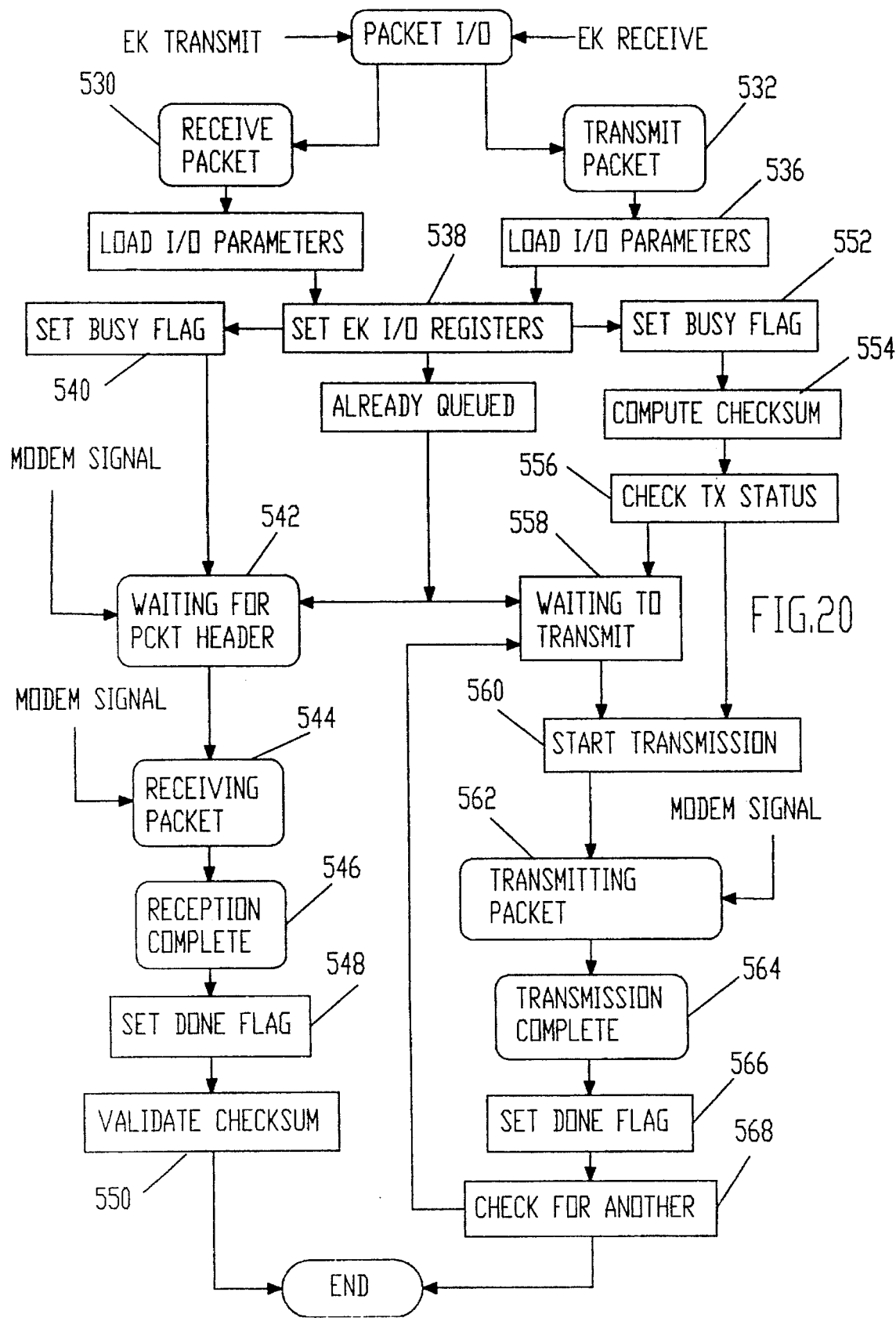
FIG. 20 is a state diagram of packet receive and transmission utilities implemented by the micro-controller of FIG. 10.

PACKET TRANSMISSION AND RECEPTION:

The packet transmission and reception routines are triggered indirectly by the executive control loop. FIG. 20 shows a data transmission and reception state diagram. Packet transfers (states 530, 532) are maintained using I/O control blocks. Input-output parameters are loaded into control blocks (steps 534, 536) by a calling routine and used by the executive to configure I/O buffer registers (steps 538).

When the calling routine requests a packet (state 530), the appropriate receive buffer is configured and the I/O control block is set busy (steps 540). The executive then waits for the modem service routine to detect and validate a packet header (state 542). The modem service routine collects the packet data (state 544) and signals the executive when the packet reception is complete (state 546). When complete a "done" flag is set (step 548). A checksum is used to validate the packet (step 550). The completion status is available to the calling routine, which can then process the received packet.

When the calling routine requests to transmit a packet (state 532), the appropriate I/O registers are configured (step 536) by the executive based on information provided by the calling routine. The corresponding I/O control block then is set busy (step 552), and a checksum is calculated (step 554). The executive then checks the current transmission status (step 556). If a transmission is already in progress, the requested packet transfer is queued (state 558). Otherwise, the transmission process is started (step 560, state 562). The modem service routine signals the executive when the packet transmission is complete (state 564). When complete, a "done" flag is set (step 566). The completion status is available to the calling routine, which can then process another packet. The executive then checks for any transfer requests that are in the transfer queue (step 568). While it is possible to have multiple I/O blocks queued for transmission or reception, the executive preferably transmits or receives one packet at a time.

SYSTEM RE-SYNCHRONIZATION

Figure 21:
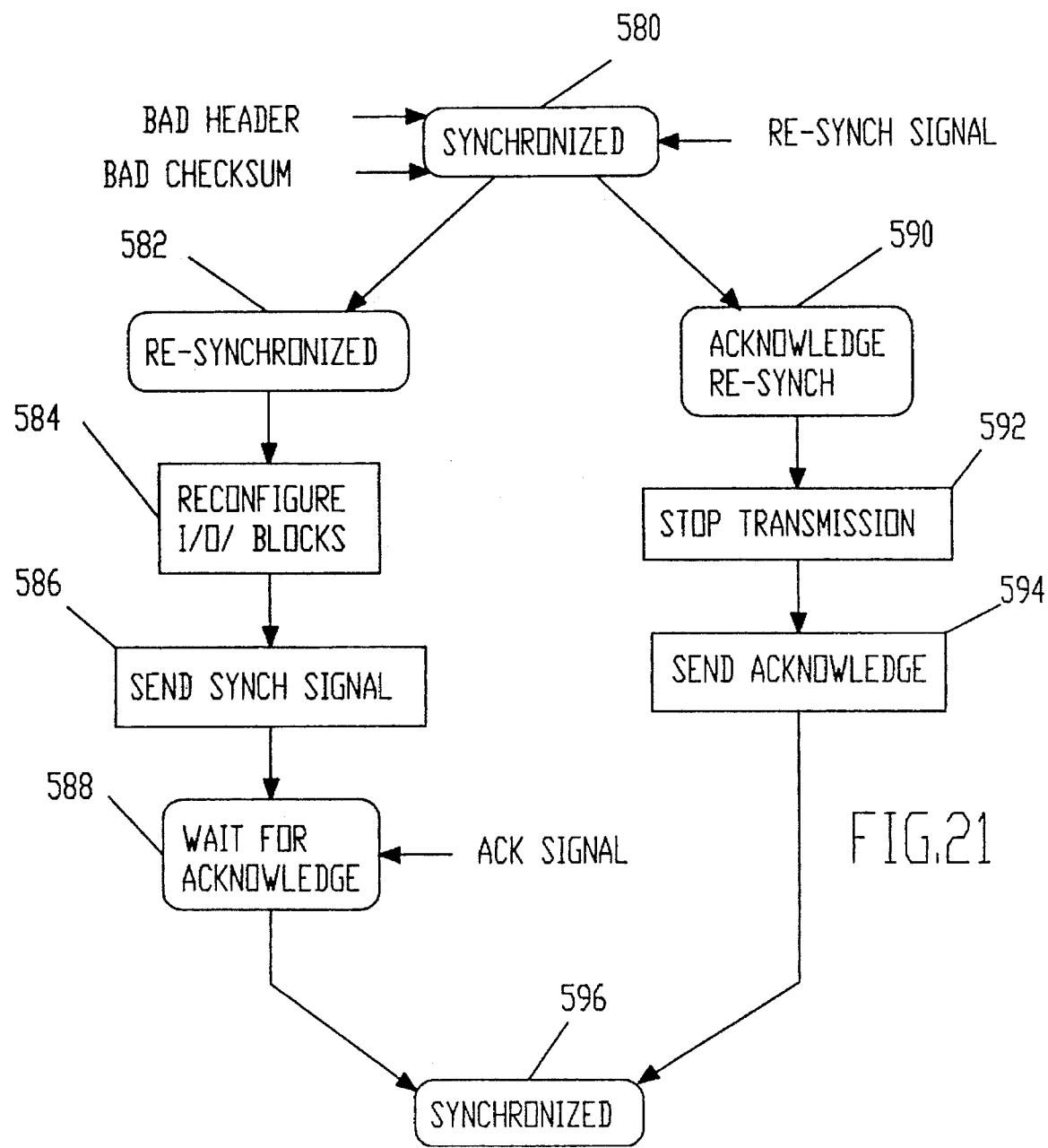
FIG. 21 is a state diagram of a re-synchronization function implemented by the micro-controller of FIG. 10.

When a data transmission error causes the system to lose synchronization (i.e. misinterpret header and/or data information), a re-synchronization sequence occurs. FIG. 21 shows a state diagram for the re-synchronization sequence.

When the executive control loop detects an erroneous header or calculates an erroneous checksum, the sequence is triggered (state 580, 582). Re-synchronization begins by the detecting micro-controller 242 re-configuring its modem reception buffers (step 586) and transmitting a re-synchronization signal (step 586) to the down-line micro-controller 242 at the other site. The triggering micro-controller 242 then waits for the re-synchronization signal to be acknowledged (588) from the other site. The micro-controller 242 at the other site acknowledges the re-synchronization signal (state 590) by terminating any transmission in progress (step 592) and sending an acknowledgment signal (step 594). When the originating micro-controller 242 receives the acknowledge signal, the re-synchronization process is complete (state 596).

Data Flow

Non-voice data originates at a computing/gaming device 216/218 and is sent via serial link to the micro-controller 244. A serial port interrupt service routine (see FIG. 17) receives the data and places it in a serial port data queue. The computer interface task (see FIG. 19) then configures the non-voice data into a non-voice data packet and sets a transmission request.

Voice data originates as an analog voice signal from the telephone 220/222. The analog signal is converted to digital format, then compressed and packaged by the DSP 240. The DSP outputs the voice data packet to a buffer. A DSP interface task is executed periodically by the micro-controller 244 which reads the voice packet from the buffer. The DSP interface task determines whether there is bandwidth for the entire packet. If not, the packet is divided into smaller packets. The DSP interface task then sets a transmission request for the complete packet or for a smaller divided "partial" packet.

Packet transmission routines (see FIG. 20) respond to the transmission requests by defining an I/O control block for transmission of one or more packets (according to the available bandwidth). The modem 244 then transmits the packets and they are thereafter received at the other site's modem 244. Receive routines (see FIG. 20) at the other micro-controller 244 detect the input. Modem interrupt service routines (see FIG. 15) separate the non-voice and voice data packets setting a corresponding done flag to indicate packet received.

Non-voice packets are processed by the computer interface task (see FIG. 19), which extracts the non-voice data and queues it up and enables its output to the computing/gaming device 216/218. Voice data packets are processed by the DSP interface task (see FIG. 18), which moves the packet to a buffer. The buffer contents then are output to the DSP 240 during a swap of packets with the DSP 240.

Data Structures

The data structures include control registers, I/O control blocks, I/O buffers, communication packets and serial port data queues (e.g., serial port input queue, serial port output queue). The control registers include an executive control register for monitoring (i) operating state (e.g., initialization, wait for engage, connect, communication), (ii) system time, and (iii) data protocol (e.g., pc data, game gear data, game boy data). Task control registers track the status of individual tasks. I/O control registers support various I/O functions. Test registers monitor system performance. Most of the data memory is allocated to I/O. An I/O control block is defined for every data buffer. Following are description of the I/O related structures.

I/O Control Blocks:

There is a specific I/O control block associated with each of the following I/O buffers: modem status packet (dr_ecntl), modem control packet (dt_ecntl), computer receive packet (dr_gcntl), computer transmit packet (dt_gcntl), voice receive packet (dr_vcntl), and voice transmit packet (dt_vcntl). Each I/O control block contains four registers: a block control register (io cntl), buffer address register (io addr); byte count register (io cnt), and error count register (io err). The I/O control register contains three status flags: a CNTL flag indicates that the packet contains modem control data; a DONE flag indicates the transfer of the data is complete; a BUSY flag indicated the transfer of the data is in progress. The block control register also contains the size of the associated data buffer. The buffer address register contains the location of the data buffer. The byte count register is used to track status of data transfers in progress. The error count register is a count of all transmission errors accumulated during data transfers.

There are three executive control registers used in conjunction with the I/O control blocks: ek_id—a working register used to store the address of a specific I/O control block, ek_cnt—a working register used to store the desired byte count, and ek_addr—a working register used to store the location of the data buffer. The working registers are used by generic executive functions. Each specialized task loads these working registers with values for a specific I/O control block prior to calling an executive I/O function (i.e. dr_in, dr_out) which will configure the appropriate control block.

When a specialized task requires data input, the input control block for the desired packet is configured and the BUSY flag is set. When the modem input driver has completed the data input process, the BUSY flag is cleared and the DONE flag is set. The input data is then available to the specialized task. When a specialized task requires data output, the output control block for the desired packet is configured and the BUSY flag is set. When the device specific output driver has completed the data output process, the BUSY flag is cleared and the DONE flag is set. The output buffer is again available to the specialized task. The I/O control block monitors the progress of the I/O. The io_addr component of the I/O control block is used to identify the current active location within the I/O buffer.

I/O Buffers:

A modem status input buffer and modem command output buffer are used by the executive to communicate with the modem. Each buffer supports a single word (2 byte) modem command or command response.

To receive a modem status packet, the micro-controller 242 first configures the buffer I/O control block using executive control registers. The ek_id register is loaded with the address of the control block—in this case the executive receive control block (dr_ecntl). The ek_addr register is loaded with the status input buffer address, and the ek_cnt is loaded with the value two. A utility dr_in is invoked and uses these values in configuring the control block. The micro-controller 242 then waits for the DONE flag in the control block to be set, indicating a modem status packet has been received. Similarly, the micro-controller 242 transmits a modem command packet by configuring the executive transmit control block (dt_ecntl) with the address of the command output buffer. The control block is configured and transfer is initiated using a generic function dt_out. The DONE flag in the control block is set indicating that the transmission is complete.

Non-voice data packet:

A non-voice data packet input buffer and non-voice data packet output buffer consists of a packet header and a number of data bytes. The header includes an input(output)

buffer address, control flag and a byte count. In one embodiment, a six data bytes are supported. For an embodiment supporting error detection, the last data byte is reserved for a checksum value. The receive buffer supports one packet, and therefore, is processed before another packet is received. The output buffer also supports one packet, so the transmission process is completed before the buffer is loaded with another packet.

To enable non-voice data packet input and non-voice data packet output, the same procedure described for modem status input and modem control output is used. For non-voice data input packets, a dr_gcntl I/O block is loaded with the packet input buffer address and the desired byte count (maximum six). Modem driver functions verify that the packet received does not exceed the desired number of bytes. For non-voice data output packets, a dt_gcntl I/O block is loaded with the packet output buffer address and the desired byte transfer count.

Voice data packet:

DSP (vocoder) I/O buffers are used to buffer data being transferred to and from the DSP vocoder, as well as, data being transferred to and from the modem. Because these buffers serve a dual role, the data structure and control logic is a little more complex. Both functions are described here.

The vocoder transmit command tells the DSP 240 to transmit a voice packet to the micro-controller 242. The transmit command packet consists of the packet byte count, the transmit command, high and low data rate thresholds for the next frame, and a checksum. The transmit response packet contains the response byte count (variable depending on compression rate used), a command acknowledged signal, command echo, voice data, and check sum. The voice response packet is placed in one of two response buffers.

These buffers serve a dual function, acting as the transmit buffers for the modem voice packets as well. To transmit a voice packet, a dt_vcntl I/O control block is configured with the address of the desired buffer (modem transmit buffer 1 or modem transmit buffer 2). The byte count is determined by the compression rate being used.

The vocoder receive command tells the DSP 240 to receive a voice data packet from the micro-controller 242. The receive command packet consists of the packet byte count (variable depending on compression rate used) and the receive command. The voice data is transmitted from one of two buffers. The receive response packet contains the response byte count, a command acknowledged signal, command echo, and a checksum.

The receive buffers also serve a dual function, acting as the receive buffers for the modem voice packets as well. To receive a voice packet, a dr_vcntl I/O control block is configured with the address of the desired buffer (modem receive buffer 1 or modem receive buffer 2).

Serial Port Data Queues:

The serial port input and output queues in one embodiment are implemented as circular first-in, first-out (FIFO) queues. A byte count in a queue control word tracks the number of data bytes in a queue at any given time. Two status flags in a respective queue control word signify queue empty or queue full. A "put" pointer determines where in the queue the next data byte is placed. A "get" pointer determines from which location the next data byte is retrieved. When the "get" pointer equals the "put" pointer, the queue is either empty or full as indicated by the control flags. When a data byte is to be placed in the queue, it is loaded in a temporary hold register. A queue "put" utility then moves the data byte from the temporary register to the put address. The "put" pointer is then incremented. If the "put" pointer is at the end of the queue it rolls over to the start of the queue. To retrieve a data byte from the queue, a get utility is invoked. The get utility moves a data byte from the get address and puts it into a temporary holding register. The "get" pointer is then incremented. If the "get" pointer is at the end of the queue it rolls over to the start of the queue.

In one embodiment, a data register sp_icntl is used to control the serial port input queue. Registers sp_iget and sp_iput are used as its pointers. In one embodiment, the serial port input queue supports five bytes. The data register sp_ocntl is used to control the serial port output queue. Registers sp_oget and sp_oput are used as its pointers. In one embodiment, the serial port output queue supports ten bytes. A temporary register sp_temp is common to both queues.

Micro-Controller Software Hierarchy

Figure 22:
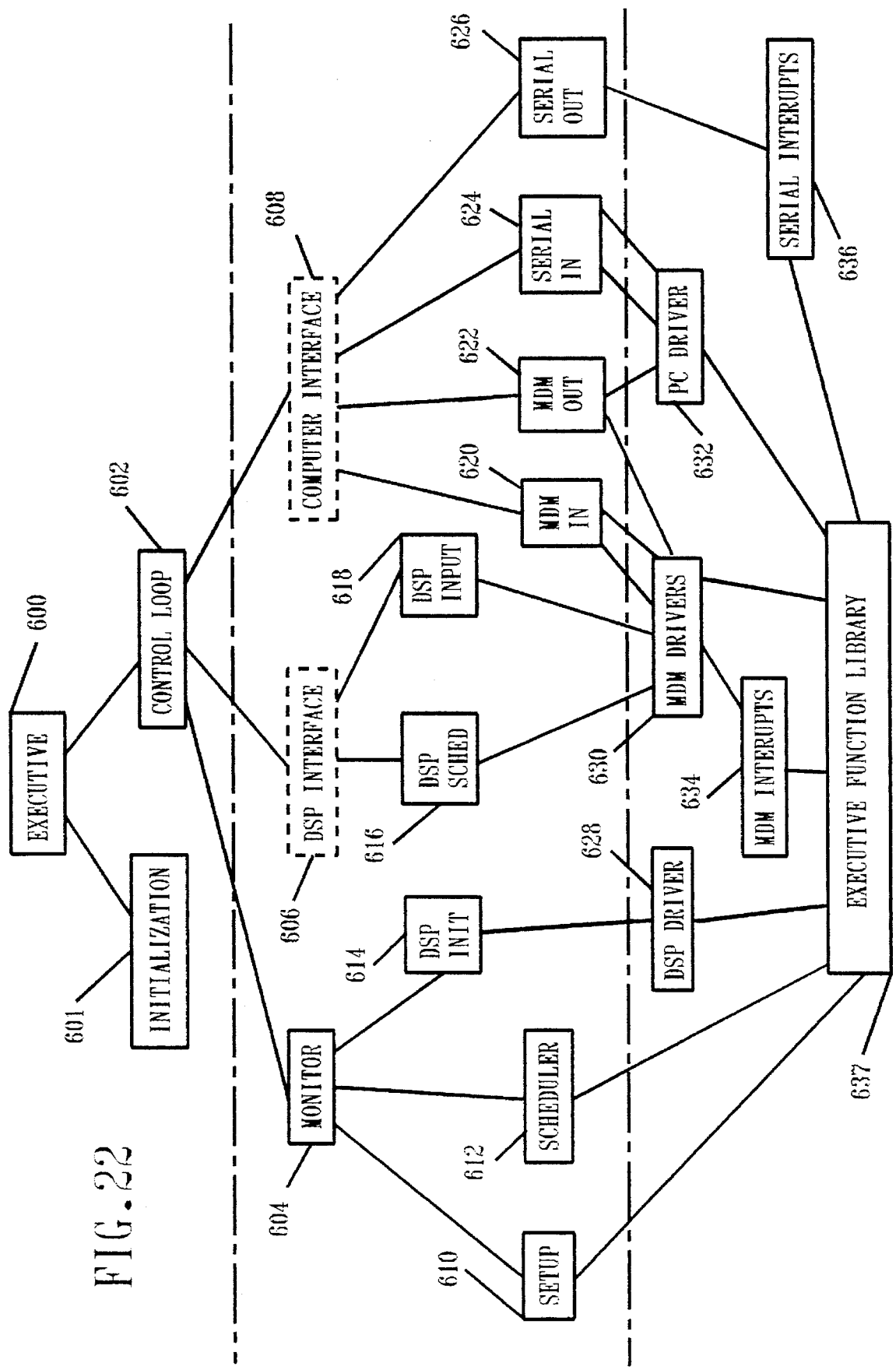
FIG. 22 is a module hierarchy of software routines executed by the micro-controller of FIG. 10.

FIG. 22 shows a module hierarchy of the micro-controller 242 software. The micro-controller 242 executes an executive 600 comprising an initialization routine 601 and the executive control loop 602. The executive control loop 602 periodically calls the monitor task 604, DSP interface task 606 and Computer interface task 608. The monitor task 604 calls the "set-up connection" routine 610, a scheduler 612, and a dsp initialization routine 614. The scheduler 612 schedule the DSP interface task 606 and computer interface task 608 for calls by the executive control loop 602. The DSP interface task calls the DSP output packet scheduler 616 and DSP input packet processing routine 618. The computer interface task 608 calls packet processing routines for packets input to and output from the modem 244 (routines 620, 622, 624, 626). Device drivers 628, 630, 632 are called for the DSP 240, modem 244 and computing device 216/218. Interrupt services routines 634, 636 interact with the serial data output routine 626 and the device drivers 630, 632. At the lowest level in the hierarchy is a function library 638 accessed by several routines.

Source code for the micro-controller 242 is attached as Appendix B. Following are module definitions for the listing. In a preferred embodiment, the source code is written in assembler code or in C language with in-line assembler code in a manner providing fast, efficient embedded code as would be appreciated by a programmer skilled in the art of communication protocols and device driver design.

Concluding Remarks

Although a preferred embodiment of the invention has been illustrated and described, various alternatives, modifications and equivalents may be used. For example, although a gaming device is described as the source of graphics data other graphics devices may be used. Therefore, the foregoing description should not be taken as limiting the scope of the inventions which are defined by the appended claims.

APPENDIX A

Pseudo-code Listing for Mixing Operation of Mixers
16,18

©1993, Advance Protocol Systems, Inc.

The following logic flow allows two gaming devices to establish a gaming link through the "mixer" without knowledge of the data message content and illustrates the mixer task operation in each of the primary modes.

```
G_POLL     if G_Mode is UNKNOWN
               if Modem_Rcv_Buffer is not NULL
```

-continued

```
                set G_Mode to MASTER
              end if
            end if
            if G_Mode is MASTER
              if G_Clock is LOW
                copy Modem_Rcv_Buffer to G_Xmt_Buffer
                reset Bit_Count
                set G_Mode to TIMING
              endif
            else if G_Mode is SLAVE
              if G_Frame is SET
                copy Modem_Rcv_Buffer to G_Xmt_Buffer
                reset Bit_Count
                set G_Mode to TIMING
              endif
            endif
            compute G_FrameTime
            add G_FrameTime to Current_Time
            to compute G_NextFrame
G_TIME      if G_Mode is MASTER
              if G_Clock is LOW
                load Transmit_Bit
              else if G_Clock is HIGH
                read in Receive_Bit
                increment Bit_Count
              end if
            else if G_Mode is SLAVE
              if G_Clock is LOW
                load Transmit_Bit
                set G_Clock HIGH
              else if G_Clock is HIGH
                read in Receive_Bit
                set G_Clock LOW
                increment Bit_Count
              end if
            end if
            if Bit_Count is EIGHT
              set G_Mode to DONE
            end if
G_DONE      copy G_Rcv_Buffer to Modem_Xmt_Buffer
            schedule Modem_Transmit task
            if OK to transmit
              if G_Mode is MASTER
                transmit Master_Game_Packet
              else if G_Mode SLAVE
                transmit Slave_Game_Packet
              end if
              set G_Mode to POLLING
            end if
```

The following logic flow describes in detail the operation of the executive task scheduler. The executive scheduler determines if modem bandwidth is available for use given different priority levels of data and voice transmissions.

```
E_SCHEDULER   if Game_Packet
                set Priority_Flag
              end if
              if Modem_Transmit task not DONE
                return NOT_OK
              end if
              if Priority_Flag
                configure Transmit_Packet
                set Modem_Transmit to TIMING
                return OK
              else
                if Current_Time plus VOICE_TIME
                is greater than G_NextFrame
                  return NOT_OK
                else
                  configure Transmit_Packet
                  set Modem_Transmit to TIMING
                  return OK
              end if
```

APPENDIX B

Micro-Controller Source Code

©1994, Advanced Protocol Systems, Inc. (unpublished).
Module Definitions
The source code used to implement the various executive controller functions has been grouped into a number of modules which are listed below. A module refers to a file in the source code sub-directory that contains one or more related functions and is identified using bold letters. A function or routine that is contained in a module is identified using italicized letters apsp2s.asm—This module contains the main routine providing the executive kernel functions used to control the APS PCB1 prototype board. This includes the power-up start vector and all external and internal interrupt vectors. This module is also used to include all other modules listed below.

regs.def—This module contains the system data memory definitions and allocations.

data.def—This module contains the application data memory definitions and buffer allocations.

exec.h—This module contains the executive parameter enumerations and the macro definitions.

ek.inc—This module contains the executive kernel monitoring and scheduling functions as listed below.

ek_init—The executive initialization routine configures the processor operating configuration, initializes system memory, and sets initial I/O pin configuration, including vocoder and modem reset lines.

ek_loop—The executive controller that maintains the internal system clock, dispatches tasks periodically, and handles task events.

ek_mntr—A periodic task used to monitor miscellaneous executive service functions such as system startup and run-time monitoring looks for the engage signal, activates specialty tasks, monitors run-time performance, and controls status signals (i.e. the led).

ek_zero—A function used to zero all processor data memory.

st.inc—This module contains the primary executive kernel functions used to initialize and establish the modem connection.

ek_strt—A function invoked by the monitor routine. sends the necessary commands to reset and configure the modem for data transfer.

ut.inc—This module contains various utility functions used by the executive controller and the other specialty tasks.

ek_ack—A function that sends an acknowledgment in response to a synchronization request.

ek_ccs—A generic function used to calculate checksums.

ek_chkmo—A function used to check for packets in the modem transmission queue.

ek_mdstat—A function used to monitor the operation of the modem interface tasks.

ek_pcstat—A function used to monitor the operation of the computer interface task.

ek_rd_rtcc—A generic function used to read the system clock.

ek_sched—A function invoked by the monitor task which schedules all specialty tasks, initializes modem input control blocks, and initializes the vocoder.

ek_sdmc—A function used to send a generic control command to the modem.

ek_setio—A generic function used to set up and configure a packet I/O control block.

ek_sync—A function that sends a request to re-synchronize the modem data transfer.

ek_vcstat—A function used to monitor the operation of the vocoder interface task.

pc.inc—This module contains the functions used to interface the system serial port with the computing device. The two primary components, serial port input and serial port output, run asynchronously.

pc_qinit—A function to initialize the serial input and the serial port output queues.

pc_putin—A function that puts a byte of data in the serial port input queue.

pc_getin—A function that gets a byte of data from the serial port input queue.

pc_putout—A function that puts a byte of data in the serial port output queue.

pc_getout—A function that gets a byte of data from the serial port output queue.

pc_inwait—(null) A function to process the PC serial input.

pc_outwait—(null) A function to process the PC serial output.

pc_mirqst—A function that configures an I/O control block to receive a packet of computer data via the modem interface routines. sets the I/O control block BUSY.

pc_miwait—A function invoked by the executive when the modem input of a computer packet is DONE. validates the game packet, requests synchronization on error, configures data for output to the computer.

pc_mowait—(null) A function invoked by the executive when the transfer of a computer packet is DONE.

pc_mdmout—A function used to configure a packet of computer data for transmission by the modem.

pc_mdmin—A function used to process a packet of computer data received by the modem.

pc_pars—A function used to parse character data received from the computer while the executive controller is off-line. sets the execute flag when a complete command has been received.

pc_cmnd—A function used to interpret and execute a command received from the computer.

pc_rspns—A function used to configure the command response for output to the computer.

pc_uppr—A function used to convert lower case characters to upper case characters.

vc.inc—This module contains the functions used to interface the vocoder with the controller. It has an initialization component and a runtime component to perform periodic synchronized data transfers.

vc_init—A function that configures the vocoder initialization command and initiates data transfer. pulses VRS and initializes the external timer.

vc_bkgnd—A function that initializes the vocoder background noise.

vc_mute—A function that mutes vocoder output during start-up transients.

vc_sched—A function that configures a vocoder receive command, initiates data transfer, and validates the response. then, configures a vocoder transmit command, initiates data transfer, validates the response, and configures a voice data packet for transmission by the modem.

vc_mirqst—A function that configures an I/O control block to receive a packet of vocoder data via the modem interface routines. sets the I/O control block to BUSY.

vc_miwait—A function invoked by the executive when the vocoder data packet input is DONE. swaps the vocoder receive buffer, and configures a new I/O control block.

vc_mowait—(null) A function executed when the transmission of the vocoder data packet is DONE.

dv.inc—This module contains a low level vocoder parallel bus driver that performs generic data transfers functions. The driver conforms to the protocol specified by the vocoder manufacturer.

dv_io—A function that performs a vocoder voice packet transmit followed by a voice packet receive.

dr.inc—This module contains the low level modem receive driver functions that initializes a specified I/O control block.

dr_in—A generic function used to set up the modem input I/O block.

dt.inc—This module contains the low level modem transmit driver functions that initializes a specified I/O control block and starts modem data transfer.

dt_out—A generic function used to set up the modem output I/O block, checks if modem transmission can be started, then initiates modem data transfer.

dt_chk—A function that checks if a critical timing packet is scheduled for output. If the system is operating in a critical timing mode, the voice packet may be broken up into smaller packets to avoid interfering with the transmission of critical data.

is.inc—This module contains the serial (USART) interrupt service routines. these routines are executed when either the serial receive register is full or the serial transmit register is empty.

is_svc—The data is either placed in or retrieved from the respective serial port input or output queue. Hardware implemented flow control signals are configured as appropriate.

im.inc—This module contains the modem interrupt service routines. These routines are executed when the modem receive buffer is full (RBF) or the modem command buffer is empty (CBE).

im_svc—A function that reads the status word provided by the modem to determine which interrupts need to be serviced. The RBF service function identifies the incoming data and deals with it appropriately. The CBE service function check for any data in the output queue and transmits it. Upon completion of the data transfer, the appropriate I/O control block (modem input, output, or control) is marked DONE.

im_out—A generic function that transmits a word or command to the modem.

im_read—A generic function that reads a byte of data from the modem.

im_write—A generic function that writes a byte of data to the modem.

im_has—A function used to strobe the host acknowledgment signal (HAS).

im_dly—A patch used to delay transmissions to the modem which prevents timing problems internal to the modem chipset.

gg.inc—This module contains the functions used to interface the system serial port with a Sega Game Gear device.

dg.inc—This module contains a low level serial port driver that performs data transfer functions specific to a Game Gear device.

gb.inc—This module contains the functions used to interface the system serial port with a Nintendo Game Boy device.

db.inc—This module contains a low level serial port driver that performs data transfer functions specific to a Game Boy device.

*.inc—These modules contain various test functions used to implement test procedures as defined in the system test plan.

```
        title   "APS Protocol II Software"
        list    n=48, t=ON, r=DEC
        processor       17C42

;****************************************
*       APS Prototype II Software       *
*       copyright 1993                  *
*       Advanced Protocol Systems, Inc. *
;**************************************** include "regs.def"
include "data.def"
#include "exec.h"

;page
;
; The following constants are used to allow testing of the
; software without any hardware.  By replacing the operational
; constants with the constants marked as ANSWER or ORIGINATE
; and using test versions of GB I/O driver, Vocoder I/O driver,
; and modem interrupt handler together with EK_TEST, the
; software will wrap its modem output back as input and operate
; in the selected mode.
;
GB#SDH          EQU     0
GB#SDL          EQU     10
MC#RDTH         EQU     0x68
MC#RDTL         EQU     0x00

EXPAND

;************ Code begins here ****************************
;
; Power up entry
;
        ORG     0x00            ; Reset Vector
;
POWER_UP        MOVLW   0               ; Zero
        MOVPF   WREG,RTCCL      ; RTCC low byte
        MOVPF   WREG,RTCCH      ; RTCC high byte
        MOVLW   0x2E            ; Select RTCC (1:128)
        MOVPF   WREG,RTCSTA     ; Set prescale value
        GOTO    EK_INIT         ; Go initialize executive
;
        ORG     0x08            ; INT pin interrupt vector
;
; Modem interrupt entry
;
MODEM_INT       MOVWF   im_wreg         ; Save WREG
        MOVPF   ALUSTA,im_sreg  ; Save ALU REG
        CALL    IM_SVC          ; Service interrupt
        MOVFP   im_sreg,ALUSTA  ; Restore ALU REG
        MOVFP   im_wreg,WREG    ; Restore WREG
        RETFIE                  ; Return
;
        ORG     0x10            ; RTCC timer interrupt vector
;
; RTCC overflow interrupt entry
;
RTCC_INT        MOVWF   im_wreg         ; Save WREG
        MOVLW   IR#RMR
        ADDWF   ek_clockrmr,F   ; Clock remainder
        MOVLW   1               ; Add to remainder
        ADDWFC  ek_clock,F      ; Real time increment
        MOVPF   im_wreg,WREG    ; plus carry
        RETFIE                  ; Restore WREG
                                ; Return
;
        ORG     0x18            ; RT pin interrupt vector
;
; Unused interrupt entry
;
UNUSED_INT      RETFIE                  ; Ignore
;
        ORG     0x20            ; Peripheral Interrupt Vector
;
; Timer / Serial port interrupt entry
;
SERIAL_INT      MOVWF   im_wreg         ; Save WREG
        MOVPF   ALUSTA,im_sreg  ; Save ALU REG
        MOVLB   1               ; Select bank 1
        BTFSC   PIR,EK#TINT     ; Timer 1 interrupt set ?
        GOTO    TIMER_INT       ; Yes, go to timer routine
        CALL    IS_SVC          ; Service interrupt
        MOVFP   im_sreg,ALUSTA  ; Restore ALU REG
        MOVFP   im_wreg,WREG    ; Restore WREG
        RETFIE                  ; Return
;
TIMER_INT       BCF     PIR,EK#TINT     ; Reset timer 1 interrupt
        BSF     ek_mocod,EK#VCRF; Set vocoder frame flag
        MOVFP   im_sreg,ALUSTA  ; Restore ALU REG
        MOVFP   im_wreg,WREG    ; Restore WREG
        RETFIE                  ; Return
;
```

```
;page
;****************** Executive interrupt handlers ***********************
        ORG     0x40        ;
;
; Modem and Serial Port interrupt handlers
;
#include "im.inc"
#include "is.inc"
;
;page
;**************** Executive I/O drivers ********************************
;
; Modem reception and transmission drivers
;
#include "dr.inc"
#include "dt.inc"
;
;page
;**************** Vocoder task *****************************************
;
; Vocoder I/O driver, test routines, and procedures
;
#include "dv.inc"
#include "vc.inc"
;
;page
;**************** PC task **********************************************
;
; PC I/O driver, test routines, and procedures
;
#include "dc.inc"
#include "pc.inc"
;
;page
;************** Game Gear task *****************************************
;
; Game Gear I/O driver and procedures
;
;#include "dg.inc"
;#include "gg.inc"
;
;page
;************** Game Boy task ******************************************
;
; Game Boy I/O driver and procedures
;
;#include "db.inc"
;#include "gb.inc"
;
;page
;*************** Executive kernel **************************************
;
; System test support procedures
;
;#include "mx1a.tst"
;#include "mx1b.tst"
;#include "mx1c.tst"
;#include "mx2.tst"
;#include "mx3.tst"
;#include "mx4.tst"
;#include "mx5.tst"
;#include "vc1.tst"
;#include "vc2.tst"
;#include "vp1.tst"
;#include "pc.tst"
;
;*************** Executive kernel **************************************
        ORG     0x500
;
; Executive kernel and utilities
;
#include "ut.inc"
#include "st.inc"
#include "ek.inc"
;
        END
;
;page
        ORG     0x850
;
;#include "db.tst"           ; *** TEST ***
;#include "dv.tst"           ; *** TEST ***
;
;*************** Executive test ****************************************
```

```
; Purpose: Sends modem output to modem input for testing purposes
;
; Calling parameters: None
; Returned parameters: None
;
; To make code operational, uncomment the following and comment
; the line that disables interrupts.
;
EK_TEST   BSF     CPUSTA,GLINTD       ; Disable interrupts
          TSTFSZ  dt_id               ; Pending output ?
          GOTO    EK_TEST1            ; Yes, continue MOVLW   IM#DATA             ; Get data byte
          MOVWF   im_byte1            ; Save for modem input
          MOVLW   IM#NULL             ; Get NULL
          MOVWF   im_byte2            ; Save for modem input EK_TEST1  CLRF    WREG
          BSF     WREG,IM#RBF         ; Set for modem input
          CALL    IM_SVC              ; Fake RBF interrupt
          TSTFSZ  dt_id               ; Pending output ?
          GOTO    EK_TEST2            ; Yes, continue
          GOTO    EK_TEST3            ; No, return EK_TEST2  CLRF    WREG
          BSF     WREG,IM#CBE         ; Set for modem output
          CALL    IM_SVC              ; Fake CBE interrupt EK_TEST3  RETFIE                      ; Return, enable interrupts
          END ;page
```

```
;******************* Data definitions ********************
;
; Define data memory registers
;
; Executive I/O blocks CBLOCK  0x18            ; Beginning of data memory dr_ecntl                ; Modem exec input control
        dr_eaddr                ; Modem exec input address
        dr_ecnt                 ; Modem exec input count
        dr_eerr                 ; Modem exec input error count dt_ecntl                ; Modem exec output control
        dt_eaddr                ; Modem exec output address
        dt_ecnt                 ; Modem exec output count
        dt_eerr                 ; Modem exec output error count dr_gcntl                ; Modem game input control
        dr_gaddr                ; Modem game input address
        dr_gcnt                 ; Modem game input count
        dr_gerr                 ; Modem game input error count dt_gcntl                ; Modem game output control
        dt_gaddr                ; Modem game output address
        dt_gcnt                 ; Modem game output count
        dt_gerr                 ; Modem game output error count dr_vcntl                ; Modem Vocoder input control
        dr_vaddr                ; Modem Vocoder input address
        dr_vcnt                 ; Modem Vocoder input count
        dr_verr                 ; Modem Vocoder input error count dt_vcntl                ; Modem Vocoder output control
        dt_vaddr                ; Modem Vocoder output address
        dt_vcnt                 ; Modem Vocoder output count
        dt_verr                 ; Modem Vocoder output error count ; Executive I/O modem driver registers dr_id                   ; Modem reception IOBLK
        dt_btime                ; Modem transmission byte time
        dt_id                   ; Modem transmission IOBLK ; Executive data registers ek_clkl1                ; Low clock for task 1
        ek_clkh1                ; High clock for task 1
        ek_perl1                ; Low period for task 1
        ek_perh1                ; High period for task 1 ek_clkl2                ; Low clock for task 2
        ek_clkh2                ; High clock for task 2
        ek_perl2                ; Low period for task 2
        ek_perh2                ; High period for task 2 ek_rtccl                ; RTCC low
        ek_rtcch                ; RTCC high ek_crdtl                ; Critical dispatch time low
        ek_crdth                ; Critical dispatch time high ek_mibyte1              ; Executive modem input byte 1
        ek_mibyte2              ; Executive modem input byte 2
        ek_mobyte1              ; Executive modem output byte 1
        ek_mobyte2              ; Executive modem output byte 2 ek_stat                 ; EK control status
                                ; Bit 0: ORIGINATE, if 1
                                ; Bit 1: Run-time mode, if 1
                                ; Bit 2: Listen mode, if 1
                                ; Bit 3: Off-hook mode, if 1
                                ; Bit 4: Configuration state, if 1
                                ; Bit 5: ACK state, if 1
                                ; Bit 6: SYNC state, if 1
                                ; Bit 7: Startup state, if 1 ek_mocod                ; Modem / Vocoder control status
                                ; Bit 0: vocoder frame flag, if 1
                                ; Bit 1: vocoder output mute, if 1
                                ; Bit 2: Low res voice, if 1
                                ; Bit 3:
                                ; Bit 4:
                                ; Bit 5: PC check count, 0 to 1
                                ; Bit 6: Check PC queue, if 1
                                ; Bit 7: Modem off-line, if 1 ek_game                 ; Game control status
                                ; Bit 0: Critical timing, if 1
                                ; Bit 1: Game gear, if 1
                                ; Bit 2: Game boy, if 1
                                ; Bit 3: PC, if 1
                                ; Bit 4: SP DTR, 0 = ready 1 = not
                                ; Bit 5: SP RTS, 0 = ready 1 = not
```

```
                     ;; Bit 6:  SP CTS, 0 = ready 1 = not
                     ;; Bit 7:  SP DSR, 0 = ready 1 = not ek_cmmd      ; AT command status word
                     ;; Bit 0:  On-line, if 1
                     ;; Bit 1:  A state, if 1
                     ;; Bit 2:  T state, if 1
                     ;; Bit 3:  X state, if 1
                     ;; Bit 4:
                     ;; Bit 5:  Flow control
                     ;; Bit 6:  Echo mode
                     ;; Bit 7:  Verbose mode ek_addr      ; IOBLK addr
        ek_cnt       ; IOBLK cnt
        ek_id        ; IOBLK ID ; Executive interrupt handler registers im_await     ; Wait for modem message ACK, if nonzero
        im_byte1     ; Modem byte 1
        im_byte2     ; Modem byte 2
        im_intrpt    ; Modem interrupt register
        im_wreg      ; Saved WREG for interrupt handlers
        im_sreg      ; Saved ALUREG for interrupt handlers

ENDC

;*** CAUTION *** Following are 4 temporary registers
;                that are defined for code that executes
;                independently and contain values that
;                are required to persist from one
;                execution to the next.

CBLOCK im_sreg + 1
        ek_mtcnt     ; Modem try counter
        ek_mwcnt     ; Modem wait counter
        ek_mwval     ; Modem wait value
        ENDC CBLOCK im_sreg + 1
        gb_bitcnt    ; GB bit counter
        gb_cnt       ; GB loop counter
        gb_temp      ; GB temp register
        gb_waitcnt   ; GB wait counter
        ENDC CBLOCK im_sreg + 1
        dt_cnt       ; Modem transmission count
        dt_head      ; Modem transmission header
        dt_rtccl     ; RTCC low
        dt_rtcch     ; RTCC high
        ENDC ;; The following data blocks overlay and support distinct game applications.
;; Each game application must operate independently; simultaneous game
;; applications are not supported.

; Serial port (PC or GG) i/o queue control registers

CBLOCK im_sreg + 5
        sp_icntl     ; Serial in queue control
        sp_iput      ; Serial in put address
        sp_iget      ; Serial in get address
        sp_ierr      ; Serial in error count sp_ocntl     ; Serial out queue control
        sp_oput      ; Serial out put address
        sp_oget      ; Serial out get address
        sp_oerr      ; Serial out error count sp_temp      ; Serial port temp register
        ENDC ; GB data registers * Overlays serial port registers *

CBLOCK im_sreg + 5
        gb_cid       ; GB connection info data
        gb_mode      ; GB mode
        gb_index     ; GB I/O counter
        gb_icnt      ; GB input count
        gb_ocnt      ; GB output count
        gb_ncode     ; GB number code
        gb_tcode     ; GB time code
        gb_int       ; GB interval between bytes
        gb_nxdtl     ; GB next dispatch time low
        gb_nxdth     ; GB next dispatch time high
        gb_perl      ; GB period low
        gb_perh      ; GB period high
        ENDC ; VC data registers CBLOCK im_sreg + 17
```

```
        vc_buff              ; Vocoder buffer mode
        vc_addr              ; Vocoder buffer address
        vc_rxerr             ; Vocoder RX error count
        vc_txerr             ; Vocoder TX error count ; Vocoder RX response buffer vc_rxbc              ; RX byte count
        vc_rxack             ; RX ACK
        vc_rxcmd             ; RX command
        vc_rxcs              ; RX checksum ; Vocoder TX command buffer vc_txbc              ; TX byte count
        vc_txcmd             ; TX command
        vc_txhdr             ; TX highest data rate
        vc_txldr             ; TX lowest data rate
        vc_txcs              ; TX checksum
        ENDC ; Vocoder input buffer 1

CBLOCK  vc_txcs + 1
        vc_ibuf1             ; Vocoder input buffer 1
        ENDC
        CBLOCK  vc_ibuf1 + 3
        vc_mobuf1            ; Modem output buffer 1
        ENDC ; Vocoder input buffer 2

CBLOCK  vc_mobuf1 + 26
        vc_ibuf2             ; Vocoder input buffer 2
        ENDC
        CBLOCK  vc_ibuf2 + 3
        vc_mobuf2            ; Modem output buffer 2
        ENDC ; Vocoder output buffer 1

CBLOCK  vc_mobuf2 + 26
        vc_obuf1             ; Vocoder output buffer 1
        ENDC
        CBLOCK  vc_obuf1 + 2
        vc_mibuf1            ; Modem input buffer 1
        ENDC ; Vocoder output buffer 2

CBLOCK  vc_mibuf1 + 26
        vc_obuf2             ; Vocoder output buffer 2
        ENDC
        CBLOCK  vc_obuf2 + 2
        vc_mibuf2            ; Modem input buffer 2
        ENDC ; The following data blocks overlay and support distinct game applications.
; Each game application must operate independently; simultaneous game
; applications are not supported.

; Serial port input and output data queues

CBLOCK  vc_mibuf2 + 26
        sp_in                ; Serial port data input queue
        ENDC
        CBLOCK  sp_in + 5    ; ******* under half ! *********
        sp_out               ; Serial port data output queue
        ENDC
        CBLOCK  sp_in + 15
        sp_end               ; End of serial port data queues
        ENDC ; Data buffers for Game Gear * Overlays serial port queues *

CBLOCK  vc_mibuf2 + 26
        gg_in                ; Game Gear data input byte
        gg_out               ; Game Gear data output byte
        ENDC ; Data buffers for Game Boy * Overlays serial port queues *

CBLOCK  vc_mibuf2 + 26
        gb_obuf              ;
        ENDC

; Input data for Game from modem

CBLOCK  sp_in + 15
        gd_ihead             ; Game data input header
        gd_idat1             ; Game data input data 1
        gd_idat2             ; Game data input data 2
        gd_idat3             ; Game data input data 3
        gd_idat4             ; Game data input data 4
```

```
    gd_idat5              ; Game data input data 5
    gd_idat6              ; Game data input data 6

; Output data from Game to modem gd_ohead              ; Game data output header
    gd_odat1              ; Game data output data 1
    gd_odat2              ; Game data output data 2
    gd_odat3              ; Game data output data 3
    gd_odat4              ; Game data output data 4
    gd_odat5              ; Game data output data 5
    gd_odat6              ; Game data output data 6
    ENDC ;;;
; Executive Test Registers
;;;
    CBLOCK  sp_in + 30
    im_test
    ek_test
    im_cnt
    ENDC
```

```
        stitle  "Game Boy I/O driver"

;*********************************************
;*      APS Prototype II Software            *
;*      copyright 1993                       *
;*      Advanced Protocol Systems, Inc.      *
;*********************************************

DB#WAIT1    EQU     21              ; First wait count
DB#WAIT2    EQU     24              ; Second wait count ;************ Game Boy I/O driver ********************************
;
; Purpose: Inputs and outputs data byte to Game Boy
;
; Calling parameters:
;   WREG contains byte to be output to Game Boy
; Returned parameters:
;   WREG contains byte input from Game Boy DB_IO       BSF     CPUSTA,GLINTD           ; Disable interrupts
            MOVWF   gb_temp                 ; Save output byte
            MOVLB   1                       ; Select bank 1
            MOVLW   8                       ; Get bit count
            MOVWF   gb_bitcnt               ; Save counter
;
DB_IO1      BSF     PORTE,GB#CLK            ; Set GB clock high
;
            MOVLW   DB#WAIT1                ; Delay count
            CALL    DB_IO_WAIT              ; Wait, 16 microsec
;
            BTFSS   PORTE,GB#RCV            ; GB RCV high ?
            BCF     ALUSTA,C                ; Clear carry bit
            BTFSC   PORTE,GB#RCV            ; GB RCV low ?
            BSF     ALUSTA,C                ; Set carry bit
            RLCF    gb_cnt                  ; Shift carry to input
;
            RLCF    gb_temp                 ; Shift output to carry
            BTFSS   ALUSTA,C                ; Carry set ?
            BCF     PORTE,GB#TX             ; Set TX low
            BTFSC   ALUSTA,C                ; Carry clear ?
            BSF     PORTE,GB#TX             ; Set TX high
;
            BCF     PORTE,GB#CLK            ; Set GB clock low
;
            MOVLW   DB#WAIT2                ; Delay count
            CALL    DB_IO_WAIT              ; Wait 16, microsec
;
            DECFSZ  gb_bitcnt               ; Done ?
            GOTO    DB_IO1                  ; No, continue
;
            MOVFP   gb_cnt,WREG             ; Get input byte
            RETFIE                          ; Return, enable interrupts
;
DB_IO_WAIT  MOVWF   gb_waitcnt              ; Set wait count
DB_IO_WAIT1 DECFSZ  gb_waitcnt              ; Done ?
            GOTO    DB_IO_WAIT1             ; No, continue
            RETURN                          ; Yes, return
```

```
        stitle  "Game Gear I/O driver"

;************************************************
;*      APS Prototype II Software               *
;*      copyright 1993                          *
;*      Advanced Protocol Systems, Inc.         *
;************************************************

;************* Game Gear input driver ************************************
;
; Purpose: Initializes Game Gear input IOBLK
;
; Calling parameters:
;   FSR0 contains address of data
;   WREG contains IOBLK address
; Returned parameters: None
;
DG_IN   CLRF    ek_cnt              ; Clear byte count
        INCF    ek_cnt              ; Increment byte count
        CALL    EK_SETIO            ; Setup IOBLK
        TSTFSZ  WREG                ; Ready ?
        MOVPF   ek_cnt,INDF0        ; Yes, set IOBLK cnt
        RETURN                      ; Return ;*********** Game Gear output driver *********************************
;
; Purpose: Initializes Game Gear output IOBLK and outputs data byte
;
; Calling parameters:
;   FSR0 contains address of data
;   WREG contains IOBLK address
; Returned parameters: None
;
DG_OUT  CLRF    ek_cnt              ; Clear byte count
        INCF    ek_cnt              ; Increment byte count
        CALL    EK_SETIO            ; Setup IOBLK
        TSTFSZ  WREG                ; Ready ?
        GOTO    DG_OUT1             ; Yes
        RETURN                      ; No, return DG_OUT1 MOVFP   ek_cnt,INDF0        ; Set IOBLK cnt
        DECF    FSR0                ; Point to data addr
        BSF     CPUSTA,GLINTD       ; Disable interrupts
        MOVLB   0                   ; Select bank 0
        BTFSS   TXSTA,SP#TRMT       ; TSR empty ?
        GOTO    DG_OUT2             ; No
        MOVPF   INDF0,FSR0          ; Get data addr DG_OUT2 MOVPF   INDF0,TXREG         ; Output data
        RETFIE                      ; Return, enable interrupts
```

```
        stitle  "Modem reception driver"

;****************************************
;*      APS Prototype II Software       *
;*      copyright 1993                  *
;*      Advanced Protocol Systems, Inc. *
;****************************************

;************ Modem reception driver ************************************

; Purpose: Initializes modem reception IOBLK
;
; Calling parameters:
;   FSR0 contains address of data
;   WREG contains IOBLK address
;   ek_cnt contains byte count for DR_IN
; Returned parameters: None
;
DR_INE  MOVLW   2                       ; Executive byte count
        MOVWF   ek_cnt                  ; Save byte count
        MOVLW   dr_ecntl                ; Get IOBLK ID
DR_IN   CALL    EK_SETIO                ; Setup IOBLK
        TSTFSZ  WREG                    ; Ready ?
        CLRF    INDF0                   ; Yes, clear IOBLK cnt
        RETURN                          ; Return stitle  "Modem transmission driver"

;****************************************
;*      APS Prototype II Software       *
;*      copyright 1993                  *
;*      Advanced Protocol Systems, Inc. *
;****************************************

;************ Modem transmission driver ************************************

; Purpose: Initializes modem transmission IOBLK
;
; Calling parameters:
;   FSR0 contains address of data
;   WREG contains IOBLK address
;   ek_cnt contains byte count for DR_IN
; Returned parameters: None
;
DT_OUTE MOVLW   2                       ; Executive byte count
        MOVWF   ek_cnt                  ; Save byte count
        MOVLW   dt_ecntl                ; Get IOBLK ID
        GOTO    DT_OUT1                 ; Continue
;
DT_OUT  MOVPF   INDF0,ek_cnt            ; Set byte count
DT_OUT1 CALL    EK_SETIO                ; Setup IOBLK
        TSTFSZ  WREG                    ; Ready ?
        GOTO    DT_OUT2                 ; Yes
        RETURN                          ; No, return
;
DT_OUT2 MOVFP   ek_cnt,INDF0            ; Set IOBLK cnt
        MOVFP   ek_id,WREG              ; Get IOBLK ID
        CALL    DT_CHK                  ; Check for message start
        RETURN                          ; Return ;********** Modem transmission check **********************************

; Purpose: Checks if modem transmission can be started and
;          transmits first byte if OK
;
; Calling parameters:
;   WREG contains IOBLK address
; Returned parameters: None
;
DT_CHK  TSTFSZ  dt_id                   ; Transmission in progress ?
        GOTO    DT_CHK8                 ; Yes, return
```

```
        ;                           Minus high RTCC
        SUBWFB  dt_rtcch,W
        BTFSS   ALUSTA,C           ; OK to transmit ?
        GOTO    DT_CHK5            ; Yes, continue checking
        BTFSS   ALUSTA,Z           ; OK to transmit ?
        GOTO    DT_CHK5            ; Yes, continue checking
        ;
        ; Check for minimum message length
        ;
        MOVLW   2                  ; Min byte count
        CPFSLT  dt_cnt             ; Byte count < min ?
        GOTO    DT_CHK4            ; No
        CLRF    dt_id              ; Clear IOBLK ID
        GOTO    DT_CHK8            ; Return
        ;
        ; Reset IOBLK cntl
        ;
DT_CHK4 MOVFP   dt_id,FSR0         ; Get IOBLK address
        INCF    ek_cnt             ; Increment count in header
        MOVFP   ek_cnt,INDF0       ; Save bytes remaining
        BSF     INDF0,EK#BUSY      ; Set IOBLK cntl BUSY
        GOTO    DT_CHK6            ; Go output header
        ;
        ; Continue checking allowed bytes
        ;
DT_CHK5 INCF    dt_cnt             ; Increment allowed byte count
        INCF    dt_head            ; Increment count in header
        DECFSZ  ek_cnt             ; Decrement requested count
        GOTO    DT_CHK3            ; Continue
        ;
        ; Requested data packet can be sent
        ;
        BSF     dt_head,VC#END     ; Set end of data
        CLRF    dt_vcntl           ; Clear max byte count
        BSF     dt_vcntl,EK#BUSY   ; Set IOBLK cntl BUSY
        ;
        ; Ready to output byte to modem
        ;
DT_CHK6 MOVFP   dt_id,FSR0         ; Get IOBLK address
        INCF    FSR0               ; Point to IOBLK addr
        BTFSS   dt_head,VC#STR     ; Start of packet ?
        DECF    INDF0              ; No, decrement IOBLK addr
        INCF    FSR0               ; Point to IOBLK cnt
        MOVFP   dt_cnt,INDF0       ; Set IOBLK cnt
        DECF    FSR0               ; Point to IOBLK addr
        MOVFP   INDF0,FSR0         ; Get data addr
        MOVFP   dt_head,INDF0      ; Save header
        ;
        ; Check for data to output
        ;
        MOVFP   WREG,FSR0          ; Set IOBLK
        MOVPF   INDF0,WREG         ; Get IOBLK cntl
        ANDLW   EK#MAXM            ; Mask byte count
        MOVWF   ek_cnt             ; Save byte count
        BTFSC   ALUSTA,Z           ; Zero ?
        GOTO    DT_CHK8            ; Yes, return MOVPF   FSR0,dt_id         ; No, save IOBLK ID
        INCF    FSR0               ; Increment IOBLK
        MOVFP   INDF0,FSR0         ; Get IOBLK addr
        ;
        ; Check for critical timing mode
        ;
        BTFSS   ek_game,EK#CTIM    ; Critical timing ?
        GOTO    DT_CHK7            ; No, go output byte MOVLW   dt_vcntl           ; Get Vocoder IOBLK ID
        CPFSEQ  dt_id              ; IOBLK ID for Vocoder ?
        GOTO    DT_CHK7            ; No
        ;
        ; Setup header for Vocoder message
        ;
        CLRF    dt_head            ; Clear header
        MOVFP   dt_id,FSR0         ; Restore IOBLK
        INCF    FSR0               ; Point to
        INCF    FSR0               ;   IOBLK cnt
        TSTFSZ  INDF0              ; Count zero ?
        BSF     dt_head,VC#STR     ; No, set start of packet
        ;
        ; Compute number of Vocoder bytes to allow
        ;
DT_CHK2 CLRF    dt_cnt             ; Clear allowed byte count
        MOVFP   ek_rtccl,WREG      ; Get RTCC low
        MOVWF   dt_rtccl           ; Set initial RTCC low
        MOVFP   ek_rtcch,WREG      ; Get RTCC high
        MOVWF   dt_rtcch           ; Set initial RTCC high DT_CHK3 MOVFP   dt_btime,WREG      ; Get time for 1 byte
        ADDWF   dt_rtccl,F         ; Add RTCC low
        MOVLW   0                  ; High time for 1 byte
        ADDWFC  dt_rtcch,F         ; Add RTCC high
        MOVFP   ek_crdtl,WREG      ; Get critical dispatch time low
        SUBWF   dt_rtccl,W         ; Minus low RTCC
        MOVFP   ek_crdth,WREG      ; Get critical dispatch time high
```

```
DT_CHK7   MOVFP   dt_id,WREG         ; IOBLK address
          BSF     CPUSTA,GLINTD      ; Disable interrupts
          CALL    IM_OUT             ; Output byte to modem
          ;BCF    CPUSTA,GLINTD      ; Enable in calling routine
DT_CHK8   RETURN                     ; Return
```

```
        stitle "Vocoder I/O driver"
;******************************************
;*     APS Prototype II Software          *
;*        copyright 1993                  *
;*   Advanced Protocol Systems, Inc.      *
;******************************************

DV#RRDY     EQU   0x55    ; Vocoder ready for read
DV#TOCNT    EQU   20      ; Vocoder status timeout count
DV#WRDY     EQU   0xFF    ; Vocoder ready for write ;********** Vocoder I/O driver *********************************
;
; Purpose: Inputs and outputs data to Vocoder
;
; Calling parameters:
;   FSR0 contains address of Vocoder command
;   WREG contains address of Vocoder response
;   First byte of Vocoder response contains expected response bytes
; Returned parameters:
;   Second byte of response (ACK) cleared, if timeout occurs or
;   response byte count does not equal expected value
;
DV_IO     MOVWF   ek_addr           ; Save response address
          MOVLB   1                 ; Select bank 1
          MOVLW   EK#PORTC#OUT      ; Port C output mode
          MOVWF   DDRC              ; Set Port C for output
          BCF     PORTD,VC#WR       ; Set Vocoder write low
          MOVPF   INDF0,PORTC       ; Output byte count
          NOP                       ; ***** comp 4 bus error *****
          BSF     PORTD,VC#WR       ; Set Vocoder write high
;
; Wait for write ready from Vocoder
;
          MOVLW   EK#PORTC#IN       ; Port C input mode
          MOVWF   DDRC              ; Set Port C for input
          MOVLW   DV#TOCNT          ; Get timeout count
          MOVWF   ek_cnt            ; Save for DV_IO_WAIT
          MOVLW   DV#WRDY           ; Get write ready
          CALL    DV_IO_WAIT        ; Wait for status
          TSTFSZ  WREG              ; Timeout ?
          GOTO    DV_IO3            ; Yes, go clear ACK
;
; Write command to Vocoder
;
```

```
        MOVPF   INDF0,ek_cnt        ; Save command byte count
        MOVLW   EK#PORTC#OUT        ; Port C output mode
        MOVWF   DDRC                ; Set Port C for output
;
DV_IO1  INCF    FSR0                ; Increment command address
        BCF     PORTD,VC#WR         ; Set Vocoder write low
        MOVPF   INDF0,PORTC         ; Output command byte
        NOP                         ; ***** comp 4 bus error *****
        BSF     PORTD,VC#WR         ; Set Vocoder write high
        DECFSZ  ek_cnt              ; Done ?
        GOTO    DV_IO1              ; No
;
; Wait for read ready from Vocoder
;
        MOVLW   EK#PORTC#IN         ; Port C input mode
        MOVWF   DDRC                ; Set Port C for input
        MOVLW   DV#TOCNT            ; Get timeout count
        MOVWF   ek_cnt              ; Save for DV_IO_WAIT
        MOVLW   DV#RRDY             ; Get read ready
        CALL    DV_IO_WAIT          ; Wait for status
        TSTFSZ  WREG                ; Timeout ?
        GOTO    DV_IO3              ; Yes, go clear ACK
;
; Read response from Vocoder
;
        MOVFP   ek_addr,FSR0        ; Set to response addr
        BCF     PORTD,VC#RD         ; Set Vocoder read low
        MOVFP   PORTC,WREG          ; Get response count
        BSF     PORTD,VC#RD         ; Set Vocoder read high
        CPFSEQ  INDF0               ; Vocoder response OK ?
        GOTO    DV_IO3              ; No, go clear ACK
        MOVWF   ek_cnt              ; Save response count
;
DV_IO2  INCF    FSR0                ; Increment response address
        BCF     PORTD,VC#RD         ; Set Vocoder read low
        MOVFP   PORTC,INDF0         ; Input response byte
        BSF     PORTD,VC#RD         ; Set Vocoder read high
        DECFSZ  ek_cnt              ; Done ?
        GOTO    DV_IO2              ; No
        RETURN                      ; Return
;
; Vocoder error or timeout occurred
;
DV_IO3  MOVFP   ek_addr,FSR0        ; Get response address
        INCF    FSR0                ; Point to ACK
        CLRF    INDF0               ; Clear ACK
        RETURN                      ; Return
;
; Wait for expected status
;
DV_IO_WAIT   BCF     PORTD,VC#RD    ; Request Vocoder read
             CPFSEQ  PORTC          ; Correct status ?
             GOTO    DV_IO_WAIT1    ; No, continue
             GOTO    DV_IO_WAIT2    ; Yes, go set OK
DV_IO_WAIT1  BSF     PORTD,VC#RD    ; Set Vocoder read high
             DECFSZ  ek_cnt         ; Done ?
             GOTO    DV_IO_WAIT     ; No, continue
;
; Vocoder has timed out
;
             RETLW   1              ; Return, timeout
;
; Vocoder status found
;
DV_IO_WAIT2  BSF     PORTD,VC#RD    ; Set Vocoder read high
             RETLW   0              ; Return, OK
```

```
        stitle  "Executive kernel"
;
;*******************************************
;*     APS Prototype II Software           *
;*         copyright 1993                  *
;*    Advanced Protocol Systems, Inc.      *
;*******************************************
;
;*********** Executive monitor task *******************
;
; Purpose: Monitors executive
;
; Calling parameters: None
; Returned parameters: None
;
EK_MNTR CLRWDT                          ; Clear watchdog timer
        BTFSC   ek_stat,EK#RUNT         ; Run time mode ?
        GOTO    EK_MNTR3                ; Yes, continue run time monitor
;
        CALL    EK_PCSTAT               ; Status PC operation
        BTFSC   ek_stat,EK#STRT         ; Start up mode ?
        GOTO    EK_MNTR1                ; Yes, continue start up
;
; Looking for the engage button
;
EK_MNTR1A BSF   CPUSTA,GLINTD           ; Disable interrupts
        MOVLB   0                       ; Select bank 0
        BTFSC   PORTB,EK#ENGAGE         ; Engaged ?
        GOTO    EK_MNTR5A               ; No, go enable interrupts
;
; Engage button activated ... initiate modem connection process
;
        BSF     ek_stat,EK#STRT         ; Set EK#STRT mode
        BCF     ek_stat,EK#OFFH         ; Clear EK#OFFH mode
        BSF     PORTB,EK#LEDR           ; Set LED orange
        BSF     PORTB,EK#LEDG           ; Set LED orange
        BSF     PORTA,VC#RESET          ; Set modem & Vocoder RESET
        CALL    EK_STRT                 ; Connect modem
        MOVLB   1                       ; Select bank 1
        GOTO    EK_MNTR5A               ; Go return
;
; Modem connection process ... looking for connection complete signal
;
EK_MNTR1 CALL   EK_STRT                 ; Start modem
        BTFSC   ek_stat,EK#STRT         ; Modem started ?
        GOTO    EK_MNTR5                ; No, return
;
                BSF     CPUSTA,GLINTD   ; Disable interrupts
                CALL    EK_SCHED        ; Schedule tasks
;
                CALL    VC_INIT         ; Send VC init command
                MOVLW   0x40            ; Load command wait count
                MOVWF   ek_cnt          ; Save in count register
EK_MDLY1        DECFSZ  ek_cnt          ; Decrement counter
                GOTO    EK_MDLY1        ; Keep counting
                CALL    VC_BKGND        ; Send VC background noise command
;
                MOVLB   0               ; Select bank 0
                BCF     PORTB,EK#LEDR   ; Clear LED red
                BSF     PORTB,EK#LEDG   ; Set LED green
                BSF     ek_stat,EK#RUNT ; Set to run time mode
                GOTO    EK_MNTR5A       ; Go enable interrupts
;
; Run time monitor routine ... checking run time status
;
EK_MNTR3        BSF     CPUSTA,GLINTD   ; Disable interrupts
                BTFSS   CPUSTA,GLINTD   ; Verify interrupts ?
                GOTO    EK_MNTR3        ; No, try again
                MOVLB   0               ; Select bank 0
                CALL    EK_VCSTAT       ; Status vocoder operation
                CALL    EK_MDSTAT       ; Status modem operation
                CALL    EK_PCSTAT       ; Status PC operation
;
;***             CALL    EK_MXT1        ; *** TEST -- MX modem calibration
;
;***             CALL    EK_MXT2        ; *** TEST -- MX idle line test
;
;***             CALL    EK_MXT3        ; *** TEST -- MX tone test
;
;***             CALL    EK_MXT4        ; *** TEST -- MX one way data
;
;***             CALL    EK_MXT5        ; *** TEST -- MX two way data
;
;***             CALL    EK_VCT1        ; *** TEST -- VC audio loopback
;
;***             CALL    EK_VCT2        ; *** TEST -- VC vocoder loopback
;
;***             CALL    EK_VPT1        ; *** TEST -- VP 1-way voice data
;
                TSTFSZ  im_await        ; Waiting for ACK ?
                GOTO    EK_MNTR4        ; Yes, go check for timeout
                GOTO    EK_MNTR5A       ; Go enable interrupts
;
```

```
EK_MNTR4       INCF    im_await              ; Increment counter
               MOVLW   IM#MACK               ; Get max wait for ACK
               CPFSGT  im_await              ; Timeout ?
               GOTO    EK_MNTR5A             ; No, go enable interrupts
                                             ;
               CALL    EK_SYNC               ; Yes, send SYNC
               CLRF    im_await              ; Reset timeout
               INCF    im_await              ;           to 1
                                             ;
EK_MNTR5A      BCF     CPUSTA,GLINTD         ; Enable interrupts
EK_MNTR5       RETURN                        ; Return
;
;************ Executive zero data memory *************************
;
; Purpose: Zeroes data memory
;
; Calling parameters: None
; Returned parameters: None
;
EK_ZERO_DM     MOVLW   0x18                  ; First data memory address
               MOVWF   FSR0                  ; Set for indirect addressing
                                             ;
EK_ZERO_DM1    CLRF    INDF0                 ; Zero register
               INCF    FSR0                  ; Increment address
               BTFSS   ALUSTA,Z              ; Done ?
               GOTO    EK_ZERO_DM1           ; No
               RETLW   0                     ; Yes, return
;
;************ Executive kernel initialization ********************
;
; Entry point for executive kernel initialization
;
EK_INIT        CALL    EK_ZERO_DM            ; Zero data memory
;
               ; Initialize I/O ports (page 1)
               ; Port C mode is set as needed to input or output
;
               MOVLB   1                     ; Select bank 1
               MOVLW   EK#PORTE              ; Get port E mode
               MOVWF   DDRE                  ; Set port E mode
               BSF     PORTE,0               ; Set
               BSF     PORTE,1               ; Set
                                             ;
               MOVLW   EK#PORTD              ; Get port D mode
               MOVWF   DDRD                  ; Set port D mode
               BSF     PORTD,IM#A0           ; Set modem config addr 0 high
               BSF     PORTD,IM#A1           ; Set modem config addr 1 high
               BSF     PORTD,IM#CS           ; Set modem chip select high
               BSF     PORTD,IM#RD           ; Set modem read enable high
               BSF     PORTD,IM#WR           ; Set modem write enable high
               BSF     PORTD,IM#HAS          ; Set modem HAS high
               BSF     PORTD,VC#RD           ; Set Vocoder read high
               BSF     PORTD,VC#WR           ; Set Vocoder write high
;
               ; Initialize I/O ports (page 0)
;
               MOVLB   0                     ; Select bank 0
               MOVLW   EK#PORTB              ; Get port B mode
               MOVWF   DDRB                  ; Set port B mode
                                             ;
               BCF     PORTB,EK#LEDG         ; Clear LED green
               BSF     PORTB,EK#LEDR         ; Set LED red
               BCF     PORTB,2               ; ***** TEST ******
               BCF     PORTB,3               ; ***** TEST ******
;
               ; Start vocoder and modem reset process
;
               BCF     PORTA,VC#VRS          ; Clear Vocoder VRS
               BCF     PORTA,VC#RESET        ; Clear Vocoder/Modem RESET
;
               ; Setup serial port, if needed (page 0)
;
               MOVLW   SP#RCC                ; Get receive control
               MOVWF   RCSTA                 ; Set receive control
               MOVLW   SP#TXC                ; Get transmit control
               MOVWF   TXSTA                 ; Set transmit control
               MOVLW   0x34                  ; baud rate 12=CF 24=67 48=34 96=19
               MOVWF   SPBRG                 ; Set baud rate
;
               ; Set up external timer for 20 msec (page 3)
;
               MOVLB   3                     ; Select bank 3
               MOVLW   0x01                  ; Get control value
               MOVWF   TCON1                 ; Enable external clock
               MOVLW   0x01                  ; Get control value
               MOVWF   TCON2                 ; Start external clock
               MOVLB   2                     ; Set bank 2
               MOVLW   0xA0                  ; Get overflow value
               MOVWF   PR1                   ; Set overflow value
;
               ; Select computer type and critical timing, if required
;
               BTFSC   ek_game,EK#GBIO       ; Game Boy selected ?
               BSF     ek_game,EK#CTIM       ; Yes, set critical timing
```

```
            BSF     ek_game,EK#GGIO         ; Set GG I/O
            BSF     ek_game,EK#PCIO         ; Set PC I/O
;
; Initialize AT registers
;
            BSF     ek_cmmd,EK#FLOC         ; Enable flow control
            BSF     ek_cmmd,EK#ONLN         ; Initialize to on-line mode
            CALL    PC_MIRQST               ; Request Computer modem input
            CALL    PC_QINIT                ; Initialize serial queues
;
; Enable Interrupts
;
            MOVLB   1                       ; Select bank 1
            MOVLW   0x0B                    ; Modem and RTCC overflow
            MOVPF   WREG,INTSTA             ; Enable
            EK_ENABLE_SI                    ; Enable serial input
;
; Schedule EK monitor
;
            CALL    EK_RD_RTCC              ; Read RTCC
            MOVLW   EK#PERH                 ; EK task period high
            MOVWF   FSR0                    ; Save
            MOVLW   EK#PERL                 ; EK task period low
            EK_SCHED_EK                     ; Schedule EK task
;
;************ Executive kernel *********************************
;
EK_LOOP     BSF     CPUSTA,GLINTD           ; Disable interrupts
            BTFSS   CPUSTA,GLINTD           ; Verify interrupts ?
            GOTO    EK_LOOP                 ; No, try again
            CALL    EK_RD_RTCC              ; Read RTCC
;
; Set serial port i/o control line defaults
;
            MOVLB   0                       ; Select bank 0
            BCF     PORTB,SP#DSR            ; No, clear DSR control
            BCF     PORTB,SP#CTS            ; No, clear CTS control
;
; Maintain serial port i/o control lines
;
            BTFSC   ek_game,EK#GGIO         ; GG flow control enabled ?
            GOTO    EK_LOOPA                ; Yes, skip to end
            BTFSS   ek_cmmd,EK#FLOC         ; PC flow control enabled ?
            GOTO    EK_LOOPB                ; No, skip to end
            BTFSC   ek_game,EK#DSR          ; Executive DSR clear ?
            BSF     PORTB,SP#DSR            ; No, set DSR control
            BTFSS   ek_game,EK#DSR          ; Executive DSR set ?
            BCF     PORTB,SP#DSR            ; No, clear DSR control
;
            BTFSC   sp_icntl,EK#FULL        ; Is input queue FULL ?
            BSF     PORTB,SP#CTS            ; Yes, set CTS control
           ;BSF     ek_game,EK#CTS          ; Full, not ok to send (CTS high) ?
            BTFSS   sp_icntl,EK#FULL        ; Is input queue FULL ?
            BCF     PORTB,SP#CTS            ; No, clear CTS control
           ;BCF     ek_game,EK#CTS          ; Not full, ok to send (CTS low) ?
;
            MOVLB   1                       ; Select bank 1
            BTFSC   PORTE,SP#DTR            ; DTR control clear ?
            BSF     ek_game,EK#DTR          ; No, set executive DTR
            BTFSS   PORTE,SP#DTR            ; DTR control set ?
            BCF     ek_game,EK#DTR          ; No, clear executive DTR
;
            BTFSC   PORTE,SP#RTS            ; RTS control clear ?
            BSF     ek_game,EK#RTS          ; No, set executive RTS
            BTFSS   PORTE,SP#RTS            ; RTS control set ?
            BCF     ek_game,EK#RTS          ; No, clear executive RTS
            BTFSC   ek_game,EK#RTS          ; Executive DTR clear ?
            BCF     ek_game,EK#RTS          ; No, clear executive RTS
            GOTO    EK_LOOPB                ; Continue
;
EK_LOOPA    BTFSS   ek_stat,EK#RUNT         ; Run time mode ?
            GOTO    EK_LOOPB                ; No
            MOVLB   1                       ; Select bank 1
            BTFSC   PORTE,SP#DTR            ; DTR control clear ?
            GOTO    EK_LOOPAA               ; No
            EK_DISABLE_SI                   ; Disable serial input
            GOTO    EK_LOOPB                ; Continue
EK_LOOPAA   EK_ENABLE_SI                    ; Enable serial input
;
EK_LOOPB    BCF     CPUSTA,GLINTD           ; Enable interrupts
;
; Check schedule for critical timing tasks (run time mode only)
;
            BTFSS   ek_stat,EK#RUNT         ; Run time mode ?
            GOTO    EK_LOOP1                ; No
            BTFSS   ek_game,EK#GBIO         ; GB I/O ?
            GOTO    EK_LOOP1                ; No
            MOVFP   ek_clkl1,WREG           ; Get low clock for task 1
            SUBWF   ek_rtccl,W              ; Minus low RTCC
            MOVFP   ek_clkh1,WREG           ; Get high clock for task 1
```

```
                SUBWFB   ek_rtcch,W         ; Minus high RTCC
                BTFSS    ALUSTA,C           ; Time for dispatch ?
                GOTO     EK_LOOP1           ; No
                BTFSS    ALUSTA,Z           ; Time for dispatch ?
                GOTO     EK_LOOP1           ; No
        ;
                MOVFP    ek_perl1,WREG      ; Low period for task 1
                ADDWF    ek_clkl1,F         ; Plus low clock
                MOVFP    ek_perh1,WREG      ; High period for task 1
                ADDWFC   ek_clkh1,F         ; Plus high clock
                ;CALL    GB_SCHED           ; Dispatch task
                GOTO     EK_LOOP            ; Go monitor schedule
        ;
        ; Check schedule for dispatch of system monitor routine
        ;
EK_LOOP1        MOVFP    ek_clkl2,WREG      ; Get low clock for task 2
                SUBWF    ek_rtccl,W         ; Minus low RTCC
                MOVFP    ek_clkh2,WREG      ; Get high clock for task 2
                SUBWFB   ek_rtcch,W         ; Minus high RTCC
                BTFSS    ALUSTA,C           ; Time for dispatch ?
                GOTO     EK_LOOP2           ; No
                BTFSS    ALUSTA,Z           ; Time for dispatch ?
                GOTO     EK_LOOP2           ; No
        ;
                MOVFP    ek_perl2,WREG      ; Low period for task 2
                ADDWF    ek_clkl2,F         ; Plus low clock
                MOVFP    ek_perh2,WREG      ; High period for task 2
                ADDWFC   ek_clkh2,F         ; Plus high clock
                CALL     EK_MNTR            ; Dispatch task
                GOTO     EK_LOOP            ; Go monitor schedule
        ;
        ; Check vocoder control status for dispatch of vocoder task
        ;
EK_LOOP2        BTFSS    ek_mocod,EK#VCRF;  Vocoder frame flag ?
                GOTO     EK_LOOP3           ; No
        ;
                BCF      ek_mocod,EK#VCRF;  Clear frame flag
                CALL     VC_SCHED           ; Dispatch task
                GOTO     EK_LOOP            ; Go monitor schedule
        ;
        ; Check game control status for dispatch of PC tasks
        ;
EK_LOOP3        BTFSS    ek_game,EK#PCIO  ; PC I/O ?
                GOTO     EK_LOOP4           ; No
                BTFSS    ek_game,EK#GGIO  ; PC I/O ?
                GOTO     EK_LOOP4           ; No
        ;

EK_LOOP3A       BTFSC    ek_cmnd,EK#MONLN ; PC in on-line mode ?
                GOTO     EK_LOOP3B          ; Yes
                BTFSS    ek_cmnd,EK#X       ; No, execute state ?
                GOTO     EK_LOOP5           ; No
                CALL     PC_CMNO            ; Yes, call command interpreter
                ;BCF     ek_mocod,5         ; *** TEST MX4 -- end test on <CR>
                GOTO     EK_LOOP            ; Go monitor schedule
        ;
EK_LOOP3B       BTFSC    sp_icntl,EK#MPTY;  PC input queue EMPTY ?
                GOTO     EK_LOOP5           ; Yes
                CALL     PC_INWAIT          ; Dispatch task
                GOTO     EK_LOOP5           ; Continue loop
        ;
        ; Check game control status for dispatch of ?? task
        ;
EK_LOOP4        GOTO     EK_LOOP5           ; Continue loop
        ;
        ; Check game i/o block for status of modem game packet input
        ;
EK_LOOP5        BTFSS    dr_gcntl,EK#DONE;  Modem computer input DONE ?
                GOTO     EK_LOOP6           ; No
                BCF      dr_gcntl,EK#DONE;  Clear DONE
                CALL     PC_MIWAIT          ; Dispatch task
                GOTO     EK_LOOP            ; Go monitor schedule
        ;
        ; Check vocoder i/o block for status of modem voice packet input
        ;
EK_LOOP6        BTFSS    dr_vcntl,EK#DONE;  Modem Vocoder input DONE ?
                GOTO     EK_LOOP7           ; No
                BCF      dr_vcntl,EK#DONE;  Clear DONE
                CALL     VC_MIWAIT          ; Dispatch task
                GOTO     EK_LOOP            ; Go monitor schedule
        ;
        ; Check executive i/o block for status of modem control packet output
        ;
EK_LOOP7        BTFSS    dt_ecntl,EK#DONE;  Modem exec output DONE ?
                GOTO     EK_LOOP8           ; No
                BCF      dt_ecntl,EK#DONE;  Clear DONE
                CALL     EK_CHKMO           ; Check for waiting message
                GOTO     EK_LOOP            ; Go monitor schedule
        ;
        ; Check game i/o block for status of modem game packet output
        ;
EK_LOOP8        BTFSS    dt_gcntl,EK#DONE;  Modem computer output DONE ?
                GOTO     EK_LOOP9           ; No
                CALL     EK_CHKMO           ; Check for waiting message
                BCF      dt_gcntl,EK#DONE;  Clear DONE
```

```
            CALL    PC_MOWAIT               ; Dispatch task
            GOTO    EK_LOOP                 ; Go monitor schedule ; Check vocoder i/o block for status of modem voice packet output
;
EK_LOOP9    BTFSS   dt_vcntl,EK#DONE        ; Modem Vocoder output DONE ?
            GOTO    EK_LOOP                 ; No
            MOVFP   dt_vcntl,WREG           ; Get IOBLK cntl
            ANDLW   EK#MAXM                 ; Mask max count
            BTFSS   ALUSTA,Z                ; Zero ?
            BSF     dt_vcntl,EK#BUSY        ; No, set IOBLK cntl BUSY
            CALL    EK_CHKMO                ; Check for waiting message
            BCF     dt_vcntl,EK#DONE        ; Clear DONE
            BTFSC   dt_vcntl,EK#BUSY        ; Modem Vocoder output BUSY ?
            GOTO    EK_LOOP                 ; Yes
            CALL    VC_MOWAIT               ; Dispatch task
            GOTO    EK_LOOP                 ; Go monitor schedule
;
```

```
        stitle "GB task"
;***************************************
;*     APS Prototype II Software       *
;*         copyright 1993              *
;*   Advanced Protocol Systems, Inc.   *
;***************************************
;
; Connection info data definition
;
GB#PNR1     EQU     0       ; Port number 1
GB#PNR2     EQU     1       ; Port number 2
GB#CNS1     EQU     4       ; Connection status 1
GB#CNS2     EQU     5       ; Connection status 2
GB#SREQ     EQU     6       ; Start request, if 1
GB#RREQ     EQU     7       ; Reset request, if 1
;
; Mode definition
;
GB#CONN     EQU     0       ; Connected, if 1
GB#DATA     EQU     1       ; Data, if 1
GB#RMDR     EQU     4       ; Remote data received, if 1
GB#STRT     EQU     6       ; Start, if 1
GB#RSET     EQU     7       ; Reset, if 1
;
GB#CCNT     EQU     5                   ; Control count
GB#CHDR     EQU     GB#CCNT + GD#CHDR   ; Control header
GB#CINT     EQU     59      ; Time between GB cntl bytes (1.5 msec)
GB#CNBC     EQU     4       ; Control mode byte count
GB#CIDM     EQU     0x33    ; Connection info data mask
GB#DINT     EQU     39      ; Time between GB data bytes (1 msec)
GB#LDH      EQU     0xFF    ; Large delay high
GB#MIBC     EQU     6       ; Modem input byte count
GB#MSECH    EQU     0       ; 1.0 msec high
GB#MSECL    EQU     39      ; 1.0 msec low
GB#TCODEM   EQU     0x0F    ; Time code mask
GB#TMSECH   EQU     0       ; 0.1 msec high
GB#TMSECL   EQU     4       ; 0.1 msec low
;
GB#CONNECT  EQU     0xFE    ; GB connection code
GB#CONNID   EQU     0x88    ; GB connection ID code
GB#RESET    EQU     0xFF    ; GB reset code
GB#START    EQU     0xCC    ; GB start code
GB#STRTREQ  EQU     0xAA    ; GB start request code
;
;************** GB task ****************************************
;
;*********** GB adjust byte interval ***************************
; Purpose: Adjusts byte interval according to time code
; Calling parameters: None
; Returned parameters: None
;
GB_ADBINT   MOVLW   GB#DINT         ; Get base time between bytes
            MOVWF   gb_int          ; Save low
;
            SWAPF   gb_tcode,W      ; Get time code
            ANDLW   GB#TCODEM       ; Mask interval nibble
            BTFSC   ALUSTA,Z        ; Zero ?
            GOTO    GB_ADBINT2      ; Yes
            MOVWF   gb_cnt          ; Save for loop count
            CLRF    FSR0            ; Clear high
;
GB_ADBINT1  MOVLW   GB#TMSECL       ; Get 0.1 msec value low
            ADDWF   gb_int,F        ; Add interval low
            MOVLW   GB#TMSECH       ; Get 0.1 msec value high
            ADDWFC  FSR0,F          ; Add interval high
            DECFSZ  gb_cnt          ; Done ?
            GOTO    GB_ADBINT1      ; No, continue loop
;
GB_ADBINT2  RETURN                  ; Return
;
;*********** GB adjust task period *****************************
; Purpose: Adjusts task period according to time code
; Calling parameters: None
; Returned parameters: None
;
GB_ADSPER   MOVLW   GB#PERL         ; Get GB period low
            MOVWF   gb_perl         ; Save low
            MOVLW   GB#PERH         ; Get GB period high
            MOVWF   gb_perh         ; Save high
;
            MOVFP   gb_tcode,WREG   ; Get time code
            ANDLW   GB#TCODEM       ; Mask cycle nibble
            BTFSC   ALUSTA,Z        ; Zero ?
            GOTO    GB_ADSPER2      ; Yes, return
            MOVWF   gb_cnt          ; Save for loop count
;
GB_ADSPER1  MOVLW   GB#MSECL        ; Get 1 msec value low
            ADDWF   gb_perl,F       ; Add period low
            MOVLW   GB#MSECH        ; Get 1 msec value high
```

```
            ADDWFC  gb_perl,F           ; Add period high
            DECFSZ  gb_cnt              ; Done ?
            GOTO    GB_ADSPER1          ; No, continue loop
GB_ADSPER2  RETURN                      ; Return
;
;************ GB check for connection ***********************************
;
; Purpose: Checks message from Game Boy for connection and
;          decodes message when connection found
; Calling parameters: None
; Returned parameters:
;   WREG equals 0, if check is positive; otherwise nonzero
;
GB_CKCONN   MOVLW   gd_odat1            ; Get data address
            MOVWF   FSR0                ; Save for indirect
            MOVLW   GB#CONNID           ; Get connection ID code
            MOVWF   INDF0
            CPFSEQ  GB_CKCONN3          ; First byte OK ?
            GOTO    GB_CKCONN3          ; No
            INCF    FSR0                ; Increment data address
            CPFSEQ  INDF0               ; Second byte OK ?
            GOTO    GB_CKCONN3          ; No
            INCF    FSR0                ; Increment data address
            MOVPF   INDF0,gb_tcode      ; Get time code
            INCF    FSR0                ; Increment data address
            MOVPF   INDF0,gb_ncode      ; Get number code
            BTFSS   gb_cid,GB#PNR1      ; Port 1 ?
            GOTO    GB_CKCONN2          ; No
;
;           Adjust GB schedule period based on time code
;
            CALL    GB_ADSPER           ; Adjust schedule period
GB_CKCONN2  CLRF    WREG                ; Indicate connection OK
GB_CKCONN3  RETURN                      ; Return
;
;************ GB check for reset ****************************************
;
; Purpose: Checks message from Game Boy for reset
; Calling parameters: None
; Returned parameters:
;   WREG equals 0, if check is positive; otherwise nonzero
;
GB_CKRSET   MOVLW   gd_odat1            ; Get data address
            MOVWF   FSR0                ; Save for indirect
            MOVLW   GB#RESET            ; Get reset code
            CPFSEQ  INDF0               ; First byte match ?
            GOTO    GB_CKRSET2          ; No, return
            MOVLW   2                   ; Get offset value
            SUBWF   gb_icnt,W           ; Input count - offset
            ADDWF   FSR0,F              ; Adjust data address
            MOVLW   2                   ; Get loop count
            MOVWF   gb_cnt              ; Save loop count
            MOVLW   GB#RESET            ; Get reset code
GB_CKRSET1  CPFSEQ  INDF0               ; Byte match
            GOTO    GB_CKRSET2          ; No, return
            INCF    FSR0                ; Increment data address
            DECFSZ  gb_cnt              ; Done ?
            GOTO    GB_CKRSET1          ; No, continue loop
            CLRF    WREG                ; Indicate reset found
GB_CKRSET2  RETURN                      ; Return
;
;************ GB check state ********************************************
;
; Purpose: Checks message from remote Game Boy and pending requests
; Calling parameters: None
; Returned parameters: None
;
GB_CKSTAT   BTFSS   gb_mode,GB#RMDR     ; Remote data received ?
            GOTO    GB_CKSTAT3          ; No, go check pending requests
GB_CKSTAT1  BCF     gb_mode,GB#RMDR     ; Clear remote data received
            BTFSS   gd_ihead,GD#CNTL    ; Control message ?
            GOTO    GB_CKSTAT3          ; No, go check pending requests
;
;           Set connection status of remote Game Boy
;
            BTFSC   gd_idat1,GB#PNR1    ; Port 1 ?
            BSF     gb_cid,GB#CNS1      ; Yes, set Port 1 connected
            BTFSC   gd_idat1,GB#PNR2    ; Port 2 ?
            BSF     gb_cid,GB#CNS2      ; Yes, set Port 2 connected
;
;           If Port 2, get number and time codes
;
            BTFSS   gb_cid,GB#PNR2      ; Port 2 ?
            GOTO    GB_CKSTAT2          ; No, continue
```

```
              MOVFP   gd_odat2,WREG      ; Get remote time code
              MOVWF   gb_tcode           ; Save time code
              CALL    GB_ADSPER          ; Adjust schedule period
              MOVFP   gd_odat3,WREG      ; Get remote number code
              MOVWF   gb_ncode           ; Save number code
;
; Check for start and reset requests
;
GB_CKSTAT2    BTFSC   gd_idat1,GB#SREQ   ; Start request ?
              BSF     gb_cid,GB#SREQ     ; Set start request
              BTFSC   gd_idat1,GB#RREQ   ; Reset request ?
              BSF     gb_cid,GB#RREQ     ; Set reset request
;
GB_CKSTAT3    BTFSS   gb_cid,GB#SREQ     ; Start request ?
              GOTO    GB_CKSTAT4         ; No, continue
              BSF     gb_mode,GB#STRT    ; Set START mode
              BCF     gb_cid,GB#SREQ     ; Clear start request
              GOTO    GB_CKSTAT5         ; Go return
;
GB_CKSTAT4    BTFSS   gb_cid,GB#RREQ     ; Reset request ?
              GOTO    GB_CKSTAT5         ; No, return
              BSF     gb_mode,GB#RSET    ; Set RESET
              BCF     gb_mode,GB#CONN    ; Clear CONNECT
              BCF     gb_mode,GB#STRT    ; Clear START
              BCF     gb_mode,GB#DATA    ; Clear DATA
              BCF     gb_cid,GB#RREQ     ; Clear RESET request
              BCF     gb_cid,GB#CNS1     ; Clear connection status 1
              BCF     gb_cid,GB#CNS2     ; Clear connection status 2
;
GB_CKSTAT5    RETURN                     ; Return
;
;************ GB check for start request *****************************
;
; Purpose: Checks message from Game Boy for start request
;
; Calling parameters: None
; Returned parameters:
;   WREG equals 0, if check is positive; otherwise nonzero
;
GB_CKSTRT     MOVLW   gd_odat1           ; Get data address
              MOVWF   FSR0               ; Save for indirect
              MOVLW   3                  ; Get loop count
              MOVWF   gb_cnt             ; Save loop count
              MOVLW   GB#STRTREQ         ; Get start request code
;
GB_CKSTRT1    CPFSEQ  INDF0              ; Byte match
              GOTO    GB_CKSTRT2         ; No, return
              INCF    FSR0               ; Increment data address
              DECFSZ  gb_cnt             ; Done ?
              GOTO    GB_CKSTRT1         ; No, continue loop
;
              CLRF    WREG               ; Indicate reset found
;
GB_CKSTRT2    RETURN                     ; Return
;
;************ GB do input/output of data *****************************
;
; Purpose: Inputs and outputs data to Game Boy
;
; Calling parameters: None
; Returned parameters: None
;
GB_DOIO       MOVLW   gb_obuf            ; GB output buffer
              DECF    WREG               ; Correct address
              ADDWF   gb_index,W         ; Add offset
              MOVWF   FSR0               ; Save for indirect
              MOVFP   INDF0,WREG         ; Get output byte
              CALL    DB_IO              ; Do GB I/O
              MOVWF   gb_temp            ; Save input byte
              MOVFP   gb_icnt,WREG       ; Get input count
              INCF    WREG               ; Plus 1
              CPFSLT  gb_index           ; Save input ?
              GOTO    GB_SCHED4          ; No
              MOVLW   gd_ohead           ; GB modem output buffer
              ADDWF   gb_index,W         ; Add offset
              MOVWF   FSR0               ; Save for indirect
              MOVFP   gb_temp,INDF0      ; Save input byte
              RETURN                     ; Return
;
;************ GB encode connection data ******************************
;
; Purpose: Encodes connection data for Game Boy
;
; Calling parameters: None
; Returned parameters: None
;
GB_ENCONN     MOVLW   gb_obuf            ; Get data address
              MOVWF   FSR0               ; Save for indirect
              MOVLW   GB#CONNECT         ; Get connection code
              MOVWF   INDF0              ; Set byte
              INCF    FSR0               ; Increment data address
              MOVLW   3                  ; Get loop count
              MOVWF   gb_cnt             ; Save loop count
```

```
              MOVFP   gb_cid,WREG       ; Get connection info data
              ANDLW   GB#CIDM           ; Mask connection info data
              ;
GB_ENCONN1    MOVWF   INDF0             ; Set byte
              INCF    FSR0              ; Increment data address
              DECFSZ  gb_cnt            ; Done ?
              GOTO    GB_ENCONN1        ; No, continue loop
              ;
              RETURN                    ; Return
;
;************ GB encode data ***********************************
;
; Purpose: Encodes data for Game Boy
;
; Calling parameters: None
; Returned parameters: None
;
;             Set input and output data counts
;
GB_ENDATA     MOVFP   gb_ncode,WREG     ; Get number code
              MOVWF   gb_ocnt           ; Save output count
              RLNCF   gb_ocnt,F         ; Multiple by
              RLNCF   gb_ocnt,F         ;    four
              MOVWF   gb_icnt           ; Save input count
              MOVLW   2                 ; Get input offset
              ADDWF   gb_icnt,F         ; Add to input count
              ;
              MOVLW   gb_obuf           ; Get data address
              MOVWF   FSR0              ; Save for indirect
              MOVFP   gb_ocnt,WREG      ; Get output count
              MOVWF   gb_cnt            ; Save loop count
              ;
GB_ENDATA1    CLRF    INDF0             ; Clear output byte
              INCF    FSR0              ; Increment data address
              DECFSZ  gb_cnt            ; Done ?
              GOTO    GB_ENDATA1        ; No, continue loop
              ;
              MOVLW   gb_obuf-1         ; Get data address
              ADDWF   gb_ocnt,W         ; Add output count
              MOVWF   gb_temp           ; Save for indirect
              MOVLW   2                 ; Get offset value
              SUBWF   gb_icnt,W         ; Input count - offset
              MOVWF   gb_cnt            ; Save loop count
              ;
GB_ENDATA2    DECF    gb_temp           ; Decrement output address
              DECF    gb_temp           ; Decrement output address
              BTFSC   gb_cid,GB#PNR1    ; Port 1 ?
              MOVLW   gd_ihead          ; Yes, get other data
              BTFSC   gb_cid,GB#PNR2    ; Port 2 ?
              MOVLW   gd_ohead          ; Yes, get own data
              ADDWF   gb_cnt,W          ; Add loop count
              MOVWF   FSR0              ; Save for indirect
              MOVFP   INDF0,WREG        ; Get byte
              MOVWF   gb_temp,FSR0      ; Set output address
              MOVWF   INDF0             ; Save output byte
              DECF    gb_temp           ; Decrement output address
              ;
              BTFSC   gb_cid,GB#PNR1    ; Port 1 ?
              MOVLW   gd_ohead          ; Yes, get own data
              BTFSC   gb_cid,GB#PNR2    ; Port 2 ?
              MOVLW   gd_ihead          ; Yes, get other data
              ADDWF   gb_cnt,W          ; Add loop count
              MOVWF   FSR0              ; Save for indirect
              MOVFP   INDF0,WREG        ; Get byte
              MOVWF   gb_temp,FSR0      ; Set output address
              MOVWF   INDF0             ; Save output byte
              DECF    gb_temp           ; Decrement output address
              DECFSZ  gb_cnt            ; Done ?
              GOTO    GB_ENDATA2        ; No, continue loop
              ;
              RETURN                    ; Return
;
;************ GB encode reset data ******************************
;
; Purpose: Encodes reset data for Game Boy
;
; Calling parameters: None
; Returned parameters: None
;
GB_ENRSET     MOVLW   gb_obuf           ; Get data address
              MOVWF   FSR0              ; Save for indirect
              MOVFP   gb_ocnt,WREG      ; Get output count
              MOVWF   gb_cnt            ; Save loop count
              MOVLW   GB#RESET          ; Get reset code
              ;
GB_ENRSET1    MOVWF   INDF0             ; Set byte
              INCF    FSR0              ; Increment data address
              DECFSZ  gb_cnt            ; Done ?
              GOTO    GB_ENRSET1        ; No, continue loop
              ;
              RETURN                    ; Return
;
;************ GB encode start data ******************************
```

```
; Purpose: Encodes start data for Game Boy
;
; Calling parameters: None
; Returned parameters: None
;
GB_ENSTRT   MOVLW   gb_obuf                 ; Get data address
            MOVWF   FSR0                    ; Save for indirect
            MOVLW   GB#CNBC                 ; Get loop count
            MOVWF   gb_cnt                  ; Save loop count
            MOVLW   GB#START                ; Get start code
GB_ENSTRT1  MOVWF   INDF0                   ; Set byte
            INCF    FSR0                    ; Increment data address
            DECFSZ  gb_cnt                  ; Done ?
            GOTO    GB_ENSTRT1              ; No, continue loop
            RETURN                          ; Return
;
;************ GB modem input request *****************************
;
; Purpose: Requests GB modem input
;
; Calling parameters: None
; Returned parameters: None
;
GB_MIRQST   MOVLW   gd_ihead                ; Data address
            MOVWF   FSR0                    ; Save in FSR0
            MOVLW   GB#MIBC                 ; Get modem input byte count
            MOVWF   ek_cnt                  ; Set for DR_IN
            MOVLW   dr_gcntl                ; IOBLK addr
            MOVWF   DR_IN                   ; Setup for input
            CALL    DR_IN
            RETURN                          ; Return
;
;************ GB modem input wait ********************************
;
; Purpose: Waits for GB modem input
;
; Calling parameters: None
; Returned parameters: None
;
GB_MIWAIT   MOVLW   gd_ihead                ; Input packet address
            MOVWF   FSR0                    ; Save for EK_CCS
            MOVFP   gd_ihead,WREG           ; Get header
            ANDLW   EK#MAXM                 ; Mask byte count
            DECF    WREG                    ; Subtract 1
            CALL    EK_CCS                  ; Compute checksum
            CPFSEQ  INDF0                   ; Checksum OK ?
            GOTO    GB_MIWAIT1              ; No, sync modem messages
;
            BSF     gb_mode,GB#RMOR         ; Set remote data received
            BTFSS   gb_cid,GB#PNR2          ; Port 2 ?
            GOTO    GB_MIWAIT2              ; No
;
;           Schedule GB task for Port 2
;
            MOVLW   GB#SDH                  ; Get small delay high
            MOVWF   FSR0                    ; Save period high
            MOVLW   GB#SDL                  ; Get small delay low
            CALL    EK_SCHED_GB             ; Schedule GB task
;
;           Setup for input from modem
;
GB_MIWAIT2  CALL    GB_MIRQST               ; Request GB modem input
            GOTO    GB_MIWAIT3              ; Continue
;
;           Request synchronization of modem messages
;
GB_MIWAIT1  CALL    EK_SYNC                 ; Synchronize modem messages
            BCF     CPUSTA,GLINTD           ; Enable interrupts
GB_MIWAIT3  RETURN                          ; Return
;
;************ GB modem output wait *******************************
;
; Purpose: Waits for GB modem output completion
;
; Calling parameters: None
; Returned parameters: None
;
GB_MOWAIT   RETURN
;
;************ GB scheduled task **********************************
;
; Purpose: Scheduled GB task
;
; Calling parameters: None
; Returned parameters: None
;
GB_SCHED    INCF    gb_index                ; Increment index
            MOVLW   1                       ; Get cycle start count
            CPFSEQ  gb_index                ; Start of cycle ?
            GOTO    GB_SCHED3               ; No, go do I/O
;
```

```
;       Beginning of communication cycle (S)
;
        CALL    GB_CKSTAT       ; Check GB state
;
        BTFSS   gb_mode,GB#DATA ; Data mode ?
        GOTO    GB_SCHED1       ; No
        CALL    GB_ENDATA       ; Encode data for output
        GOTO    GB_SCHED2       ; Continue
;
GB_SCHED1
        CALL    GB_ENCONN       ; Encode connection
        BTFSC   gb_mode,GB#CONN ; Connected ?
        GOTO    GB_SCHED1A      ; Yes
        MOVLW   GB#CNBC
        MOVWF   gb_icnt         ; Set control byte count
        MOVLW   gb_ocnt         ; Set input count
        MOVWF   GB#CINT         ; Set output count
        MOVLW   gb_int          ; Get control byte interval (T)
        MOVWF   gb_int          ; Save interval
        GOTO    GB_SCHED2       ; Continue
;
GB_SCHED1A
        BTFSS   gb_mode,GB#STRT ; Start ?
        GOTO    GB_SCHED1B      ; No
        CALL    GB_ENSTRT       ; Encode start
        GOTO    GB_SCHED2       ; Continue
;
GB_SCHED1B
        BTFSS   gb_mode,GB#RSET ; Reset ?
        GOTO    GB_SCHED2       ; No
        CALL    GB_ENRSET       ; Encode reset
;
GB_SCHED2
        BTFSS   gb_cid,GB#PNR1  ; Port 1 ?
        GOTO    GB_SCHED2B      ; No, go schedule for next byte
        EK_GETSP_GB             ; Get schedule period
        MOVWF   gb_perl         ; Save schedule period low
        MOVPF   FSR0,gb_perh    ; Save schedule period high
        EK_GETDT_GB             ; Get dispatch time
        MOVWF   gb_nxdtl        ; Save dispatch time low
        MOVPF   FSR0,gb_nxdth   ; Save dispatch time high
;
GB_SCHED2B
        MOVFP   gb_int,WREG     ; Get byte interval (T) low
        CLRF    FSR0            ; Get byte interval (T) high
        EK_SCHED_GB             ; Schedule for next byte
;
;       Input and output byte to Game Boy
;
GB_SCHED3
        CALL    GB_DOIO         ; Input and output data
;
;       Check for time to transmit data
;
GB_SCHED4
        MOVFP   gb_icnt,WREG    ; Get input count
        CPFSEQ  gb_index        ; Time for transfer ?
        GOTO    GB_SCHED8       ; No, go check for cycle end
;
;       Set critical dispatch time
;
        MOVFP   gb_perl,WREG    ; Get period low
        MOVFP   gb_perh,FSR0    ; Get period high
        EK_SETCDT               ; Set critical dispatch time
;
;       Setup to transfer data
;
        CALL    GB_CKRSET       ; Check for reset response
        TSTFSZ  WREG            ; Reset response ?
        GOTO    GB_SCHED4A      ; No
        BSF     gb_cid,GB#RREQ  ; Yes, set RESET request
        GOTO    GB_SCHED5       ; Go send control message
;
GB_SCHED4A
        BTFSS   gb_mode,GB#DATA ; Data mode ?
        GOTO    GB_SCHED5       ; No
;
;       Send data message
;
        CALL    GB_SNDM         ; Send data message
        GOTO    GB_SCHED8       ; Go check for cycle end
;
;       Setup control message
;
GB_SCHED5
        BTFSC   gb_mode,GB#CONN ; Connected ?
        GOTO    GB_SCHED5A      ; Yes
        CALL    GB_CKCONN       ; Check for connect response
        TSTFSZ  WREG            ; Connect response ?
        GOTO    GB_SCHED6       ; No
        BSF     gb_mode,GB#CONN ; Set mode CONNECTED
        BTFSC   gb_cid,GB#PNR1  ; Port 1 ?
        BSF     gb_cid,GB#CNS1  ; Yes, set Port 1 connected
        BTFSC   gb_cid,GB#PNR2  ; Port 2 ?
        BSF     gb_cid,GB#CNS2  ; Yes, set Port 2 connected
        GOTO    GB_SCHED6       ; Go send message
;
GB_SCHED5A
        BTFSS   gb_mode,GB#STRT ; Started ?
        GOTO    GB_SCHED6       ; Yes, go send message
        CALL    GB_CKSTRT       ; Check for start request
        TSTFSZ  WREG            ; Start request ?
        GOTO    GB_SCHED6       ; No, go send message
        BSF     gb_cid,GB#SREQ  ; Set START request
;
```

```
;       Send control message
;
GB_SCHED6   CALL    GB_SNCM                 ; Send control message
;
;       Check for end of cycle
;
GB_SCHED8   MOVFP   gb_ocnt,WREG            ; Get output count
            CPFSEQ  gb_index                ; Cycle done ?
            GOTO    GB_SCHED9               ; No, go return
;
            CLRF    gb_index                ; Yes, clear index
            BCF     gb_mode,GB#RSET         ; Clear RESET
            BTFSS   gb_mode,GB#STRT         ; Started ?
            GOTO    GB_SCHED8C              ; No, continue
            BSF     gb_mode,GB#DATA         ; Yes, set DATA
;
;       Adjust interval (T) based on time code
;
            CALL    GB_ADBINT               ; Set byte interval
;
GB_SCHED8C  BTFSS   gb_cid,GB#PNR1          ; Port 1 ?
            GOTO    GB_SCHED8D              ; No
;
;       Restore period and dispatch time of communication cycle
;
            MOVFP   gb_perh,FSR0            ; Get schedule period high
            MOVFP   gb_perl,WREG            ; Get schedule period low
            EK_SETSP_GB                     ; Restore schedule period
            MOVFP   gb_nxdth,FSR0           ; Get dispatch time high
            MOVFP   gb_nxdtl,WREG           ; Get dispatch time low
            EK_SETDT_GB                     ; Restore dispatch time
            GOTO    GB_SCHED9               ; Go return
;
;       Schedule for large delay
;
GB_SCHED8D  MOVLW   GB#LDH                  ; Get large delay high
            MOVWF   FSR0                    ; Save period high
            MOVLW   0                       ; Get large delay low
            EK_SCHED_GB                     ; Schedule for large delay
;
GB_SCHED9   RETURN
;
;************ GB send control message ********************
;
; Purpose: Sends control message to remote Game Boy
;
; Calling parameters: None
;
; Returned parameters: None
;
GB_SNCM     MOVLW   GB#CHDR                 ; Get control header
            MOVWF   gd_ohead                ; Save header
            MOVFP   gb_cid,WREG             ; Get connection info data
            MOVWF   gd_odat1                ; Save for transfer
            MOVFP   gb_tcode,WREG           ; Get time code
            MOVWF   gd_odat2                ; Save for transfer
            MOVFP   gb_ncode,WREG           ; Get number code
            MOVWF   gd_odat3                ; Save for transfer
            MOVLW   gd_ohead                ; Output packet address
            MOVWF   FSR0                    ; Save for EK_CCS
            MOVLW   GB#CCNT-1               ; Get control count
            CALL    EK_CCS                  ; Compute checksum
            MOVFP   WREG,INDF0              ; Save checksum
            MOVLW   gd_ohead                ; Output packet address
            MOVWF   FSR0                    ; Save for DT_OUT
            MOVLW   dt_gcntl                ; Get IOBLK address
            CALL    DT_OUT                  ; Output to modem
            RETURN                          ; Return
;
;************ GB send data message ********************
;
; Purpose: Sends data message to remote Game Boy
;
; Calling parameters: None
; Returned parameters: None
;
GB_SNDM     MOVFP   gb_icnt,WREG            ; Get input count
            IORLW   GD#DHDR                 ; Set header bits
            MOVWF   gd_ohead                ; Save header
            MOVLW   gd_ohead                ; Output packet address
            MOVWF   FSR0                    ; Save for EK_CCS
            MOVFP   gb_icnt,WREG            ; Get input count
            DECF    WREG                    ; Subtract 1
            CALL    EK_CCS                  ; Compute checksum
            MOVFP   WREG,INDF0              ; Save checksum
            MOVLW   gd_ohead                ; Output packet address
            MOVWF   FSR0                    ; Save for EK_CCS
            MOVLW   dt_gcntl                ; Get IOBLK address
            CALL    DT_OUT                  ; Output to modem
            RETURN                          ; Return
```

```
        stitle  "GG task"
;***********************************
*    APS Prototype II Software     *
*    copyright 1993                *
*    Advanced Protocol Systems, Inc. *
;***********************************

GG#MIBC     EQU     3           ; Modem input byte count

;************ GG game input request ************************
;
; Purpose: Requests GG game input
;
; Calling parameters: None
; Returned parameters: None
;
GG_GIRQST   MOVLW   gg_in           ; Data address
            MOVWF   FSR0            ; Save in FSR0
            MOVLW   sp_icntl        ; IOBLK addr
            CALL    DG_IN           ; Setup for input
            RETURN ;********** GG game input wait **********************
;
; Purpose: Waits for GG game input
;
; Calling parameters: None
; Returned parameters: None
;
GG_GIWAIT   MOVFP   gg_in,WREG      ; Get input byte
            MOVWF   gd_odat1        ; Save for output Setup for output to modem MOVLW   3               ; Set byte count
            IORLW   PC#DHDR         ; Set control bits
            MOVWF   gd_ohead        ; Save header
            MOVLW   gd_ohead        ; Output packet address
            MOVWF   FSR0            ; Save for EK_CCS
            MOVLW   2               ; Set checksum count
            CALL    EK_CCS          ; Compute checksum
            MOVFP   WREG,INDF0      ; Save checksum
            MOVLW   gd_ohead        ; Data address
            MOVWF   FSR0            ; Save in FSR0
            MOVLW   dt_gcntl        ; IOBLK addr
            CALL    DT_OUT          ; Output to modem Setup for input from Game Gear CALL    GG_GIRQST       ; Request GG game input
            RETURN                  ; Return ;********** GG game output wait **********************
;
; Purpose: Waits for GG game output completion
;
; Calling parameters: None
; Returned parameters: None
;
GG_GOWAIT   RETURN ;********** GG modem input request **********************
;
; Purpose: Requests GG modem input
;
; Calling parameters: None
; Returned parameters: None
;
GG_MIRQST   MOVLW   gd_ihead        ; Data address
            MOVWF   FSR0            ; Save in FSR0
            MOVLW   GG#MIBC         ; Get modem input byte count
            MOVWF   ek_cnt          ; Set for DR_IN
            MOVLW   dr_gcntl        ; IOBLK addr
            CALL    DR_IN           ; Setup for input
            RETURN                  ; Return ;********** GG modem input wait **********************
;
; Purpose: Waits for GG modem input, and outputs to Game Gear
;
; Calling parameters: None
; Returned parameters: None
;
GG_MIWAIT   MOVLW   gd_ihead        ; Input packet address
            MOVWF   FSR0            ; Save for EK_CCS
            MOVLW   2               ; Set checksum count
            CALL    EK_CCS          ; Compute checksum
            CPFSEQ  INDF0           ; Checksum OK ?
            GOTO    GG_MIWAIT1      ; No, sync modem messages Setup for output to Game Gear MOVFP   gd_idat1,WREG   ; Data from modem
```

```
                MOVWF   gg_out          ; Save for output
                MOVLW   gg_out          ; Data address
                MOVFP   WREG,FSR0       ; Save in FSR0
                MOVLW   sp_ocntl        ; IOBLK addr
                CALL    DG_OUT          ; Setup for output ;       Setup for input from modem CALL    GG_MIRQST       ; Request GG modem input
                GOTO    GG_MIWAIT2      ; Return ;       Request synchronization of modem messages GG_MIWAIT1      CALL    EK_SYNC         ; Synchronize modem messages
                BCF     CPUSTA,GLINTD   ; Enable interrupts
GG_MIWAIT2      RETURN                  ; Return ;********** GG modem output wait *****************************
;
; Purpose: Waits for GG modem output completion
;
; Calling parameters: None
; Returned parameters: None
;
GG_MOWAIT       RETURN
```

```
                stitle  "Modem interrupt handler"
;******************************************************************
;*      APS Prototype II Software                                 *
;*      copyright 1993                                            *
;*      Advanced Protocol Systems, Inc.                           *
;******************************************************************

;************ Modem interrupt handler *****************************

IM_SVC          MOVLB   1                       ; Select bank 1
                MOVLW   EK#PORTC#IN             ; Port C input mode
                MOVWF   DDRC                    ; Set port C mode
                BCF     PORTD,IM#CS             ; Set chip select low
                BCF     PORTD,IM#A1             ; Set config addr 1 low
                BCF     PORTD,IM#RD             ; Set read enable low
                NOP                             ; Hold low a cycle
                MOVFP   PORTC,WREG              ; Read status
                MOVPF   WREG,im_intrpt          ; Save status
                BSF     PORTD,IM#RD             ; Set read enable high
                BSF     PORTD,IM#A1             ; Set config addr 1 high
                BSF     PORTD,IM#CS             ; Set chip select high
                BTFSC   im_intrpt,IM#RBF        ; RBF clear (triggered) ?
                GOTO    IM_SVC5                 ; No, go check CBE ;       RBF triggered, input data from modem CALL    IM_READ                 ; Input byte from modem
                MOVWF   im_byte1                ; Save byte 1
                CALL    IM_READ                 ; Input byte from modem
                MOVWF   im_byte2                ; Save byte 2
                CALL    IM_HAS                  ; Strobe HAS ;       Check first byte for data input MOVLW   IM#DATA                 ; Get data flag
                CPFSEQ  im_byte2                ; Data byte follow ?
                GOTO    IM_SVC3                 ; No, go process command response ;       Check if new message expected TSTFSZ  dr_id                   ; New message expected ?
                GOTO    IM_SVC2                 ; No, continue with old message ;       Identify new message MOVLW   IM#NULL                 ; Get NULL
```

```
;
IM_SVC1   CPFSEQ  im_byte1                ; NULL from modem ?
          GOTO    IM_SVC1                 ; No, continue
          GOTO    IM_SVC5                 ; Go check CBE
          MOVLW   IM#SYNC                 ; Get SYNC
          CPFSEQ  im_byte1                ; SYNC from modem ?
          GOTO    IM_SVC1A                ; No, continue
          CALL    EK_ACK                  ; Yes, send ACK to SYNC
          GOTO    IM_SVC5                 ; Go check CBE
;
IM_SVC1A  MOVLW   IM#ACK                  ; Get ACK
          CPFSEQ  im_byte1                ; ACK from modem ?
          GOTO    IM_SVC1B                ; No, continue
          CLRF    im_await                ; Clear ACK wait
          GOTO    IM_SVC5                 ; Go check CBE
;
IM_SVC1B  TSTFSZ  im_await                ; Waiting for ACK ?
          GOTO    IM_SVC5                 ; Go check CBE
          BTFSC   im_byte1,IM#MT          ; Game header ?
          MOVLW   dr_gcntl                ; Yes, get game IOBLK address
          BTFSS   im_byte1,IM#MT          ; Vocoder header ?
          MOVLW   dr_vcntl                ; Yes, get vocoder IOBLK address
          MOVWF   dr_id                   ; Save IOBLK address
          TSTFSZ  dr_id                   ; Is control block configured
          GOTO    IM_SVC1C                ; Yes, continue checks
          GOTO    IM_SVC4                 ; No, go report error
IM_SVC1C  MOVWF   FSR1                    ; Save for indirect
          MOVPF   INDF1,WREG              ; Get IOBLK cntl
          BTFSS   WREG,EK#BUSY            ; Overrun (BUSY not set) ?
          GOTO    IM_SVC4                 ; Yes, go report error
          ANDLW   EK#MAXM                 ; Mask byte count
          MOVWF   im_byte2                ; Save
          INCF    im_byte2                ; Increment for compare
          MOVPF   im_byte1,WREG
          ANDLW   EK#MAXM                 ; Mask byte count
          BTFSC   ALUSTA,Z                ; Zero byte count ?
          GOTO    IM_SVC4                 ; Yes, go report error
          CPFSGT  im_byte2                ; More bytes than expected ?
          CPFSEQ  im_byte2                ; **** TEST MX4 -- wrong count ?
          GOTO    IM_SVC4                 ; Yes, go report error
          INCF    FSR1                    ; Point to IOBLK
          INCF    FSR1                    ;     cnt
          MOVWF   INDF1                   ; Save byte count
          BTFSC   im_byte1,IM#MT          ; Vocoder header ?
          GOTO    IM_SVC2                 ; No, continue
;
          BTFSC   im_byte1,VC#END         ; End of data ?
          BSF     dr_vcntl,EK#CNTL        ; Set flag for end of data
          BTFSC   im_byte1,VC#STR         ; Start of data ?
          GOTO    IM_SVC2                 ; Yes, continue
          DECF    dr_vcnt                 ; No, decrement byte count
          GOTO    IM_SVC5                 ; Go check CBE
;
; Save message data byte
;
IM_SVC2   MOVFP   dr_id,FSR1              ; Get IOBLK address
          INCF    FSR1                    ; Point IOBLK addr
          MOVFP   INDF1,FSR1              ; Get IOBLK addr
          MOVFP   im_byte1,INDF1          ; Save data byte
          MOVFP   dr_id,FSR1              ; Get IOBLK address
          INCF    FSR1                    ; Point to IOBLK addr
          INCF    INDF1                   ; Increment IOBLK addr
          DECFSZ  FSR1                    ; Point to IOBLK cnt
          GOTO    IM_SVC5                 ; Done ?
                                          ; Go check CBE
;
; Message completed
;
          MOVLW   dr_vcntl                ; Get Vocoder IOBLK ID
          MOVFP   dr_id,FSR1              ; Get IOBLK address
          CPFSEQ  FSR1                    ; IOBLK ID for Vocoder ?
          GOTO    IM_SVC2A                ; No, continue
          BTFSS   INDF1,EK#CNTL           ; End of data ?
          GOTO    IM_SVC2B                ; No, go clear IOBLK ID
IM_SVC2A  BSF     INDF1,EK#DONE           ; Set IOBLK cntl DONE
          BCF     INDF1,EK#BUSY           ; Clear IOBLK cntl BUSY
          BCF     INDF1,EK#CNTL           ; Clear IOBLK cntl CNTL
IM_SVC2B  CLRF    dr_id                   ; Clear IOBLK ID
          GOTO    IM_SVC5                 ; Go check CBE
;
; Save command response message bytes
;
IM_SVC3   MOVLW   dr_ecntl                ; DR#EK IOBLK address
          MOVWF   FSR1                    ; Save for indirect
          BCF     INDF1,EK#BUSY           ; Clear IOBLK cntl BUSY
          INCF    FSR1                    ; Point to IOBLK addr
          MOVFP   INDF1,FSR1              ; Get IOBLK addr
          MOVFP   im_byte1,INDF1          ; Save response byte 1
          INCF    FSR1                    ; Increment address
          MOVFP   im_byte2,INDF1          ; Save response byte 2
          GOTO    IM_SVC5                 ; Go check CBE
;
```

```
              Error has occurred
              ;
IM_SVC4       BTFSS   ek_vocod,5              ; **** TEST MX4 -- test off ?
              GOTO    IM_SVC5                 ; **** TEST MX4 -- yes
              CALL    EK_SYNC                 ; Synchronize modem message
              INCF    im_test                 ; ******* TEST *********
              ;
              ; Check if CBE is triggered
              ;
IM_SVC5       BTFSC   im_intrpt,IM#CBE        ; CBE clear (triggered) ?
              GOTO    IM_SVC9                 ; No, go return
              ;
              ; CBE triggered, check for data output to modem
              ;
              MOVFP   dt_id,FSR1              ; Get IOBLK address
              TSTFSZ  FSR1                    ; Zero ?
              GOTO    IM_SVC6                 ; No, continue
              GOTO    IM_SVC9                 ; Yes, no message pending
              ;
IM_SVC6       BTFSC   INDF1,EK#DONE           ; Is IOBLK cntl DONE ?
              GOTO    IM_SVC9                 ; Yes, wait for post dt process
              CALL    IM_DLY                  ; *** PATCH FOR MODEM BUG ***
              INCF    FSR1                    ; Point to IOBLK addr
              INCF    INDF1                   ; Increment IOBLK addr
              INCF    FSR1                    ; Point to IOBLK cnt
              DECFSZ  INDF1                   ; Done ?
              GOTO    IM_SVC7                 ; No, go output data byte
              ;
              ; Message completed
              ;
              MOVFP   dt_id,FSR1              ; Get IOBLK address
              BSF     INDF1,EK#DONE           ; No, set IOBLK cntl DONE
              BCF     INDF1,EK#BUSY           ; Clear IOBLK cntl BUSY
              GOTO    IM_SVC9                 ; Return from interrupt
              ;
              ; Output byte to modem
              ;
IM_SVC7       MOVFP   dt_id,WREG              ; Get IOBLK address
              CALL    IM_OUT                  ; Output byte
              ;
IM_SVC9       RETURN                          ; Return
              ;
;************ Modem interrupt output ****************************
; Purpose: Transmits byte to modem
; Calling parameters:
;   WREG contains IOBLK address
; Returned parameters: None
;
IM_OUT        MOVWF   FSR1                    ; Save IOBLK address
              MOVLB   1                       ; Select bank 1
              MOVLW   EK#PORTC#OUT            ; Port C output mode
              MOVWF   DDRC                    ; Set port C mode
              MOVLW   dt_cntl                 ; Get DT#EK IOBLK address
              CPFSEQ  FSR1                    ; DT#EK IOBLK ?
              GOTO    IM_OUT1                 ; No
              ;
              ; Modem command
              ;
              INCF    FSR1                    ; Point to
              INCF    FSR1                    ;   IOBLK cnt
              DECF    INDF1                   ; Decrement count
              DECF    FSR1                    ; Point to IOBLK addr
              MOVFP   INDF1,FSR1              ; Get data address
              MOVFP   INDF1,WREG              ; Get command byte
              CALL    IM_WRITE                ; Output first byte
              INCF    FSR1                    ; Increment address
              MOVFP   INDF1,WREG              ; Get second byte
              CALL    IM_WRITE                ; Output second byte
              ;
              RETURN                          ; Return
              ;
              ; Data command
              ;
IM_OUT1       INCF    FSR1                    ; Point to IOBLK addr
              MOVFP   INDF1,FSR1              ; Get data address
              MOVFP   INDF1,WREG              ; Get data byte
              CALL    IM_WRITE                ; Output first byte
              MOVLW   IM#DATA                 ; Get data prefix
              CALL    IM_WRITE                ; Output second byte
              ;
              RETURN                          ; Return
              ;
;************ Modem interrupt read ******************************
; Purpose: Reads byte from modem
; Calling parameters: None
; Returned parameters:
;   WREG contains input byte
;
IM_READ       BCF     PORTD,IM#CS             ; Set chip select low
```

```
        BCF     PORTD,IM#A0     ; Set config addr 0 low
        BCF     PORTD,IM#RD     ; Set read enable low
        NOP                     ; Hold low a cycle
        MOVFP   PORTC,WREG      ; Input byte
        BSF     PORTD,IM#RD     ; Set read enable high
        BSF     PORTD,IM#A0     ; Set config addr 0 high
        BSF     PORTD,IM#CS     ; Set chip select high
        RETURN                  ; Return ;************* Modem interrupt write ******************
;
; Purpose: Writes byte to modem
;
; Calling parameters:
;   WREG contains byte to output
; Returned parameters: None
;
IM_WRITE BCF    PORTD,IM#CS     ; Set chip select low
        BCF     PORTD,IM#A0     ; Set config addr 0 low
        BCF     PORTD,IM#WR     ; Set write enable low
        MOVPF   WREG,PORTC      ; Output byte
        NOP                     ; Hold low a cycle
        BSF     PORTD,IM#WR     ; Set write enable high
        BSF     PORTD,IM#A0     ; Set config addr 0 high
        BSF     PORTD,IM#CS     ; Set chip select high
        RETURN                  ; Return ;*************** Modem Host Acknowledgment Strobe
;*****************************
;
; Purpose: Strobes HAS signal on I/O PORTD
;
; Calling parameters: None
; Returned parameters: None
;
IM_HAS  BCF     PORTD,IM#HAS    ; Set HAS low
        BSF     PORTD,IM#HAS    ; Set HAS hi
        RETURN                  ; Return ;************* Modem Buffer Delay Patch ******************
;
; Purpose: Delays data transmission to the modem (aprox. 30 usec)
;
; Calling parameters: None
; Returned parameters: None
;
IM_DLY  MOVLW   0x25            ; Load delay count
        MOVWF   im_cnt          ; Save in count register
IM_DLY1 DECFSZ  im_cnt          ; Decrement counter
        GOTO    IM_DLY1         ; Keep counting
        RETURN                  ; Return
```

```
        stitle  "Serial port interrupt handler"

;**************************************************
;*       APS Prototype II Software                *
;*       copyright 1993                           *
;*       Advanced Protocol Systems, Inc.          *
;**************************************************

;******** Serial port interrupt handler ******** is_svc  MOVLB   1                       ; Select bank 1
        BTFSS   PIR,SP#RBFL             ; RBFL set ?
        GOTO    IS_SVC2                 ; No, go check TBMT ; RBFL is set, read byte from USART MOVLB   0                       ; Select bank 0
        BTFSC   RCSTA,SP#FERR           ; Framing error ?
        GOTO    IS_SVC1C                ; Yes
        BTFSC   RCSTA,SP#OERR           ; H/W overrun error ?
        GOTO    IS_SVC1B                ; Yes MOVPF   RCREG,sp_temp           ; Save in temp register
        BTFSC   ek_cmnd,EK#ONLN         ; On-line mode ?
        GOTO    IS_SVC1                 ; Yes, put data byte in queue
        CLRF    WREG                    ; No, clear WREG
        CALL    PC_PUTOUT               ; Echo to output queue
        EK_ENABLE_SO                    ; Enable serial output
        CALL    PC_PARS                 ; Parse AT command
        TSTFSZ  WREG                    ; Check if AT control ?
        GOTO    IS_SVC1A                ; Yes, no control bytes in queue is_svc1 BTFSC   sp_icntl,EK#FULL        ; Full input queue ?
        GOTO    IS_SVC1C                ; Yes
        CALL    PC_PUTIN                ; Put data in queue is_svc1a RETURN                         ; Return ; Input error occurred, increment error count is_svc1b BCF    RCSTA,SP#CREN           ; Clear CREN
         BSF    RCSTA,SP#CREN           ; Set CREN
is_svc1c MOVPF  RCREG,sp_temp           ; Save in temp register
         INCF   sp_ierr                 ; Increment error count
         RETURN ; Check TBMT is_svc2 BTFSS   PIR,SP#TBMT             ; TBMT set ?
        GOTO    IS_SVC4                 ; No, return ; TBMT is set, write byte to USART MOVLB   0                       ; Select bank 0
        BTFSS   TXSTA,SP#TRMT           ; TSR empty ?
        GOTO    IS_SVC4A                ; No, error has occurred
        BTFSC   ek_game,EK#RTS          ; OK to send (RTS low) ?
        GOTO    IS_SVC4                 ; No, return
        BTFSS   sp_ocntl,EK#MPTY        ; Queue EMPTY ?
        GOTO    IS_SVC3                 ; No, output byte
        EK_DISABLE_SO                   ; Disable serial output
        GOTO    IS_SVC4                 ; Go return is_svc3 CALL    PC_GETOUT               ; Get byte from queue
        MOVLB   0                       ; Select bank 0
        MOVFP   sp_temp,TXREG           ; Output byte is_svc4 RETURN                          ; Return ; Output error occurred, increment error count is_svc4a INCF   sp_oerr                 ; Increment error count
         RETURN
```

```
        stitle  "PC task"

;****************************************
;*      APS Prototype II Software       *
;*      copyright 1993                  *
;*      Advanced Protocol Systems, Inc. *
;****************************************

PC#MIBC     EQU     3               ; Modem input byte count

;************ PC queue init ****************************

; Purpose: Initializes PC i/o queues
;
; Calling parameters: None
; Returned parameters: None
;
PC_QINIT    MOVLW   sp_in           ; Data address
            MOVWF   sp_iput         ; Save as put address
            MOVWF   sp_iget         ; Save as get address
            BSF     sp_icntl,EK#MPTY; Set queue empty flag MOVLW   sp_out          ; Data address
            MOVWF   sp_oput         ; Save as put address
            MOVWF   sp_oget         ; Save as get address
            BSF     sp_ocntl,EK#MPTY; Set queue empty flag
            RETURN ;********** Put In Q *******************************

; Purpose: Puts a byte into the input queue
;
; Calling parameters: sp_temp
;   sp_temp contains data byte
; Returned parameters: None
;
PC_PUTIN    BTFSC   sp_icntl,EK#FULL; Is queue FULL ?
            GOTO    PC_PUTINE       ; Yes MOVFP   sp_iput,FSR1    ; Get put address
            MOVPF   sp_temp,INDF1   ; Input byte
            INCF    sp_icntl        ; Increment queue count
            BCF     sp_icntl,EK#MPTY; Clear queue EMPTY flag INCF    sp_iput         ; Increment put address
            MOVLW   sp_out          ; Load end of buffer
            CPFSEQ  sp_iput         ; End of buffer ?
            GOTO    PC_PUTIN1       ; No
            MOVLW   sp_in           ; Load start of buffer
            MOVWF   sp_iput         ; Reset put address
PC_PUTIN1   MOVFP   sp_iget,WREG    ; Load get pointer
            CPFSEQ  sp_iput         ; Buffer full ?
            GOTO    PC_PUTINE       ; No
            BSF     sp_icntl,EK#FULL; Set queue FULL flag
PC_PUTINE   RETURN                  ; Return ;********** Get In Q *******************************

; Purpose: Gets a byte from the input queue
;
; Calling parameters: None
; Returned parameters: sp_temp
;   sp_temp contains data byte
;
PC_GETIN    BTFSC   sp_icntl,EK#MPTY; Is queue EMPTY ?
            GOTO    PC_GETINE       ; Yes BCF     sp_icntl,EK#FULL; Clear queue FULL flag
            MOVFP   sp_iget,FSR1    ; Get get address
            MOVPF   INDF1,sp_temp   ; Get data byte
            DECFSZ  sp_icntl        ; Decrement queue count
            GOTO    PC_GETIN1       ; No
            BSF     sp_icntl,EK#MPTY; Set queue EMPTY flag PC_GETIN1   INCF    sp_iget         ; Increment get address
            MOVLW   sp_out          ; Load end of buffer
            CPFSEQ  sp_iget         ; End of buffer ?
            GOTO    PC_GETINE       ; No
            MOVLW   sp_in           ; Load start of buffer
            MOVWF   sp_iget         ; Reset get address
PC_GETINE   RETURN                  ; Return ;********** Put Out Q ******************************

; Purpose: Puts a byte into the output queue
;
; Calling parameters: sp_temp
;   sp_temp contains data byte
; Returned parameters: None
;
PC_PUTOUT   BTFSC   sp_ocntl,EK#FULL; Is queue FULL ?
```

```
            GOTO    PC_PUTOUTE          ; Yes
            MOVFP   sp_oput,FSR1        ; Get put address
            MOVFP   sp_temp,INDF1       ; Input byte
            INCF    sp_ocntl            ; Increment queue count
            BCF     sp_ocntl,EK#MPTY    ; Clear queue EMPTY flag
            ;
            INCF    sp_oput             ; Increment put address
            MOVLW   sp_end              ; Load end of buffer
            CPFSEQ  sp_oput             ; End of buffer ?
            GOTO    PC_PUTOUT1          ; No
            MOVLW   sp_out              ; Load start of buffer
            MOVWF   sp_oput             ; Reset put address
            ;
PC_PUTOUT1  MOVFP   sp_oget,WREG        ; Load get pointer
            CPFSEQ  sp_oput             ; Buffer full ?
            GOTO    PC_PUTOUTE          ; No
            BSF     sp_ocntl,EK#FULL    ; Set queue FULL flag
            ;
PC_PUTOUTE  RETURN                      ; Return
;
;*********** Get Out Q *********************************************
;
; Purpose: Gets a byte from the output queue
;
; Calling parameters: None
; Returned parameters: sp_temp
;   sp_temp contains data byte
;
PC_GETOUT   BTFSC   sp_ocntl,EK#MPTY    ; Is queue EMPTY ?
            GOTO    PC_GETOUTE          ; Yes
            ;
            BCF     sp_ocntl,EK#FULL    ; Clear queue FULL flag
            MOVFP   sp_oget,FSR1        ; Get get address
            MOVPF   INDF1,sp_temp       ; Get data byte
            DECFSZ  sp_ocntl            ; Decrement queue count
            GOTO    PC_GETOUT1          ; No
            BSF     sp_ocntl,EK#MPTY    ; Set queue EMPTY flag
            ;
PC_GETOUT1  INCF    sp_oget             ; Increment get address
            MOVLW   sp_end              ; Load end of buffer
            CPFSEQ  sp_oget             ; End of buffer ?
            GOTO    PC_GETOUTE          ; No
            MOVLW   sp_out              ; Load start of buffer
            MOVWF   sp_oget             ; Reset get address
            ;
PC_GETOUTE  RETURN                      ; Return
```

```
;*********** PC input wait *****************************************
;
; Purpose: Waits for PC input
;
; Calling parameters: None
; Returned parameters: None
;
PC_INWAIT   RETURN
;
;*********** PC output wait ****************************************
;
; Purpose: Waits for PC output completion
;
; Calling parameters: None
; Returned parameters: None
;
PC_OUTWAIT  RETURN
;
;*********** PC modem input request ********************************
;
; Purpose: Requests PC modem input
;
; Calling parameters: None
; Returned parameters: None
;
PC_MIRQST   MOVLW   gd_ihead            ; Data address
            MOVWF   FSR0                ; Save in FSR0
            MOVLW   0x07                ; Get modem input byte count
            MOVWF   ek_cnt              ; Set for DR_IN
            MOVLW   dr_gcntl            ; IOBLK addr
            CALL    DR_IN               ; Setup for input
            RETURN                      ; Return
;
;*********** PC modem input wait ***********************************
;
; Purpose: Waits for PC modem input, and configures output to PC
;
; Calling parameters: None
; Returned parameters: None
;
PC_MIWAIT   ;       MOVLW   gd_ihead    ; Input packet address
            ;       MOVWF   FSR0        ; Save for EK_CCS
            ;       DECF    gd_ihead,W  ; Decrement and load header
            ;       ANDLW   EK#MAXM     ; Mask checksum count
            ;       CALL    EK_CCS      ; Compute checksum
            ;       CPFSEQ  INDF0       ; Checksum OK ?
```

```
            GOTO    PC_MIWAIT2      ; No, sync modem messages
;
; Setup output to PC
;
PC_MIWAIT1  BSF     CPUSTA,GLINTD   ; Disable interrupts
            BTFSS   CPUSTA,GLINTD   ; Verify interrupts ?
            GOTO    PC_MIWAIT1      ; No, try again
            CALL    PC_MDMIN        ; Format PC output
;
; Setup for input from modem
;
            CALL    PC_MIRQST       ; Request PC modem input
            GOTO    PC_MIWAIT3      ; Return
;
; Request synchronization of modem messages
;
PC_MIWAIT2  CALL    EK_SYNC         ; Synchronize modem messages
            BCF     CPUSTA,GLINTD   ; Enable interrupts ???
;
PC_MIWAIT3  BCF     CPUSTA,GLINTD   ; Enable interrupts
            RETURN                  ; Return
;
;*************** PC modem output wait *********************
; Purpose: Waits for PC modem output completion
; Calling parameters: None
; Returned parameters: None
;
PC_MOWAIT   RETURN
;
;*************** PC modem output *********************
; Purpose: Configures PC input for modem output
; Calling parameters: None
; Returned parameters: None
;
PC_MDMOUT   BTFSC   dt_gcntl,EK#BUSY; Modem already transmitting ?
            GOTO    PC_MDMOUTE      ; Yes
            BTFSC   dt_gcntl,EK#DONE; Modem already transmitting ?
            GOTO    PC_MDMOUTE      ; Yes
            BTFSC   sp_icntl,EK#MPTY; Is input queue EMPTY ?
            GOTO    PC_MDMOUTE      ; Yes
            BTFSC   sp_icntl,EK#FULL; Is input queue FULL ?
            GOTO    PC_MDMOUT1      ; Yes
;
; Check if modem available to transmit, if not return
;
            TSTFSZ  dt_id           ; Is modem busy ?
            RETLW   1               ; Try again later
;
; Setup for output to modem (3+ byte packet: header, data, checksum)
;
PC_MDMOUT1  CLRF    gd_ohead        ; Clear output header
            MOVLW   gd_ohead        ; Get address
            MOVFP   WREG,FSR0       ; Load address
            INCF    FSR0            ; Increment address
;
PC_MDMOUTL  CALL    PC_GETIN        ; Get from input queue
            MOVFP   sp_temp,WREG    ; Get data byte
            MOVPF   WREG,INDF0      ; Load data to modem buffer
            INCF    FSR0            ; Increment address
            INCF    gd_ohead        ; Increment packet count
            BTFSS   sp_icntl,EK#MPTY; Is input queue EMPTY ?
            GOTO    PC_MDMOUTL      ; Yes
;
PC_MDMOUT2  INCF    gd_ohead        ; Increment header
            INCF    gd_ohead,W      ; Increment and load header
            IORLW   PC#DHDR         ; Set control bits
            MOVWF   gd_ohead        ; Save header
            MOVLW   gd_ohead        ; Output packet address
            MOVWF   FSR0            ; Save for EK_CCS
            DECF    gd_ohead,W      ; Decrement and load for CCS
            ANDLW   EK#MAXM         ; Mask checksum count
            CALL    EK_CCS          ; Compute checksum
            MOVFP   WREG,INDF0      ; Save checksum
            MOVLW   gd_ohead        ; Data address
            MOVWF   FSR0            ; Save in FSR0
            MOVLW   dt_gcntl        ; IOBLK addr
            CALL    DT_OUT          ; Output to modem
;
PC_MDMOUTE  RETLW   0               ; Return
;
;************** PC Modem Input *********************
; Purpose: Configures modem input for output to PC
; Calling parameters: None
; Returned parameters: None
;
PC_MDMIN    MOVFP   gd_ihead,WREG   ; Load header
            ANDLW   EK#MAXM         ; Mask checksum count
            MOVWF   gd_ihead        ; Load count
```

```
              DECF    gd_ihead                ; Subtract header
              DECF    gd_ihead                ; Subtract checksum
       ;
              MOVLW   gd_ihead                ; Get address
              MOVFP   WREG,FSR0               ; Load address
              INCF    FSR0                    ; Increment address
       ;
PC_MDMIN1     MOVFP   INDF0,WREG              ; Load data from modem
              MOVPF   WREG,sp_temp            ; Save in temp register
              CALL    PC_PUTOUT               ; Put in output queue
              INCF    FSR0                    ; Increment address
              DECFSZ  gd_ihead                ; Counter zero ?
              GOTO    PC_MDMIN1               ; Loop back
              EK_ENABLE_SO                    ; Enable serial output
       ;
              RETURN                          ; Return
       ;
; ************* AT parse ********************************************
;
; Purpose: Parses the AT command
;
; Calling parameters: sp_temp contains byte to check
; Returned parameters: WREG
; WREG non zero if AT control byte
; WREG zero if AT command byte
;
PC_PARS       GOTO    PC_PARSR                ; *** TEST MX3 -- execute
 <CR>
              BTFSS   sp_icntl,EK#FULL        ; Input queue full ?
              GOTO    PC_PARSA                ; No, do standard parse
              BSF     ek_cmnd,EK#A            ; Set A state
              BSF     ek_cmnd,EK#T            ; Set T state
              GOTO    PC_PARSR                ; Look for carriage return
;
; Look for A state signal
;
PC_PARSA      BTFSC   ek_cmnd,EK#A            ; Already in A state ?
              GOTO    PC_PARST                ; Yes
       ;
              MOVLW   0x41                    ; load 'A' character
              CPFSEQ  sp_temp                 ; Compare with value ?
              GOTO    PC_PARSA1               ; No match
              BSF     ek_cmnd,EK#A            ; Set A state
              RETLW   1                       ; Return
       ;
PC_PARSA1     MOVLW   0x61                    ; load 'a' character
              CPFSEQ  sp_temp                 ; Compare with value ?
              GOTO    PC_PARSE                ; No match
              BSF     ek_cmnd,EK#A            ; Set A state
              RETLW   1                       ; Return
;
; Look for T state signal
;
PC_PARST      BTFSC   ek_cmnd,EK#T            ; Already in T state ?
              GOTO    PC_PARSR                ; Yes
       ;
              MOVLW   0x54                    ; load 'T' character
              CPFSEQ  sp_temp                 ; Compare with value ?
              GOTO    PC_PARST1               ; No match
              BSF     ek_cmnd,EK#T            ; Set T state
              RETLW   1                       ; Return
       ;
PC_PARST1     MOVLW   0x74                    ; load 't' character
              CPFSEQ  sp_temp                 ; Compare with value ?
              GOTO    PC_PARSE                ; No match
              BSF     ek_cmnd,EK#T            ; Set T state
              RETLW   1                       ; Return
;
; Look for CR state signal
;
PC_PARSR      MOVLW   0x0D                    ; load <CR> character
              CPFSEQ  sp_temp                 ; Compare with value ?
              GOTO    PC_PARSE                ; No match
              BSF     ek_cmnd,EK#X            ; Set X state
              BCF     ek_cmnd,EK#A            ; Clear A state
              BCF     ek_cmnd,EK#T            ; Clear T state
              RETLW   1                       ; Return
       ;
              CLRF    WREG                    ; Clear WREG
PC_PARSE      RETLW   0                       ; Return
;
; ************* AT response *****************************************
;
; Purpose: Configures an AT response
;
; Calling parameters: sp_temp
; sp_temp contains requested response code
; Returned parameters: None
;
PC_RSPNS      BTFSC   ek_cmnd,EK#VERB         ; In verbose mode ?
              GOTO    PC_RSPNSN               ; No
;
; The 'ok' resposnse
```

```
; The 'error' response
PC_RSPNS1
        MOVLW   0x30            ; ok response
        CPFSEQ  sp_temp         ; Compare with request ?
        GOTO    PC_RSPNS1       ; No match Setup output to PC MOVLW   0x0A            ; <LF> character
        MOVPF   WREG,sp_temp    ; Save in temp
        CALL    PC_PUTOUT       ; Put in output queue MOVLW   0x0D            ; <CR> character
        MOVPF   WREG,sp_temp    ; Save in temp
        CALL    PC_PUTOUT       ; Put in output queue MOVLW   0x6F            ; 'o' character
        MOVPF   WREG,sp_temp    ; Save in temp
        CALL    PC_PUTOUT       ; Put in output queue MOVLW   0x6B            ; 'k' character
        MOVPF   WREG,sp_temp    ; Save in temp
        CALL    PC_PUTOUT       ; Put in output queue
        GOTO    PC_RSPNSV       ; Enable output ; The 'error' response
PC_RSPNS1
        MOVLW   0x34            ; error response
        CPFSEQ  sp_temp         ; Compare with request ?
        GOTO    PC_RSPNS2       ; No match Setup output to PC MOVLW   0x0A            ; <LF> character
        MOVPF   WREG,sp_temp    ; Save in temp
        CALL    PC_PUTOUT       ; Put in output queue MOVLW   0x0D            ; <CR> character
        MOVPF   WREG,sp_temp    ; Save in temp
        CALL    PC_PUTOUT       ; Put in output queue MOVLW   0x65            ; 'e' character
        MOVPF   WREG,sp_temp    ; Save in temp
        CALL    PC_PUTOUT       ; Put in output queue MOVLW   0x72            ; 'r' character
        MOVPF   WREG,sp_temp    ; Save in temp
        CALL    PC_PUTOUT       ; Put in output queue MOVLW   0x72            ; 'r' character
        MOVPF   WREG,sp_temp    ; Save in temp
        CALL    PC_PUTOUT       ; Put in output queue MOVLW   0x6F            ; 'o' character
        MOVPF   WREG,sp_temp    ; Save in temp
        CALL    PC_PUTOUT       ; Put in output queue MOVLW   0x72            ; 'r' character
        MOVPF   WREG,sp_temp    ; Save in temp
        CALL    PC_PUTOUT       ; Put in output queue
        GOTO    PC_RSPNSV       ; Enable output ; The 'id' response
PC_RSPNS2
        MOVLW   0x39            ; error response
        CPFSEQ  sp_temp         ; Compare with request ?
        GOTO    PC_RSPNSE       ; No match Setup output to PC MOVLW   0x0A            ; <LF> character
        MOVPF   WREG,sp_temp    ; Save in temp
        CALL    PC_PUTOUT       ; Put in output queue MOVLW   0x0D            ; <CR> character
        MOVPF   WREG,sp_temp    ; Save in temp
        CALL    PC_PUTOUT       ; Put in output queue MOVLW   0x41            ; A character
        MOVPF   WREG,sp_temp    ; Save in temp
        CALL    PC_PUTOUT       ; Put in output queue MOVLW   0x50            ; P character
        MOVPF   WREG,sp_temp    ; Save in temp
        CALL    PC_PUTOUT       ; Put in output queue MOVLW   0x53            ; S character
        MOVPF   WREG,sp_temp    ; Save in temp
        CALL    PC_PUTOUT       ; Put in output queue MOVLW   0x20            ; <SP> character
        MOVPF   WREG,sp_temp    ; Save in temp
        CALL    PC_PUTOUT       ; Put in output queue MOVLW   0x56            ; V character
```

```
                        GOTO    PC_CMNDS1           ; Go to standard command
;
; The 'verbose' command
;
PC_CMNDS1               MOVLW   0x56                ; 'V' command
                        CPFSEQ  sp_temp             ; Compare with request ?
                        GOTO    PC_CMNDS2           ; No match
                        BSF     ek_cmnd,EK#VERB     ; Set verbose mode (default)
                        BTFSC   sp_icntl,EK#MPTY    ; Is that all ?
                        GOTO    PC_CMNDOK           ; Yes, send response
;
                        CALL    PC_GETIN            ; Get command byte
                        MOVLW   0x30                ; '0' command
                        CPFSEQ  sp_temp             ; Compare with request ?
                        GOTO    PC_CMNDS1A          ; No match
                        BCF     ek_cmnd,EK#VERB     ; Set verbose mode
                        GOTO    PC_CMNDOK           ; Yes, send response
;
PC_CMNDS1A              MOVLW   0x31                ; '1' command
                        CPFSEQ  sp_temp             ; Compare with request ?
                        GOTO    PC_CMNDERR          ; No match
                        BCF     ek_cmnd,EK#VERB     ; Set verbose mode (default)
                        GOTO    PC_CMNDOK           ; Yes, send response
;
; The 'identify' command
;
PC_CMNDS2               MOVLW   0x49                ; 'I' command
                        CPFSEQ  sp_temp             ; Compare with request ?
                        GOTO    PC_CMNDS3           ; No match
                        GOTO    PC_CMND1D           ; Yes, send response
;
; The 'on-line' command
;
PC_CMNDS3               MOVLW   0x4F                ; 'O' command
                        CPFSEQ  sp_temp             ; Compare with request ?
                        GOTO    PC_CMNDS4           ; No match
                        CALL    PC_MIRQST           ; Configure PC modem input
                        BSF     ek_cmnd,EK#ONLN     ; Set on-line mode
                        BTFSC   sp_icntl,EK#MPTY    ; Enable flow control
                        GOTO    PC_CMNDOK           ; Is that all ?
                                                    ; Yes, send response
;
; The 'next' command
;
PC_CMNDS4               GOTO    PC_CMNDERR          ; Go to error
;
; Command Responses
;
                        MOVPF   WREG,sp_temp        ; Save in temp
                        CALL    PC_PUTOUT           ; Put in output queue
;
                        MOVLW   0x30                ; 0 character
                        MOVPF   WREG,sp_temp        ; Save in temp
                        CALL    PC_PUTOUT           ; Put in output queue
;
                        MOVLW   0x2E                ; "." character
                        MOVPF   WREG,sp_temp        ; Save in temp
                        CALL    PC_PUTOUT           ; Put in output queue
;
                        MOVLW   0x31                ; 1 character
                        MOVPF   WREG,sp_temp        ; Save in temp
                        CALL    PC_PUTOUT           ; Put in output queue
                        GOTO    PC_RSPNSV           ; Enable output
;
; Non-verbose mode
;
PC_RSPNSN               CALL    PC_PUTOUT           ; Put in output queue
;
                        MOVLW   0x0A                ; <LF> character
                        MOVPF   WREG,sp_temp        ; Save in temp
                        CALL    PC_PUTOUT           ; Put in output queue
;
                        MOVLW   0x0D                ; <CR> character
                        MOVPF   WREG,sp_temp        ; Save in temp
                        CALL    PC_PUTOUT           ; Put in output queue
;
PC_RSPNSV               EK_ENABLE_SO                ; Enable serial output
PC_RSPNSE               RETURN                      ; Return
;
;************ PC command interpreter ****************************
;
; Purpose: Interprets the AT command in the input queue
;
; Calling parameters: None
; Returned parameters: None
;
PC_CMND                 BSF     CPUSTA,GLINTD       ; Disable interrupts
                        BTFSS   CPUSTA,GLINTD       ; Verify interrupts ?
                        GOTO    PC_CMND             ; No, try again
                        BTFSC   sp_icntl,EK#MPTY    ; Is that all ?
                        GOTO    PC_CMNDOK           ; Yes, send response
                        BTFSC   sp_icntl,EK#FULL    ; Is buffer full ?
                        GOTO    PC_CMNDERR          ; Yes, report error
                        CALL    PC_GETIN            ; Get command byte
                        CALL    PC_UPPR             ; Change to upper case
```

```
;************************* Register Definitions *************************

; Begin register definitions
        CBLOCK  0x00
        INDF0           ; Use FRS0 to address memory (not physical reg)
        FSR0            ; Indirect data memory address 0
        PCLO            ; Program counter low byte
        PCHI            ; Program counter high byte
        ALUSTA          ; ALU status register
        RTCSTA          ; RTCC status register
        CPUSTA          ; CPU status register
        INTSTA          ; Interrupt status register
        INDF1           ; Use FRS1 to address memory (not physical reg)
        FSR1            ; Indirect data memory address 1
        WREG            ; Working register
        RTCCL           ; RTCC low byte
        RTCCH           ; RTCC high byte
        TBLPTRL         ; Program memory table pointer low byte
        TBLPTRH         ; Program memory table pointer high byte
        BSR             ; Bank select register
        ENDC CBLOCK  0x10    ; Bank 0
        PORTA           ; I/O port A
        DDRB            ; Data direction bits, port B
        PORTB           ; I/O port B
        RCSTA           ; Receive status/control register
        RCREG           ; Receive buffer register
        TXSTA           ; Transmit status/control register
        TXREG           ; Transmit buffer register
        SPBRG           ; Baud rate generator
        ENDC CBLOCK  0x10    ; Bank 1
        DDRC            ; Data direction bits, port C
        PORTC           ; I/O port C
        DDRD            ; Data direction bits, port D
        PORTD           ; I/O port D
        DDRE            ; Data direction bits, port E
        PORTE           ; I/O port E
        PIR             ; Peripheral interrupt flag register
        PIE             ; Peripheral interrupt enable register
        ENDC CBLOCK  0x10    ; Bank 2
        TMR1            ; Timer/counter 1
        TMR2            ; Timer/counter 2
        TMR3L           ; Timer/counter 3 low byte PC_CMNDOK   MOVLW   0x30
            MOVPF   WREG,sp_temp        ; Load response request
            CALL    PC_RSPNS            ; Save in temp register
            BCF     ek_cmnd,EK#X        ; Configure AT response
            GOTO    PC_CMNDE            ; Clear X state
                                        ; Go return
;
PC_CMNDID   MOVLW   0x39
            MOVPF   WREG,sp_temp        ; Load response request
            CALL    PC_RSPNS            ; Save in temp register
            BCF     ek_cmnd,EK#X        ; Configure AT response
            GOTO    PC_CMNDE            ; Clear X state
                                        ; Go return
;
; Purge buffer and send error response
;
PC_CMNDERR  BTFSC   sp_icntl,EK#MPTY;   Is that all ?
            GOTO    PC_CMNDERR1         ; Yes, send response
            CALL    PC_GETIN            ; Get command byte
            GOTO    PC_CMNDERR          ; Continue buffer purge
;
PC_CMNDERR1 MOVLW   0x34
            MOVPF   WREG,sp_temp        ; Load response request
            CALL    PC_RSPNS            ; Save in temp register
            BCF     ek_cmnd,EK#X        ; Configure AT response
            GOTO    PC_CMNDE            ; Clear X state
                                        ; Go return
;
PC_CMNDE    BCF     CPUSTA,GLINTD       ; Enable interrupts
            RETURN                      ; Return
;
;************** PC Upper Case *******************************
;
; Purpose: Changes lower case letter to upper case
;
; Calling parameters: sp_temp
; sp_temp contains data
; Returned parameters: sp_temp
;
PC_UPPR     MOVLW   0x60
            CPFSGT  sp_temp             ; Load first lower case
            RETURN                      ; Is data upper ?
            MOVLW   0x20                ; No, return
            SUBWF   sp_temp             ; Load offset
            RETURN                      ; Subtract offset
                                        ; Return
;
```

```
                TMR3H                           ; Timer/counter 3 high byte
                PR1                             ; Period register 1
                PR2                             ; Period register 2
                PR3L                            ; Period register 3 low byte
                PR3H                            ; Period register 3 high byte
                ENDC CBLOCK  0x16                    ; Bank 2 (redefined)
                CA1L                            ; Capture register 1 low byte
                CA1H                            ; Capture register 1 high byte
                ENDC CBLOCK  0x10                    ; Bank 3
                PW1DCL                          ; PWM1 duty cycle lower 2 bits
                PW2DCL                          ; PWM2 duty cycle lower 2 bits
                PW1DCH                          ; PWM1 duty cycle upper 8 bits
                PW2DCH                          ; PWM2 duty cycle upper 8 bits
                CA2L                            ; Capture register 2 low byte
                CA2H                            ; Capture register 2 high byte
                TCON1                           ; Timer/capture/PWM control reg 1
                TCON2                           ; Timer/capture/PWM control reg 2
                ENDC ; Assembler directives
;
W               EQU     0                       ; Destination is WREG
F               EQU     1                       ; Destination is file register
;
C               EQU     0                       ; ALU register Carry Flag bit
Z               EQU     2                       ; ALU register Zero Flag bit
GLINTD          EQU     4                       ; CPU register Global Interrupt Flag bit stitle  "Start Up Procedures"

;****************************************************
;*      APS Prototype II Software                   *
;*      copyright 1993                              *
;*      Advanced Protocol Systems, Inc.             *
;****************************************************

;************* Executive start modem ****************
; Purpose: Resets & determines the ORIGINATE/RECEIVE mode of the modem
;
; Calling parameters: None
; Returned parameters: None
;
;MC#CFG1A        EQU     0x20                    ; Config word 1, ANSWER
;MC#CFG1O        EQU     0x28                    ; Config word 1, ORIGINATE
;MC#CFG1R        EQU     0x00                    ; Config word 1, rate = 14.4
;MC#CFG2H        EQU     0x39                    ; Config word 2 high
;MC#CFG2L        EQU     0x73                    ; Config word 2 low
;MC#OFFHKH       EQU     0xA0                    ; Off Hook command hi
;MC#OFFHKL       EQU     0x60                    ; Off Hook command lo
;MC#RSETH        EQU     0xB8                    ; Modem Reset Status hi
;MC#RSETL        EQU     0x00                    ; Modem Reset Status lo
;MC#STH          EQU     0xA0                    ; Silence transmitter high
;MC#STL          EQU     0x00                    ; Silence transmitter low
;MC#TDAL         EQU     0x07                    ; TX DTMF ACK low
;MC#TDSL         EQU     0x03                    ; TX DTMF SYNC low
;MC#TDTH         EQU     0x60                    ; TX DTMF tone high
;
MC#MWVM         EQU     0x1F                    ; Modem wait value mask
MC#MWVC         EQU     5                       ; Modem wait value constant
MC#TCNT         EQU     5                       ; Modem try count
;
; Determine if originate/answer mode is being negotiated.
;
EK_STRT         BTFSC   ek_stat,EK#CNFG         ; Configured ?
                GOTO    EK_STRT7                ; Yes
                BTFSC   ek_stat,EK#OFFH         ; Off-hook ?
                GOTO    EK_STRT1                ; Yes
;
; Reset modem chips.
;
;               BTFSC   ek_stat,EK#LISN         ; *** TEST VC2 -- modem by-pass
;               GOTO    EK_STRT8                ; *** TEST VC2 -- modem by-pass TSTFSZ  ek_mwcnt                ; POR complete ?
```

```
              GOTO    EK_OFFH1           ; Yes, go off-hook
              BTFSC   ek_stat,EK#LISN    ; Waiting for response ?
              GOTO    EK_POR             ; Yes, look for response
              MOVLW   ek_mibyte1         ; No, get response address
              MOVWF   FSR0                ; Save for DR_INE
              CALL    DR_INE             ; Set busy flg, req response
              BSF     ek_stat,EK#LISN    ; Set for listen EK_POR        CALL    IM_SVC             ; Will clear busy flag
              BTFSC   dr_ecntl,EK#BUSY;  Busy flag clear ?
              GOTO    EK_STRT9           ; No, go return
              MOVLW   0x00               ; Yes, load reset status lo
              CPFSEQ  ek_mibyte1         ; Equals reset reponse lo
              GOTO    EK_STRT9           ; Go return
              MOVLW   0xB8               ; Load reset status hi
              CPFSEQ  ek_mibyte2         ; Equals reset reponse hi
              GOTO    EK_STRT9           ; Go return
              BCF     ek_stat,EK#LISN    ; Clear listen flag
              INCF    ek_mwcnt           ; Set POR complete ; Reset complete, set interupt masks.

MOVLB   1                  ; Select bank 1
              MOVLW   EK#PORTC#OUT       ; Port C output mode
              MOVWF   DDRC                ; Set port C mode
              BCF     PORTD,IM#CS        ; Set chip select low
              BCF     PORTD,IM#A1        ; Set config addr 1 low
              BCF     PORTD,IM#WR        ; Set write enable low
              MOVLW   0x9F               ; Set INTERUPT MASK
              MOVPF   WREG,PORTC         ; Output interrupt mask
              BSF     PORTD,IM#WR        ; Set write enable high
              BSF     PORTD,IM#A1        ; Set config addr 1 high
              BSF     PORTD,IM#CS        ; Set chip select high
              GOTO    EK_STRT9           ; Go return ; Set V24 multiplexer.

EK_OFFH1      MOVLW   1                  ; Get 1
              CPFSEQ  ek_mwcnt           ; Off-hook ONE complete ?
              GOTO    EK_OFFH2           ; Yes
              MOVLW   0x04               ; Off-hook one low    *******
              MOVWF   ek_mobyte1         ; Move to output buffer
              MOVLW   0xF2               ; Off-hook one high
              MOVWF   ek_mobyte2         ; Move to output buffer
              CALL    EK_SDMC            ; Send off-hook one command
              INCF    ek_mwcnt           ; Set off-hook ONE complete
              GOTO    EK_STRT9           ; Go return ;******************************** 14.4K or 9.6K only
; Set rate sequence.

EK_OFFH2      MOVLW   2                  ; Get 2
              CPFSEQ  ek_mwcnt           ; Off-hook TWO complete ?
              GOTO    EK_OFFH3           ; Yes
              MOVLW   0x9B               ; Off-hook two low    *******
              MOVWF   ek_mobyte1         ; Move to output buffer
              MOVLW   0x1B               ; Off-hook two high
              MOVWF   ek_mobyte2         ; Move to output buffer
              CALL    EK_SDMC            ; Send configure command
              INCF    ek_mwcnt           ; Set off-hook TWO complete
              GOTO    EK_STRT9           ; Go return ; Set transmit attenuation.

EK_OFFH3      MOVLW   3                  ; Get 3
              CPFSEQ  ek_mwcnt           ; Off-hook THREE complete ?
              GOTO    EK_OFFH4           ; Yes
              MOVLW   0x01               ; Off-hook low
              MOVWF   ek_mobyte1         ; Move to output buffer
              MOVLW   0x00               ; Off-hook high
              MOVWF   ek_mobyte2         ; Move to output buffer
              CALL    EK_SDMC            ; Send configure command
              INCF    ek_mwcnt           ; Set off-hook THREE complete
              GOTO    EK_STRT9           ; Go return ; Enable HAD and constellation eye.

EK_OFFH4      MOVLW   4                  ; Get 4
              CPFSEQ  ek_mwcnt           ; Off-hook FOUR complete ?
              GOTO    EK_OFFH5           ; Yes
              MOVLW   0x31               ; Off-hook low
              MOVWF   ek_mobyte1         ; Move to output buffer
              MOVLW   0xA0               ; Off-hook high
              MOVWF   ek_mobyte2         ; Move to output buffer
              CALL    EK_SDMC            ; Send configure command
              INCF    ek_mwcnt           ; Set off-hook FOUR complete
              GOTO    EK_STRT9           ; Go return ; Go off-hook.

EK_OFFH5      MOVLW   0x60               ; Off-hook low
              MOVWF   ek_mobyte1         ; Move to output buffer
              MOVLW   0xA0               ; Off-hook high
              MOVWF   ek_mobyte2         ; Move to output buffer
              CALL    EK_SDMC            ; Send configure command
```

```
              BSF     ek_stat,EK#OFFH  ; Set off-hook flag
              GOTO    EK_STRT9         ; Go return
;
; Modem reset is complete and has gone off-hook.  Set up negotiation.
;
EK_STRTB ;
              GOTO    EK_STRT8         ; *** TEST -- modem calibration
              BSF     ek_stat,EK#SYNC  ; Set EK#SYNC mode
              CLRF    ek_mcnt          ; Clear wait count
              BSF     ek_stat,EK#ORIG  ; *** TEST -- set ORIG/ANSWER mode
              BSF     ek_stat,EK#CNFG  ; *** TEST -- skip mode negotiation
;
              GOTO    EK_STRT9         ; *** TEST -- party on
              TSTFSZ  ek_mtcnt         ; New set of tries ?
              GOTO    EK_STRT1         ; No
;
              MOVLW   MC#TCNT          ; Get modem try count
              MOVWF   ek_mtcnt         ; Set modem try count
;
              MOVLW   MC#MVM           ; Get modem wait value mask
              ANDWF   ek_rtccl,W       ; Get lower bits of RTCC
              MOVLW   MC#MVC           ; Add constant
              ADDLW   0xA0             ; ************
              MOVWF   ek_mval          ; Save modem wait value
;
; Configure SYNC tone.  Wait for SYNC timeout.
;
EK_STRT1
              BTFSC   ek_stat,EK#ACK   ; Sending ACK ?
              GOTO    EK_STRT5         ; Yes
              TSTFSZ  ek_mtcnt         ; Still trying SYNC ?
              GOTO    EK_STRT1B        ; Yes
              BCF     ek_stat,EK#SYNC  ; No, clear SYNC mode
              GOTO    EK_STRT4         ; Go LISTEN
EK_STRT1B
              BTFSC   ek_stat,EK#LISN  ; Sending SYNC ?
              GOTO    EK_STRT3         ; No
              TSTFSZ  ek_mcnt          ; New SYNC try ?
              GOTO    EK_STRT2         ; No
;
              MOVFP   ek_mval,WREG     ; Get modem wait value
              MOVWF   ek_mcnt          ; Set modem send count
              MOVLW   0x2A             ; Get TX DTMF SYNC low
              MOVWF   ek_mobyte1       ; Set low byte
              MOVLW   0x8A             ; Get TX DTMF tone high
              MOVWF   ek_mobyte2       ; Set high byte
              CALL    EK_SDMC          ; Send modem command
              GOTO    EK_STRT9         ; Go return
;
EK_STRT2
              DECFSZ  ek_mwcnt         ; SYNC timeout ?
```

```
              GOTO    EK_STRT9         ; No, return
;
; Configure LISTEN mode.  Wait for LISTEN timeout.
;
              BSF     ek_stat,EK#LISN  ; Set for listen
              MOVFP   ek_mval,WREG     ; Get modem wait value
              MOVWF   ek_mcnt          ; Set modem listen count
              MOVLW   0x00             ; Get silence transmitter low
              MOVWF   ek_mobyte1       ; Set low byte
              MOVLW   0xA0             ; Get silence transmitter high
              MOVWF   ek_mobyte2       ; Set high byte
              CALL    EK_SDMC          ; Send modem command
              GOTO    EK_STRT9         ; Go return
;
EK_STRT3
              DECFSZ  ek_mwcnt         ; Listen timeout ?
              GOTO    EK_STRT4         ; No, continue
;
; LISTEN mode timed out.  Reconfigure SYNC mode.
;
              BCF     ek_stat,EK#LISN  ; Set for send SYNC
              DECF    ek_mtcnt         ; Decrement try count
              GOTO    EK_STRT9         ; Go continue
;
; Look for far-end ACK or SYNC tone.
;
EK_STRT4
              MOVLW   0x00             ; Get report DTMF tone low
              MOVWF   ek_mobyte1       ; Set low byte
              MOVLW   0x68             ; Get report DTMF tone high
              MOVWF   ek_mobyte2       ; Set high byte
              CALL    EK_SDMC          ; Send modem command
;
              TSTFSZ  ek_mibyte2       ; Report response ?
              GOTO    EK_STRT9         ; No, return
              BTFSS   ek_stat,EK#SYNC  ; Still in SYNC mode ?
              GOTO    EK_STRT4A        ; No
              MOVLW   0x0B             ; Get ACK response
              CPFSEQ  ek_mibyte1       ; ACK ?
              GOTO    EK_STRT9         ; No, return
;
              BSF     ek_stat,EK#ORIG  ; Set ORIGINATE
              GOTO    EK_STRT4B        ; Continue
;
EK_STRT4A
              MOVLW   0x0A             ; Get SYNC response
              CPFSEQ  ek_mibyte1       ; SYNC ?
              GOTO    EK_STRT9         ; No, return
;
; Far-end ACK or SYNC tone detected.  Set mode, send ACK if necessary.
```

```
EK_STRT4B   BSF     ek_stat,EK#ACK      ; Set ACK mode
            BCF     ek_stat,EK#SYNC     ; Clear SYNC mode
            BCF     ek_stat,EK#LISN     ; Clear listen mode
            CLRF    ek_mwcnt            ; Clear modem wait count
            GOTO    EK_STRT9            ; Go return
;
EK_STRT5    TSTFSZ  ek_mwcnt            ; Beginning of state ?
            GOTO    EK_STRT6            ; No, wait for far-end ACK
;
            MOVLW   MC#MWVM             ; Get modem wait value mask
            ADDLW   MC#MWVC             ; Add constant
            MOVWF   ek_mwcnt            ; Set modem wait count
            BTFSC   ek_stat,EK#ORIG     ; ORIGINATE mode ?
            GOTO    EK_STRT9            ; No, return
            MOVLW   0x2B                ; Get TX DTMF ACK low
            MOVWF   ek_mobyte1          ; Set low byte
            MOVLW   0x8A                ; Get TX DTMF tone high
            MOVWF   ek_mobyte2          ; Set high byte
            CALL    EK_SDMC             ; Send modem command
            GOTO    EK_STRT9            ; Go return
;
EK_STRT6    DECFSZ  ek_mwcnt            ; Done waiting ?
            GOTO    EK_STRT9            ; No, return
;
            MOVLW   0x00                ; Get silence transmitter low
            MOVWF   ek_mobyte1          ; Set low byte
            MOVLW   0xA0                ; Get silence transmitter high
            MOVWF   ek_mobyte2          ; Set high byte
            CALL    EK_SDMC             ; Send modem command
;
            BCF     ek_stat,EK#ACK      ; Clear ACK state
            BSF     ek_stat,EK#CNFG     ; Set configure state
            CLRF    ek_mwcnt            ; Clear wait counter
            GOTO    EK_STRT9            ; Go return
;
; Send modem ORIGINATE/ANSWER configuration commands.
;
EK_STRT7    TSTFSZ  ek_mwcnt            ; Send config word 1 ?
            GOTO    EK_STRT7A           ; No, continue
            MOVLW   0x00                ; Config word 1, rate = 14.4
;*******
            MOVWF   ek_mobyte1          ; Set low byte
            MOVLW   0x20                ; Config word 1, ANSWER
            BTFSC   ek_stat,EK#ORIG     ; ORIGINATE mode ?
            MOVLW   0x28                ; Config word 1, ORIGINATE
;*******
            MOVWF   ek_mobyte2          ; Set high byte
            CALL    EK_SDMC             ; Send modem command
            INCF    ek_mwcnt            ; Increment count
            GOTO    EK_STRT9            ; Go return
;
EK_STRT7A   MOVLW   1                   ; Get 1
            CPFSEQ  ek_mwcnt            ; Send config word 2 ?
            GOTO    EK_STRT7B           ; No, continue
            MOVLW   0x02                ; Config word 2 low
            MOVWF   ek_mobyte1          ; Set low byte
            MOVLW   0x31                ; Config word 2 high
            MOVWF   ek_mobyte2          ; Set high byte
            CALL    EK_SDMC             ; Send modem command
            INCF    ek_mwcnt            ; Increment count
            GOTO    EK_STRT9            ; Go return
;
; Set V.24 status interrupt mask.
;
EK_STRT7B   MOVLW   2                   ; Get 2
            CPFSEQ  ek_mwcnt            ; Send config word 3 ?
            GOTO    EK_STRT7C           ; No, continue
            MOVLW   0xFC                ; V.24 config low
            MOVWF   ek_mobyte1          ; Set low byte
            MOVLW   0xA3                ; V.24 config high
            MOVWF   ek_mobyte2          ; Set high byte
            CALL    EK_SDMC             ; Send modem command
            INCF    ek_mwcnt            ; Increment count
            BTFSS   ek_stat,EK#ORIG     ; ORIGINATE mode ?
            INCF    ek_mwcnt            ; Increment count
            GOTO    EK_STRT9            ; Go return
;
; If originate mode, look for remote answer tone.
;
EK_STRT7C   MOVLW   3                   ; Get 3
            CPFSEQ  ek_mwcnt            ; Looking for answer tone ?
            GOTO    EK_STRT7D           ; No, continue
            MOVLW   0x00                ; Report call progress low
            MOVWF   ek_mobyte1          ; Set low byte
            MOVLW   0x8C                ; Report call progress high
            MOVWF   ek_mobyte2          ; Set high byte
            CALL    EK_SDMC             ; Send modem command
            MOVLW   0x06                ; Load answer tone detected
            CPFSEQ  ek_mibyte1          ; Equals reset reponse lo
            GOTO    EK_STRT9            ; Go return
            INCF    ek_mwcnt            ; Increment count
            GOTO    EK_STRT9            ; Go return
;
```

```
; Start modem handshake procedures.
EK_STRT7D   MOVLW    4
            CPFSEQ   ek_mwcnt
            GOTO     EK_STRT7E
            MOVLW    0x00                              ; Get 4
            MOVWF    ek_mobyte1                        ; Send hand shake ?
            MOVLW    0x80                              ; No, continue
            MOVWF    ek_mobyte2                        ; Hand shake low
            CALL     EK_SDMC                           ; Set low byte *******
            INCF     ek_mwcnt                          ; Hand shake high
            GOTO     EK_STRT9                          ; Set high byte *******
                                                      ; Send modem command
                                                      ; Increment count
                                                      ; Go return
;
EK_STRT7E   MOVLW    5
            CPFSEQ   ek_mwcnt                          ; Get 5
            GOTO     EK_STRT8                          ; Looking for hand shake status ?
            MOVLW    0x00                              ; No, continue
                                                      ; Report handshake status low
********
            MOVWF    ek_mobyte1                        ; Set low byte
            MOVLW    0x81                              ; Report handshake status high
********
            MOVWF    ek_mobyte2                        ; Set high byte
            CALL     EK_SDMC                           ; Send modem command
            MOVLW    0x86                              ; Load handshake complete
            CPFSEQ   ek_mibyte2                        ; Equals reset reponse hi
            GOTO     EK_STRT9                          ; Go return
            INCF     ek_mwcnt                          ; Increment count
            GOTO     EK_STRT9                          ; Go return
;
; Handshake complete. Connect response 86NN, NN = modem speed
;
EK_STRT8    BCF      ek_stat,EK#CNFG                   ; Clear configure state
            BCF      ek_stat,EK#STRT                   ; Clear startup state
;
EK_STRT9    RETURN                                     ; Return
;
```

```
            stitle "Executive utilities"
;*********************************************************
;*    APS Prototype II Software                          *
;*        copyright 1993                                 *
;*    Advanced Protocol Systems, Inc.                    *
;*********************************************************
;
;************ Executive acknowledge SYNC request *************
;
; Purpose: Send ACK in response to SYNC request
;
; Calling parameters: None
; Returned parameters: None
;
EK_ACK      MOVLW    dt_ecntl                          ; Get modem exec IOBLK address
            CPFSEQ   dt_id                             ; Exec message ?
            GOTO     dt_id                             ; No, kill current message
            MOVLB    0                                 ; **************
            BSF      PORTB,2                           ; ***** Set test strobe *****
            NOP                                        ; **************************
            NOP                                        ; **************************
            NOP                                        ; ****** Clear test strobe *******
            BCF      PORTB,2                           ; ***************
            MOVLB    1
;
;           If computer message being output, set message done
;
            BTFSS    dt_gcntl,EK#BUSY                  ; Computer IOBLK BUSY ?
            GOTO     EK_ACK1                           ; No, continue
            BCF      dt_gcntl,EK#BUSY                  ; Clear IOBLK BUSY
            BCF      dt_gcntl,EK#DONE                  ; Set IOBLK DONE
;
;           If Vocoder message being output, set message done
;
EK_ACK1     BTFSS    dt_vcntl,EK#BUSY                  ; Vocoder IOBLK BUSY ?
            GOTO     EK_ACK2                           ; No, continue
            BCF      dt_vcntl,EK#BUSY                  ; Clear IOBLK BUSY
            BCF      dt_vcntl,EK#DONE                  ; Set IOBLK DONE
;
;           Send ACK response
;
EK_ACK2     MOVLW    IM#ACK                            ; ACK byte
            MOVWF    ek_mobyte1                        ; Save for output
            MOVLW    IM#DATA                           ; Modem data
            MOVWF    ek_mobyte2                        ; Save for output
            MOVLW    ek_mobyte1                        ; Data address
```

```
              MOVWF   FSR0
              CALL    DT_OUTE              ; Save for DT_OUT
                                           ; Output data
              RETURN                       ; Return ;*********** Executive compute check sum ****************
;
; Purpose: Compute checksum for Vocoder and Computer modem messages
;
; Calling parameters:
;   FSR0 contains address of packet
;   WREG contains byte count
; Returned parameters:
;   FSR0 points to checksum for packet
;   WREG contains checksum
;
EK_CCS        MOVWF   ek_cnt               ; Set byte count
              MOVLW   0                    ; Initialize check sum
EK_CCS1       ADDWF   INDF0,W              ; Add byte
              BTFSC   ALUSTA,C             ; Carry bit set ?
              INCF    WREG                 ; Yes, add in carry bit
              INCF    FSR0                 ; Increment address
              DECFSZ  ek_cnt               ; Done ?
              GOTO    EK_CCS1              ; No
              RETURN                       ; WREG = check sum ;*********** Executive check modem output ****************
;
; Purpose: Check if modem message is waiting for output
;
; Calling parameters: None
; Returned parameters: None
;
EK_CHKMO      CLRF    dt_id                ; Clear modem output ID
              BTFSS   dt_ecnt1,EK#BUSY     ; Ready for output ?
              GOTO    EK_CHKMO1            ; No, continue
              MOVLW   dt_ecnt1
              CALL    DT_CHK               ; Modem exec output IOBLK
                                           ; Attempt to start message
EK_CHKMO1     BTFSS   dt_gcnt1,EK#BUSY     ; Ready for output ?
              GOTO    EK_CHKMO2            ; No, continue
              MOVLW   dt_gcnt1
              CALL    DT_CHK               ; Modem computer output IOBLK
                                           ; Attempt to start message
EK_CHKMO2     BTFSS   dt_vcnt1,EK#BUSY     ; Ready for output ?
```

```
              GOTO    EK_CHKMO3            ; No, continue
              MOVLW   dt_vcnt1             ; Modem Vocoder output IOBLK
              CALL    DT_CHK               ; Attempt to start message
EK_CHKMO3     BCF     CPUSTA,GLINTD        ; Enable interrupts
              RETURN                       ; Return ;*********** Executive status modem ****************
;
; Purpose: Determines current operating status of the modem
;
; Calling parameters: None
; Returned parameters: None
;
EK_MDSTAT     BTFSS   ek_stat,EK#RUNT      ; Looking for V24 status ?
              GOTO    EK_MDSTATE           ; No, go return
;
              BTFSS   PORTA,0              ; Unprocessed interrupt ?
              CALL    IM_SVC               ; Periodic modem status check
;
; Is there an unsolicited V.24 status ? (configured in start-up routine)
;
              MOVLW   0xA4                 ; Get V.24 status high
              CPFSEQ  ek_mibyte2           ; Compare to modem input ?
              GOTO    EK_MDSTATE           ; No, go return
              CLRF    ek_mibyte2           ; Clear modem input byte
;
; Modem status state table (DSR: bit 3, CTS: bit 1, RSDL: bit 0)
;
;                       DSR   RSDL   CTS
;   off-line             1     x      x
;   negotiating          0     1      1
;   carrier detect       0     0      1
;   on-line              0     0      0
;
              BSF     PORTB,3
              NOP
              NOP                          ;****** Set test strobe ******
              NOP                          ;*****************************
              BCF     PORTB,3              ;****** Clear test strobe ******
;
; Check for loss of carrier signal
;
              BTFSS   ek_mibyte1,0         ; RLSD status lost ?
              GOTO    EK_MDSTAT2           ; No, continue checks
              BSF     PORTB,EK#LEDR        ; Set LED orange
```

```
                BSF     PORTB,EK#LEDG       ; Set LED orange
                BSF     ek_mocod,EK#VCMT    ; Set mute vocoder flag
                CLRF    vc_rxerr            ; Clear mute timer
                CALL    EK_VCSTAT           ; Mute vocoder output
EK_RESET        GOTO    EK_RESET            ; Self MDT timeout
;
; Check for clear to send signal
;
EK_MDSTAT2      BTFSS   ek_mibyte1,1        ; CTS signal lost ?
                GOTO    EK_MDSTAT3          ; No, set on-line
                BCF     ek_stat,EK#ONLN     ; Yes, set off-line
                BSF     PORTB,EK#LEDR       ; Set LED orange
                BSF     PORTB,EK#LEDG       ; Set LED orange
                BSF     ek_mocod,EK#VCMT    ; Set mute vocoder flag
                CLRF    vc_rxerr            ; Clear mute timer
                GOTO    EK_MDSTATE          ; Go return
;
EK_MDSTAT3      BSF     ek_stat,EK#ONLN     ; Set to on-line mode
                BCF     PORTB,EK#LEDR       ; Set LED green
                BSF     PORTB,EK#LEDG       ; Set LED green
;
EK_MDSTATE      RETURN                      ; Return
;
;************** Executive status computer *******************
;
; Purpose: Determines current operating status of the computer
;
; Calling parameters: None
; Returned parameters: None
;
EK_PCSTAT       BTFSC   ek_cmnd,EK#ONLN     ; On-line mode ?
                GOTO    EK_PCSTAT1          ; Yes
;
; Off-line (command) mode, check for command buffer full
;
                BCF     ek_mocod,EK#LRVC    ; Off-line, use high res voice
                BTFSS   sp_icntl,EK#FULL    ; Input queue FULL ?
                GOTO    EK_PCSTATE          ; No, return
                CALL    PC_CMND             ; Yes, call command interpreter
                GOTO    EK_PCSTATE          ; Return
;
; On-line, if in run time check for PC output to modem
;
EK_PCSTAT1      BSF     ek_mocod,EK#LRVC    ; On-line, use low res voice
                BTFSS   ek_stat,EK#RUNT     ; Run-time mode ?
                GOTO    EK_PCSTATE          ; No, return
;
```

```
                BTFSC   ek_mocod,EK#CHKQ    ; Ok to service PC queue ?
                GOTO    EK_PCSTAT1B         ; Yes, service PC queue
                BTFSC   ek_mocod,EK#CHKC    ; Count flag set ?
                GOTO    EK_PCSTAT1A         ; Yes, set service flag
                BSF     ek_mocod,EK#CHKC    ; No, set count flag
                GOTO    EK_PCSTATE          ; Return
EK_PCSTAT1A     BSF     ek_mocod,EK#CHKQ    ; No, set service queue flag
                GOTO    EK_PCSTATE          ; Return
EK_PCSTAT1B     CALL    PC_MDMOUT           ; Yes, check for PC output
                TSTFSZ  WREG                ; Modem packet scheduled ?
                GOTO    EK_PCSTATE          ; No, try again next pass
                BCF     ek_mocod,EK#CHKC    ; Yes, clear count flag
                BCF     ek_mocod,EK#CHKQ    ; Clear service queue flag
;
EK_PCSTATE      RETURN                      ; Return
;
;************** Executive read RTCC *********************
;
; Purpose: Posts RTCC low and high values
;
; Calling parameters: None
; Returned parameters:
;   ek_rtccl contains RTCCL
;   ek_rtcch contains RTCCH
;
EK_RD_RTCC      MOVPF   RTCCL,ek_rtccl      ; Read RTCC low byte
                MOVPF   RTCCH,ek_rtcch      ; Read RTCC high byte
                MOVFP   ek_rtccl,WREG       ; Get low byte
                CPFSLT  RTCCL               ; Value changed ?
                RETURN                      ; No, return
                MOVPF   RTCCL,ek_rtccl      ; Read RTCC low byte
                MOVPF   RTCCH,ek_rtcch      ; Read RTCC high byte
                RETURN                      ; Return
;
;************** Executive schedule application tasks **********
;
; Purpose: Schedules application tasks
;
; Calling parameters: None
; Returned parameters: None
;
EK_SCHED        MOVLW   DT#14#4             ; Time for byte @ 14.4
                MOVWF   dt_btime            ; Set for DT_CHK
;
;               Schedule real-time tasks
;
```

```
              CALL    EK_RD_RTCC      ; Read RTCC
              BTFSS   ek_game,EK#GBIO ; GB I/O ?
              GOTO    EK_SCHED1       ; No Schedule computer unique tasks (* Specific for App *)

EK_SCHED1     CALL    PC_MIRQST       ; Request Computer modem input
              CALL    PC_QINIT        ; Re-initialize serial queues
              BSF     ek_cmnd,EK#ONLN ; Set to on-line mode
              EK_ENABLE_SI            ; Enable serial input Schedule common tasks EK_SCHED2     MOVLW   VC#PERH         ; VC task period high
              MOVWF   FSR0            ; Save
              MOVLW   VC#PERL         ; VC task period low
              BSF     ek_mocod,EK#VCMT; Initialize mute flag
              BSF     ek_vocod,6      ; **** TEST VC2 -- audio on flag
              BSF     ek_vocod,5      ; **** TEST MX4 -- test on flag MOVLW   vc_mibuf2       ; Get VC modem input buffer 2
              CALL    VC_MIRQST       ; Request VC modem input
              MOVLB   1               ; Select bank 0
              MOVLW   0x10            ; Timer 1 enable
              IORWF   PIE             ; Enable timer 1 interupt RETURN                  ; Return ;*********** Executive send modem command *******************
;
; Purpose: Sends command to modem
;
; Calling parameters: None
; Returned parameters: None EK_SDMC       MOVLW   ek_mibyte1      ; Get response addr
              MOVWF   FSR0            ; Save for DR_INE
              CALL    DR_INE          ; Request modem response
              MOVLW   ek_mobyte1      ; Get command addr
              MOVWF   FSR0            ; Save for DT_OUTE
              CALL    DT_OUTE         ; Request modem output
              BCF     CPUSTA,GLINTD   ; Enable interrupts
              RETURN                  ; Return ;*********** Executive set I/O block *********************
;
; Purpose: Sets common I/O block values
;
; Calling parameters: None
;   FSR0 contains address of data
;   WREG contains IOBLK address
;   ek_cnt contains byte count in bits 0 - 5.
; Returned parameters:
;   WREG = 1, if ready; otherwise WREG = 0 and busy count is incremented EK_SETIO      MOVPF   WREG,ek_id      ; Save IOBLK ID
              MOVPF   FSR0,ek_addr    ; Save data address
              MOVPF   ek_id,FSR0      ; Set IOBLK addr
              MOVPF   INDF0,WREG      ; Get IOBLK cntl
              ANDLW   EK#RDYM         ; Mask BUSY and DONE
              BTFSS   ALUSTA,Z        ; Ready ?
              GOTO    EK_SETIO1       ; No
              MOVPF   ek_cnt,WREG     ; Get header
              ANDLW   EK#MAXM         ; Mask byte count
              MOVWF   ek_cnt          ; Save byte count
              MOVPF   ek_cnt,INDF0    ; Set IOBLK cntl
              BSF     INDF0,EK#BUSY   ; Set IOBLK cntl BUSY
              INCF    FSR0            ; Increment IOBLK addr
              MOVPF   ek_addr,INDF0   ; Set IOBLK addr
              INCF    FSR0            ; Increment IOBLK addr
              RETLW   1               ; Return, ready EK_SETIO1     MOVLW   3               ; Offset to error count
              ADDWF   FSR0,F          ; Add to IOBLK addr
              INCF    INDF0           ; Increment error count
              RETLW   0               ; Return, not ready ;*********** Executive synchronize modem messages *******************
;
; Purpose: Sends request to synchronize modem messages
;
; Calling parameters: None
; Returned parameters: None EK_SYNC       CLRF    dr_id           ; Clear receive packet id
              INCF    im_await        ; Set ACK wait
              MOVLB   0               ; ***********
              BSF     PORTB,2         ; ****** Set test strobe ******
              NOP                     ; ***********
              NOP                     ; ***********
              NOP                     ; ***********
              BCF     PORTB,2         ; ****** Clear test strobe ******
              MOVLB   1               ; ***********
              CLRF    dr_gcntl        ; Clear IOBLK cntl
```

```
        stitle "VC task"
;***************************************************************
;*      APS Prototype II Software                              *
;*          copyright 1993                                     *
;*      Advanced Protocol Systems, Inc.                       *
;***************************************************************

VC#ACK      EQU     0x0A            ; Vocoder message ACK
VC#BLANK    EQU     0x00            ; Vocoder Blanked
VC#HIBC     EQU     25              ; VC byte count for high res
VC#HIRES    EQU     0x0C            ; Vocoder 9600 bps
                                    ; VC byte count for low res: 13, 11, or 3
VC#LOBC     EQU     13              ; Vocoder 0x0B=4800 0x03=4000 0x01=800 bps
VC#LORES    EQU     0x0B            ; Modem input byte count
VC#MIBC     EQU     25              ; Vocoder RX byte count
VC#RXBC     EQU     27              ; Vocoder RX command
VC#RXCMD    EQU     2               ; Vocoder RX response byte count
VC#RXRBC    EQU     3               ; Vocoder TX byte count
VC#TXBC     EQU     4               ; Vocoder TX command
VC#TXCMD    EQU     1               ; Vocoder TX response byte count
VC#TXRBC    EQU     28

;
VC#VIBF     EQU     0               ; VC Vocoder input buffer select (1=one
0=two)
VC#MOR      EQU     1               ; VC modem output ready (1=true)
VC#MOR1     EQU     2               ; VC modem output buffer 1 ready (1=true)
VC#MOR2     EQU     3               ; VC modem output buffer 2 ready (1=true)
VC#MIBF     EQU     4               ; VC modem input buffer select (1=one 0=two)
VC#VOR      EQU     5               ; VC Vocoder output ready (1=true)
VC#VOR1     EQU     6               ; VC Vocoder output buffer 1 ready (1=true)
VC#VOR2     EQU     7               ; VC Vocoder output buffer 2 ready (1=true)

;************ VC modem input request ***************************
;
; Purpose: Requests VC modem input
;
; Calling parameters:
;   WREG contains buffer address
; Returned parameters: None
;
VC_MIRQST   MOVWF   FSR0            ; Save in FSR0
            MOVLW   VC#MIBC         ; Get modem input byte count
            MOVLW   0x0D            ; ***** TEST MX4 -- low res voice
            MOVLW   0x05            ; ***** TEST MX4 -- test pcket
size
            MOVLW   0x06            ; ***** TEST MX4 -- test pcket
size
            BTFSC   ek_cmnd,EK#ONLN ; PC on-line ?
            CALL    PC_MIRQST       ; Yes, request PC modem input
           ;BTFSC   ek_game,EK#GGIO ; GG I/O ?
           ;CALL    GG_MIRQST       ; Yes, request GG modem input
            MOVLW   vc_mibuf2       ; Get VC modem input buffer 2
            CPFSGT  dr_vaddr        ; Buffer 1 ?
            MOVLW   vc_mibuf1       ; Get VC modem input buffer 1
            CLRF    dr_vcntl        ; Clear IOBLK cntl
            CALL    VC_MIRQST       ; Request VC modem input ;        Send SYNC request
            MOVLW   IM#SYNC         ; SYNC byte
            MOVWF   ek_mobyte1      ; Save for output
            MOVLW   IM#DATA         ; Modem data
            MOVWF   ek_mobyte2      ; Save for output
            MOVLW   ek_mobyte1      ; Data address
            MOVWF   FSR0            ; Save for DT_OUT
            CALL    DT_OUTE         ; Output data RETURN                  ; Return ;********** Executive status vocoder ***********************
;
; Purpose: Determines current operating status of the vocoder
;
; Calling parameters: None
; Returned parameters: None
;
EK_VCSTAT   BTFSS   ek_mocod,EK#VCMT; Mute output ?
            GOTO    EK_VCSTATE      ; No, go return TSTFSZ  vc_rxerr        ; Mute cycle started ?
            GOTO    EK_VCSTAT1      ; no
            MOVLW   0xC0            ; Get mute count
            MOVPF   WREG,vc_rxerr   ; Load mute count
            CALL    VC_MUTE         ; Execute mute on command EK_VCSTAT1  DECFSZ  vc_rxerr        ; Decrement mute count
            GOTO    EK_VCSTATE      ; Go return
            BCF     ek_mocod,EK#VCMT; Clear mute flag
            CALL    VC_MUTE         ; Execute mute off command EK_VCSTATE  RETURN                  ; Return
;
```

```
size              MOVLW   0x0B                    ; *** TEST MX4 -- test pcket MOVLW   0x01                    ; *** TEST MX4 -- test pcket size
                  MOVWF   ek_cnt                  ; Set for DR_IN
                  MOVLW   dr_vcntl                ; IOBLK addr
                  CALL    DR_IN                   ; Setup for input
                  RETURN                          ; Return ;*********** VC modem input wait ***************************************
;
; Purpose: Waits for VC modem input, and switches input buffers
;
; Calling parameters: None
; Returned parameters: None VC_MIWAIT         BTFSS   vc_buff,VC#VOR1         ; Modem input buffer 1 ?
                  GOTO    VC_MIWAIT1              ; No BSF     vc_buff,VC#VOR1         ; Set Vocoder output buff 1 ready
                  BCF     vc_buff,VC#MIBF         ; Toggle modem input to buffer 2
                  MOVLW   vc_mibuf2               ; Address of buffer 2
                  CALL    VC_MIRQST               ; Request VC modem input
                  GOTO    VC_MIWAIT2

VC_MIWAIT1        BSF     vc_buff,VC#VOR2         ; Set Vocoder output buff 2 ready
                  BSF     vc_buff,VC#MIBF         ; Toggle modem input to buffer 1
                  MOVLW   vc_mibuf1               ; Address of buffer 1
                  CALL    VC_MIRQST               ; Request VC modem input
VC_MIWAIT2        BTFSC   ek_mocod,5              ; ***** TEST MX4 -- PC display
                  CALL    PC_MX3                  ; ***** TEST MX4 -- PC display
                  RETURN                          ; Return ;*********** VC modem output wait **************************************
;
; Purpose: Waits for VC modem output completion
;
; Calling parameters: None
; Returned parameters: None

VC_MOWAIT         RETURN

;************* VC scheduled task *******************************************
;
; Purpose: Inputs and outputs data to the Vocoder periodically
;
; Calling parameters: None
; Returned parameters: None
;
;
VC_SCHED          BTFSC   ek_mocod,6              ; ***** TEST VC2 -- Audio on ?
                  RETURN                          ; ***** TEST VC2 -- Yes, return
                  BSF     CPUSTA,GLINTD           ; Disable interrupts
                  BTFSS   CPUSTA,GLINTD           ; Verify interrupts ?
                  GOTO    VC_SCHED                ; No, try again
                  BSF     vc_buff,VC#VOR          ; Assume Vocoder output ready
                  BTFSC   vc_buff,VC#MIBF         ; Modem using input buffer 2 ?
                  GOTO    VC_SCHED1A              ; No, vocoder will use 2

BTFSS   vc_buff,VC#VOR1         ; Vocoder buf 1 data ready ?
                  BCF     vc_buff,VC#VOR          ; No, clear output ready
                  BCF     vc_buff,VC#VOR1         ; Clear buffer 1 ready
                  MOVLW   vc_obuf1                ; Address of buffer 1
                  GOTO    VC_SCHED1B              ; Continue VC_SCHED1A        BTFSS   vc_buff,VC#VOR2         ; Vocoder buf 2 data ready ?
                  BCF     vc_buff,VC#VOR          ; No, clear output ready
                  BCF     vc_buff,VC#VOR2         ; Clear buffer 2 ready
                  MOVLW   vc_obuf2                ; Address of buffer 2

; Vocoder transmit buffer configured; set up vocoder receive command

VC_SCHED1B        MOVWF   vc_addr                 ; Save buffer address
                  MOVLW   VC#RXBC                 ; Set address for RX
                  MOVWF   INDF0                   ; Set Vocoder RX cmd
                  INCF    FSR0                    ; byte count
                  MOVLW   VC#RXCMD                ; Increment address
                  MOVWF   INDF0                   ; Set Vocoder RX
                  INCF    FSR0                    ; command
                  MOVLW   VC#LO8C                 ; Increment address
                  CPFSEQ  INDF0                   ; Get low byte count
                  GOTO    VC_SCHED2               ; Low res rate ?
                  MOVLW   VC#LORES                ; No
                  GOTO    VC_SCHED2A              ; Get low res rate
                                                  ; Go set rate VC_SCHED2         MOVLW   VC#HIRES                ; Get high res rate
VC_SCHED2A        BTFSS   vc_buff,VC#VOR          ; Vocoder data ready ?
                  MOVLW   VC#BLANK                ; No, set rate NULL
                  MOVWF   INDF0                   ; Set data rate
                  MOVFP   vc_addr,FSR0            ; Setup for EK_CCS
                  MOVLW   VC#RXBC                 ; Get byte count
                  CALL    EK_CCS                  ; Compute checksum
                  MOVWF   INDF0                   ; Set checksum ; Execute vocoder receive command and validate response
```

```
                    MOVLW   vc_txldr        ; Set lowest data rate
VC_SCHED5           MOVWF   vc_txbc         ; TX cmd address
                    MOVLW   FSR0            ; Setup for EK_CCS
                    MOVLW   VC#TXBC         ; Byte count
                    CALL    EK_CCS          ; Compute checksum
                    MOVWF   INDF0           ; Save TX cmd checksum
                    MOVLW   vc_txbc         ; TX cmd address
                    MOVWF   FSR0            ; Setup for DV_IO ; Vocoder transmit command configured, set up vocoder receive buffer
;
                    BTFSS   vc_buff,VC#VIBF ; Vocoder input buffer 1 ?
                    GOTO    VC_SCHED6A      ; No, two MOVLW   VC#TXRBC        ; Get expected response count
                    MOVWF   vc_ibuf1        ; Save for DV_IO
                    MOVLW   vc_ibuf1        ; Address of buffer 1
                    BCF     vc_buff,VC#VIBF ; Toggle Vocoder input to buffer 2
                    GOTO    VC_SCHED6B      ; Continue VC_SCHED6A          MOVLW   VC#TXRBC        ; Get expected response count
                    MOVWF   vc_ibuf2        ; Save for DV_IO
                    MOVLW   vc_ibuf2        ; Address of buffer 2
                    BSF     vc_buff,VC#VIBF ; Toggle Vocoder input to buffer 1

; Execute vocoder transmit command and validate response
;
VC_SCHED6B          MOVWF   vc_addr         ; Save input buffer address
                    GOTO    VC_SCHED7       ; ***** TEST MX4 -- skip vocoder
                    CALL    DV_IO           ; Input Vocoder data
                    MOVFP   vc_addr,FSR0    ; Get input buffer address
                    MOVFP   INDF0,WREG      ; Get byte count
                    CALL    EK_CCS          ; Compute checksum
                    CPFSEQ  INDF0           ; Checksum OK ?
                    GOTO    VC_SCHED7B      ; No MOVFP   vc_addr,FSR0    ; Get input buffer address
                    INCF    FSR0            ; Point to ACK
                    MOVLW   VC#ACK          ; Get ACK value
                    CPFSEQ  INDF0           ; Message OK ?
                    GOTO    VC_SCHED7B      ; No INCF    FSR0            ; Point to TX response
                    MOVLW   VC#TXCMD        ; Get TX command
                    CPFSEQ  INDF0           ; Correct response ?
                    GOTO    VC_SCHED7B      ; No GOTO    VC_SCHED4       ; ***** TEST MX4 -- skip vocoder
                    MOVWF   vc_addr,FSR0
                    MOVLW   VC#RXRBC        ; Setup for DV_IO
                    MOVWF   vc_rxbc         ; Get expected response count
                    MOVWF   vc_rxbc         ; Save for DV_IO
                    CALL    DV_IO           ; Get response buffer
                    CALL    VC_DUMMY        ; Output Vocoder data
                    GOTO    VC_SCHED4       ; ***** TEST MX5 -- dummy data
                                            ; ***** TEST MX5 -- skip MOVLW   vc_rxbc         ; Get response buffer
                    MOVWF   FSR0            ; Setup for EK_CCS
                    MOVFP   INDF0,WREG      ; Get byte count
                    CALL    EK_CCS          ; Compute checksum
                    CPFSEQ  INDF0           ; Checksum OK ?
                    GOTO    VC_SCHED3       ; No DECF    FSR0            ; Decrement address
                    DECF    FSR0            ; Point to ACK
                    MOVLW   VC#ACK          ; Get ACK value
                    CPFSEQ  INDF0           ; Message OK ?
                    GOTO    VC_SCHED3       ; No INCF    FSR0            ; Point to RX response
                    MOVLW   VC#RXCMD        ; Get RX command
                    CPFSEQ  INDF0           ; Correct response ?
                    GOTO    VC_SCHED3       ; No
                    GOTO    VC_SCHED4       ; Yes ; RX frame response in error
;
VC_SCHED7B          INCF    vc_rxerr        ; Increment RX error ; Configure vocoder transmit command
;
VC_SCHED4           MOVLW   VC#TXBC         ; Set Vocoder TX cmd
                    MOVWF   vc_txbc         ; byte count
                    MOVLW   VC#TXCMD        ; Set Vocoder TX
                    MOVWF   vc_txcmd        ; command
                    MOVLW   VC#HIRES        ; Get high res rate
                    MOVWF   vc_txhdr        ; Set highest data rate
                    MOVWF   vc_txldr        ; Set lowest data rate
                    BTFSS   ek_mocod,EK#LRVC; Low res rate ?
                    GOTO    VC_SCHED5       ; No
                    MOVLW   VC#LORES        ; Get low res rate
                    MOVWF   vc_txhdr        ; Set highest data rate
```

```
            INCF    FSR0                ; Point to data rate
            MOVLW   VC#BLANK            ; Get blank data rate
            CPFSEQ  INDF0               ; Blanked ?
            GOTO    VC_SCHED6C          ; No
            GOTO    VC_SCHED7B          ; Yes
;
; Vocoder response is valid, set up modem transmit packet
;
VC_SCHED6C  MOVLW   VC#LORES            ; Get low data rate
            CPFSEQ  INDF0               ; Low rate ?
            GOTO    VC_SCHED7           ; No
            MOVLW   VC#LOBC             ; Get low res byte count
            GOTO    VC_SCHED7A          ; Go output data to modem
;
VC_SCHED7   MOVLW   VC#HIBC             ; Get high res byte count
            MOVLW   0x04                ; ***** TEST MX4 -- test pcket
size    ;
            MOVLW   0x05                ; ***** TEST MX4 -- test pcket
size    ;
            MOVLW   0x06                ; ***** TEST MX4 -- test pcket
size    ;
            MOVLW   0x0B                ; ***** TEST MX4 -- test pcket
size    ;
VC_SCHED7A  MOVWF   INDF0               ; Save byte count
            CALL    VC_DATA             ; ***** TEST MX4 -- test data
            MOVLW   VC#DHDR             ; Get Vocoder header
            IORWF   INDF0,F             ; Complete header
            MOVLW   dt_vcntl            ; Get IOBLK
            CALL    DT_OUT              ; Request modem output
            CALL    VC_ECHO             ; ***** TEST VC2 -- echo voice
            GOTO    VC_SCHED8           ; Continue
;
; TX frame response in error
;
VC_SCHED7B  INCF    vc_txerr            ; Increment TX error
VC_SCHED8   BCF     CPUSTA,GLINTD       ; Enable interrupts
            RETURN
;
; ************ VC initialize ************************************
;
; Purpose: Sends an initialize command to the vocoder
;
; Calling parameters: None
; Returned parameters: None
;
VC_INIT     MOVLW   0x04                ; Set Vocoder cmd
            MOVWF   vc_txbc             ;   byte count
            MOVLW   0x0A                ; Set Vocoder
            MOVWF   vc_txcmd            ;   command
            MOVLW   0x50                ; Set vocoder
            MOVWF   vc_txhdr            ;   parameter
            MOVWF   vc_txldr            ; Set parameter
;
VC_INIT1    MOVLW   vc_txbc             ; TX cmd address
            MOVWF   FSR0                ; Setup for EK_CCS
            MOVLW   0x04                ; Byte count
            CALL    EK_CCS              ; Compute checksum
            MOVWF   INDF0               ; Save TX cmd checksum
            MOVLW   vc_txbc             ; TX cmd address
            MOVWF   FSR0                ; Setup for DV_IO
;
            MOVLW   0x03                ; Get expected response count
            MOVWF   vc_ibuf1            ; Save for DV_IO
            MOVLW   vc_ibuf1            ; Address of buffer 1
;
            MOVLW   vc_addr             ; Save input buffer address
            CALL    DV_IO               ; Input Vocoder data
            MOVFP   vc_addr,FSR0        ; Get input buffer address
            MOVFP   INDF0,WREG          ; Get byte count
            CALL    EK_CCS              ; Compute checksum
            CPFSEQ  INDF0               ; Checksum OK ?
            GOTO    VC_INIT2            ; No
;
            MOVFP   vc_addr,FSR0        ; Get input buffer address
            INCF    FSR0                ; Point to ACK
            MOVLW   VC#ACK              ; Get ACK value
            CPFSEQ  INDF0               ; Message OK ?
            GOTO    VC_INIT2            ; No
;
            INCF    FSR0                ; Point to TX response
            MOVLW   0x0A                ; Get TX command
            CPFSEQ  INDF0               ; Correct response ?
            GOTO    VC_INIT2            ; No
;
            INCF    FSR0                ; Point to parameter
            GOTO    VC_INIT3            ; Yes
;
; TX frame response in error
;
VC_INIT2    INCF    vc_txerr            ; Increment TX error
```

```
VC_INIT3    MOVLW   0xA0            ; Load command wait count
            MOVWF   ek_cnt          ; Save in count register
VC_DLY1     DECFSZ  ek_cnt          ; Decrement counter
            GOTO    VC_DLY1         ; Keep counting
            MOVLB   0               ; Select bank 0
            BSF     PORTA,VC#VRS    ; Set Vocoder VRS high
            MOVLW   0x05            ; Load strobe count
            MOVWF   ek_cnt          ; Save in count register
VC_DLY2     DECFSZ  ek_cnt          ; Decrement counter
            GOTO    VC_DLY2         ; Keep counting
            BCF     PORTA,VC#VRS    ; Set Vocoder VRS low
            MOVLB   2               ; Set bank 2
            CLRF    TMR1            ; Clear 20 msec timer
VC_INIT4    RETURN
;
;************ VC set background *************************
;
; Purpose: Sends a background command to the vocoder
;
; Calling parameters: None
; Returned parameters: None
;
VC_BKGND    MOVLW   0x02            ; Set Vocoder cmd
            MOVWF   vc_txbc         ; byte count
            MOVLW   0x06            ; Set Vocoder
            MOVWF   vc_txcmd        ; command
;
            MOVLW   vc_txbc         ; TX cmd address
            MOVWF   FSR0            ; Setup for EK_CCS
            MOVLW   0x02            ; Byte count
            CALL    EK_CCS          ; Compute checksum
            MOVWF   INDF0           ; Save TX cmd checksum
            MOVLW   vc_txbc         ; TX cmd address
            MOVWF   FSR0            ; Setup for DV_IO
;
            MOVLW   0x03            ; Get expected response count
            MOVWF   vc_ibuf1        ; Save for DV_IO
            MOVLW   vc_ibuf1        ; Address of buffer 1
;
            MOVWF   vc_addr         ; Save input buffer address
            CALL    DV_IO           ; Input Vocoder data
            MOVFP   vc_addr,FSR0    ; Get input buffer address
            MOVFP   INDF0,WREG      ; Get byte count
            CALL    EK_CCS          ; Compute checksum
            CPFSEQ  INDF0           ; Checksum OK ?
            GOTO    VC_BKGND2       ; No
```

```
            MOVFP   vc_addr,FSR0    ; Get input buffer address
            INCF    FSR0            ; Point to ACK
            MOVLW   VC#ACK          ; Get ACK value
            CPFSEQ  INDF0           ; Message OK ?
            GOTO    VC_BKGND2       ; No
;
            GOTO    VC_BKGND3       ; Yes
;
; TX frame response in error
;
VC_BKGND2   INCF    vc_txerr        ; Increment TX error
VC_BKGND3   RETURN
;
;************ VC mute output ****************************
;
; Purpose: Sends an mute output command to the vocoder
;
; Calling parameters: None
; Returned parameters: None
;
VC_MUTE     MOVLW   0x03            ; Set Vocoder cmd
            MOVWF   vc_txbc         ; byte count
            MOVLW   0x0F            ; Set Vocoder
            MOVWF   vc_txcmd        ; command
            MOVLW   0x00            ; Set vocoder
            MOVWF   vc_txhdr        ; parameter
            BTFSC   ek_mocod,EK#VCMT; Turn mute on ?
            BSF     vc_txhdr,0      ; Yes
;
            MOVLW   vc_txbc         ; TX cmd address
            MOVWF   FSR0            ; Setup for EK_CCS
            MOVLW   0x03            ; Byte count
            CALL    EK_CCS          ; Compute checksum
            MOVWF   INDF0           ; Save TX cmd checksum
            MOVLW   vc_txbc         ; TX cmd address
            MOVWF   FSR0            ; Setup for DV_IO
;
            MOVLW   0x03            ; Get expected response count
            MOVWF   vc_ibuf1        ; Save for DV_IO
            MOVLW   vc_ibuf1        ; Address of buffer 1
;
            MOVWF   vc_addr         ; Save input buffer address
            CALL    DV_IO           ; Input Vocoder data
            RETURN
;
```

What is claimed is:

1. A method for establishing a full-duplex, concurrent voice/non-voice data connection between a first site and a second site, comprising the steps of:

establishing voice-only communication between the two sites;

respectively detecting the pressing of an engage button at each site;

temporarily severing voice communication between the two sites in response to said detecting;

configuring a modem at each site, one modem entering an originate mode, the other modem entering a receive mode;

packaging non-voice data from a computing apparatus at the first site into a first non-voice data packet;

packaging voice data from a telephone at the first site into a first voice data packet;

transmitting the first non-voice data packet and first voice data packet from the first site to the second site;

receiving a communication signal at the first site;

determining at the first site whether the communication signal includes a second non-voice data packet or a second voice data packet;

when a second non-voice packet is included, extracting computer data from the second non-voice data packet for transmission to the computing apparatus;

when a second voice data packet is included routing the second voice data packet to a digital signal processor which extracts voice data for output to the telephone at the first site.

2. The method of claim 1 in which the step of configuring comprises the steps of:

transmitting a first signal, then waiting for detection of a prescribed response signal;

when the prescribed response signal is detected, entering originate mode;

when the prescribed response signal is not detected within a specific number of repetitions of transmitting and waiting, waiting for detection of the first signal;

when the first signal is detected after waiting for detection of said first signal, transmitting the prescribed response signal and entering receive mode; and when a successful exchange of said first signal and said prescribed response signal does not occur within a specific time period, aborting the configuring step.

3. The method of claim 1, in which non-voice data is available at each site at regular intervals, and before the step of transmitting, further comprising the steps of:

determining whether there is sufficient communication bandwidth available to transmit the first voice data packet with the first non-voice data packet from the first site to the second site without missing a regular interval of non-voice data availability;

when insufficient bandwidth to transmit the first non-voice data packet and first voice data packet without missing a regular interval of non-voice data availability, dividing the first voice packet into a plurality of smaller voice packets, one of said smaller voice packets transmittable within the available bandwidth; and the step of transmitting comprising the step of transmitting the first non-voice data packet and either said first voice packet or one of said smaller voice packets within the communication bandwidth.

4. An apparatus for establishing a full-duplex, concurrent voice/non-voice data connection between a first site and a second site, comprising:

telephone means at each site for establishing voice-only communication between the two sites;

respective means at each site for detecting the pressing of an engage button at a respective site;

means at the first site for temporarily severing voice communication between the two sites when said detecting means at said first site detects the pressing of the first site's engage button;

respective means for configuring a modem at each site while voice communication is severed, one modem entering an originate mode, the other modem entering a receive mode;

first means at the first site receiving non-voice data from a computing apparatus at the first site, the first means for packaging the received non-voice data into a first non-voice data packet;

second means at the first site receiving voice data from the first site telephone means, the second means for packaging the received voice data into a first voice data packet;

a first modem at the first site receiving said first non-voice data packet and said first voice data packet, the first modem for transmitting the first non-voice data packet and first voice data packet from the first site to the second and for receiving a communication signal from the second site;

means at the first site for processing the received communication signal (i) to determine whether the received communication signal includes a second non-voice data packet or a second voice data packet, (ii) to extract computer data from the second non-voice data packet for transmission to the computing apparatus when a second non-voice packet is included, and (iii) to route the second voice data packet to the second means, the second means extracting voice data for output to the first site telephone means when a second voice data packet is included.

5. The apparatus of claim 4, in which non-voice data is time critical for transmission to the computing apparatus at the first site, and further comprising:

means for testing communication bandwidth at the first site to determine whether there is sufficient bandwidth available for the first modem to transmit the first voice data packet with the first non-voice data packet from the first site to the second site in compliance within non-voice data time constraints;

means for dividing the first voice packet into a plurality of smaller voice packets, one of said smaller voice packets transmittable within the available bandwidth with the first non-voice data packet; and wherein the first modem receives said one of said smaller voice packets and transmits the first non-voice data packet and either said first voice packet or said one of said smaller voice packets within the communication bandwidth.

* * * * *